(12) United States Patent
Periasamy

(10) Patent No.: US 12,079,563 B1
(45) Date of Patent: *Sep. 3, 2024

(54) METHOD FOR CODING A VANITY MESSAGE FOR DISPLAY

(71) Applicant: CRKL, Inc., Chesterfield, MO (US)

(72) Inventor: M. Peri Periasamy, Chesterfield, MO (US)

(73) Assignee: CRKL, INC., Chesterfield, MO (US)

( * ) Notice: Subject to any disclaimer, the term of this patent is extended or adjusted under 35 U.S.C. 154(b) by 666 days.

This patent is subject to a terminal disclaimer.

(21) Appl. No.: 17/242,902

(22) Filed: Apr. 28, 2021

Related U.S. Application Data

(63) Continuation-in-part of application No. 16/380,103, filed on Apr. 10, 2019, now Pat. No. 11,010,535, which is a continuation-in-part of application No. 15/175,530, filed on Jun. 7, 2016, now Pat. No. 10,303,746, which is a continuation of application No. 15/072,045, filed on Mar. 16, 2016, now abandoned, which is a continuation of application No. 14/138,986, filed on Dec. 23, 2013, now abandoned.

(60) Provisional application No. 62/173,136, filed on Jun. 9, 2015, provisional application No. 61/740,791, filed on Dec. 21, 2012.

(51) Int. Cl.
| | | |
|---|---|---|
| G06F 40/274 | (2020.01) | |
| G06F 40/12 | (2020.01) | |
| G06F 40/166 | (2020.01) | |

(52) U.S. Cl.
CPC ............ *G06F 40/12* (2020.01); *G06F 40/166* (2020.01)

(58) Field of Classification Search
CPC ........................... G10L 40/274; G10L 40/284
See application file for complete search history.

(56) References Cited

U.S. PATENT DOCUMENTS

| | | |
|---|---|---|
| 1,611,374 A | 12/1926 | Rebo |
| 4,760,528 A | 7/1988 | Levin |
| 4,798,403 A | 1/1989 | Nelson |
| 4,969,097 A | 11/1990 | Levin |
| 5,259,649 A | 11/1993 | Shomron |
| 5,305,205 A | 4/1994 | Weber et al. |
| 5,603,022 A | 2/1997 | Ng et al. |
| 5,623,406 A | 4/1997 | Ichbiah |

(Continued)

OTHER PUBLICATIONS

Schwartz, Ariel S., and Marti A. Hearst. "A simple algorithm for identifying abbreviation definitions in biomedical text." Biocomputing 2003. 2002. 451-462, [online] https://psb.standford.edu (Year: 2003).*

(Continued)

*Primary Examiner* — Jialong He
(74) *Attorney, Agent, or Firm* — Stinson LLP

(57) ABSTRACT

A sentence communicating a desired vanity message is parsed into the component parts. A sequence designation character is assigned to each of related words in a group based on a relative likelihood of use among the group to communicate the message. Coding instructions define code characters in a code for each of the related words in the group for use in generating a non-phonetically coded message. The code characters include at least one of the following: a starting alphabet letter character of the word, the sequence designation character assigned to the word, or a character representing the coded message communicated by the word.

10 Claims, 9 Drawing Sheets

(56) References Cited

U.S. PATENT DOCUMENTS

| | | | |
|---|---|---|---|
| 6,026,388 | A | 2/2000 | Liddy et al. |
| 6,224,109 | B1 | 5/2001 | Yang |
| 6,279,018 | B1 | 8/2001 | Kudrolli et al. |
| 6,363,373 | B1 | 3/2002 | Steinkraus |
| 6,377,965 | B1 | 4/2002 | Hachamovitch et al. |
| 6,454,262 | B1 | 9/2002 | Wilt et al. |
| 6,685,476 | B1 | 2/2004 | Safran et al. |
| 6,748,682 | B1 | 6/2004 | Sims |
| 6,775,663 | B1 | 8/2004 | Kim |
| 6,901,364 | B2 | 5/2005 | Nguyen et al. |
| 7,010,478 | B2 | 3/2006 | Mathur et al. |
| 7,069,265 | B2 | 6/2006 | Kim |
| 7,124,372 | B2 | 10/2006 | Brin |
| 7,315,902 | B2 | 1/2008 | Kirkland |
| 7,587,381 | B1 | 9/2009 | Remy et al. |
| 7,827,315 | B2 * | 11/2010 | Kirkland ............... G06F 40/123 455/466 |
| 8,903,719 | B1 | 12/2014 | Landry et al. |
| 2002/0138248 | A1 | 9/2002 | Corston-Oliver et al. |
| 2003/0003931 | A1 | 1/2003 | Silventoinen et al. |
| 2003/0034934 | A1 | 2/2003 | Brewer |
| 2003/0079382 | A1 | 5/2003 | Arens |
| 2003/0154257 | A1 | 8/2003 | Hantsch et al. |
| 2003/0219107 | A1 | 11/2003 | Richardson et al. |
| 2004/0029598 | A1 | 2/2004 | Guggisberg |
| 2004/0122979 | A1 | 6/2004 | Kirkland |
| 2004/0266462 | A1 | 12/2004 | Chava et al. |
| 2006/0270425 | A1 | 11/2006 | Lee |
| 2007/0175073 | A1 | 8/2007 | Richard |
| 2008/0249857 | A1 | 10/2008 | Angell et al. |
| 2012/0143966 | A1 | 6/2012 | Yang |

OTHER PUBLICATIONS

School of city of Hobart, [online] http://www.hobart.k12.in.us, published in 2007. (Year: 2007).*

Netlingo, [online] http://www.netlingo.com, published in 2012 (Year: 2012).*

Author unknown, "The Internet License Plate Gallery", printed Oct. 5, 2004 from http://webreference.com/outlook/license/gallery.html, 6 pages.

Author unknown, "Motorists Use Vanity License Plates to Show Religious Devotion", printed Oct. 5, 2004 from http://www.seacoastline.com/2001news/2_18_sb2.html, Feb. 18, 2001, 3 pages.

Ayoub, G., "Vanity, thy Name (in Neb.): License Plates", Opinion@theindependent.com, printed Oct. 5, 2004 from http://64.233.467.104/search?q=cache:toyIF8ddqjZUJ:www.theindependent.com, Jan. 8, 2001, 4 pages.

Cowhey, D.R., What Does That Mean—The Personal Stories Behind Vanity License Plates, 1994, Key Answer Products, Inc., Arlington Heights, Illinois, 1 page.

Missouri Department of Revenue, "Missouri Vanity Plates Display Interesting Messages", printed Oct. 7, 2004 from www.hannibal.net/stories/121198/Missourivanity.html, Dec. 11, 1998, Hannibal Courier-Post, 2 pages.

Paulson, K.A., "The GR8 Debate Over Vanity License Plates", printed Oct. 5, 2004 from http://www.freedomforum.org/templates/document.asp?documentID=14676, Aug. 26, 2001, 2 pages.

Poon, L., "Vanity Plates—Welcome to Leon Poon's Web Page", printed Oct. 5, 2004 from http://www.chaos.umd.edu/misc/origplates.html, 43 pages.

Stroud, J., "RU N2IT? Text message, that is. Cell-phone companies see a $20 billion market in the shorthand language developed by teenagers and businesspeople.", St. Louis Post Dispatch, Feb. 6, 2004, 3 pages.

Troyka, L.Q., Simon and Schuster Handbook for Writers, 1987, pp. 140-175, Prentice-Hall, Inc., Englewood Cliffs, New Jersey.

BagOfNothing, "New custom Texas license plate offer lots of options", 2009. Online: Http://www.bagofnothing.com.

DMV_Virginia personal license plate: [online] https:/www.dmv.virginia.gov/dmvnet/plate_purchase/select_plate.asp. 2008.

Michael, "Dictionary of Custom License Plate Terms", retrieved from "www.archive.org", 2005.

Blog, decode licenseplates, online, "http:decrypt-licenseplate.blogspot.com", 2006.

Dictionary of custom license plate terms, [online] http://www.baac.net/michael/plates, retrieved from Archive.org, archived date: 2011.

Custom Vanity License Plate Search Results [online] www.coop18z.com, published 2005.

* cited by examiner

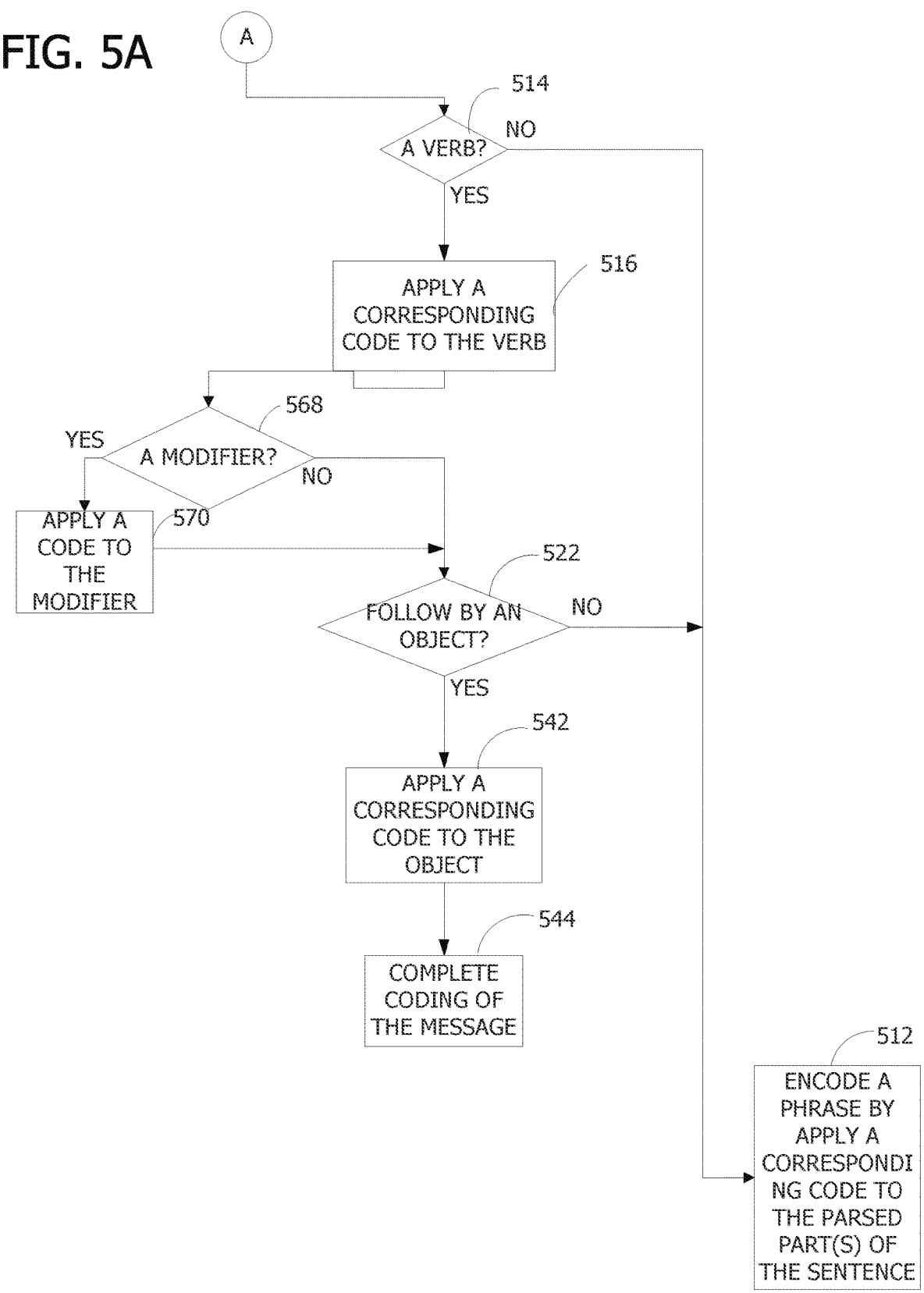

METHOD FOR CODING A VANITY MESSAGE FOR DISPLAY

CROSS-REFERENCE TO RELATED APPLICATIONS

This application is a continuation-in-part of U.S. patent application Ser. No. 16/380,103, filed Apr. 10, 2019, which is a continuation-in-part of U.S. patent application Ser. No. 15/175,530, filed Jun. 7, 2016, now U.S. Pat. No. 10,303, 746, which claims the benefit of U.S. Provisional Patent Application No. 62/173,136, filed Jun. 9, 2015, and U.S. patent application Ser. No. 15/175,530 is a continuation of U.S. patent application Ser. No. 15/072,045, filed Mar. 16, 2016, which is a continuation of U.S. patent application Ser. No. 14/138,986, filed Dec. 23, 2013, which claims the benefit of U.S. Provisional Patent Application No. 61/740, 791, filed Dec. 21, 2012, the contents of which are incorporated herein by reference in their entirety for all purposes.

TECHNICAL FIELD

Embodiments of the present invention relate to the field of coded and compressed message communication. In particular, the embodiments of the present invention relate to coding of a sentence or other text message to form a coded message and/or a compressed text message on a display space.

BACKGROUND

Over the years, human languages have evolved to adapt to communication in a shortened or abbreviated form. For example, with the popularity of instant messaging (IM) on the Internet, the use of relatively simple abbreviations of names and places has expanded to the user of abbreviations for more complex expressions. Expressions such as "You are cool," for example, may be phonetically shortened or abbreviated as "U R Cool".

The notion of personalized merchandise or goods also expands the application of these abbreviated or "coded" messages to different display media types. For example, vanity or personalized license plates no longer simply display the initials of a person's name. Instead, license plates may be used to communicate individualized expressions. Within the limited space of a vehicle license plate, individuals use a combination of their creativity and phonetic characteristics of message to express a desired message. For example, a personal coded message such as "LV" in the expression "I LV U" means "LOVE" as in "I LOVE YOU," while commercial messages such as "OPEN24-7" may be interpreted as "We are open twenty-four hours a day, seven days a week." These shortened messages also appear in other display media such as, phone numbers, (e.g., 1-877-WORM-FREE or 1-800-CALL-ATT) or the like, some of which have a limited number of characters or spaces to display the messages or expressions. Such messages describe the words phonetically and in its entirety (i.e. as they are). These messages are also based on simple sentences often containing three or four words.

Presently, if a person desires to get a personalized or vanity license plate number communicating and/or expressing a sentence or a message, the person has to follow the requirements of the Department of Transportation (DOT) or other governing body of the particular state in which the person lives. For example, the state of Missouri first requires that each license plate has a maximum of six-character spaces with six alphanumeric characters. In other states, such as Illinois, the maximum number of spaces is seven. Unfortunately, even seven-character spaces do not allow a person to compose many coded sentences or messages, particularly a complex sentence and/or multiple words. This is a major restriction or limitation for current phonetic coding or abbreviation method. The details involved in creating a phonetically coded personalized automobile license plate can be found at eHow.com under "How to create a personalized license plate".

Due to the unique nature of a license plate, many States DOT require that a given vanity/personalized license plate can be assigned to only one vehicle. For example, in Missouri, vanity plates such as "IM-TAKN" (meaning "I am taken") or "LVU-DAD" (meaning "Love you, Dad") can be assigned to only one vehicle. Thus, this restriction prohibits several people from expressing the same message through their personalized vehicle license plates. Moreover, space requirements on license plates and the like limit the number of possible combinations of letters and numbers available for expressing a message phonetically. As an example, phonetically expressing a desired message such as "Our children are wonderful" on a license plate and satisfying space/number of characters requirements would be practically impossible. As a negative economic consequence, the number of vanity license plates issued by a given State DOT is thus limited and the revenue generated to that State is also limited.

Also, many messages for license plates are written or abbreviated based on arbitrary or personal rules. A dictionary of commonly used vanity automobile license plate terms can be seen at the World Wide Web baac.net/michael/plates/. Note this is merely a collection of terms used in vanity plates. Since the arbitrary or personal rules are not readily known, in many cases, the general public is often unable to know the meaning, or the message being communicated. In another case of a personalized plate (e.g., "IMWTIM"), although one may be able to guess the possible meanings of the message being communicated, in many other examples, one does not easily understand the meaning of the message being communicated, except for the owner of the vanity plate or when the owner shares the information.

In the area of personalized license plates, there are other regulatory limitations to be considered. As an example, the DOT may make a determination whether or not a particular message is objectionable to the general population before allowing its use on a license plate. For example, persons may express certain messages orally and/or privately but may consider them unsuitable to express in writing or in public. Even if a message is not necessarily objectionable (e.g., "my wife is sexy"), one may be uncomfortable openly or explicitly expressing these feelings in writing through a personal display medium such as the current vehicle license plate system or a T-shirt. Other problems can arise when messages have sexual connotations or express views on a particular ideology. For example, a person may wish to say that s/he hates the Republican or Democratic Party. The state government procedures or even informal rules of decorum may not allow one to express such feelings through current personalized license tags. Similar regulatory agency-imposed space limitations may be found in many other countries, such as Canada, Germany, or Japan.

Additionally, due to display space limitations, one may not be able to completely display messages expressed in sentences containing many words. Even if the message is displayed, probably in small letters on a display space, as an example, a mug or a personal wear such as a T-shirt, a reader must be fairly close to the displayed space, which may not always be possible or feasible or appropriate, to read the sentences.

U.S. Pat. Nos. 4,760,528; 4,969,097; 5,305,205; 5,623,406 and 6,279,018 describe rules that are useful to the development of abbreviations of text for speedy inputs to computers. U.S. Pat. Nos. 6,377,965; 6,775,663; 6,901,364 and 7,010,478 claim information coding and retrieval systems as a part of search engine system. The U.S. Pat. No. 7,069,265 discloses a search engine system with coding information and a search method using the same. Since per above mentioned patent, a plurality of different words having similar or same meanings is coded as one standard word, this method is confusing and not suitable to unambiguously derive a code clearly communicating the desired message in the given sentence. In the U.S. Pat. No. 7,315,902, a method for compressing and abbreviating text messages by using standard abbreviations and/or known compressive transformations, and subsequent interpretation is disclosed. These abbreviation rules are complicated and mechanistic in nature. Importantly, upon expanding or reversing the shortened text message, one only gets an approximation to the original message or a list of many possible full-length versions of meanings. The compressed and abbreviated text messages based on prior art methods could not meet the government or the industry-imposed space limitations or the number of character restrictions on a personalized or individualized display space and unambiguously communicate the desired message in a coded form on such display space. Importantly the above-mentioned prior art approaches suffer a serious drawback. The coded or reduced or abbreviated character sets when decoded have multiple meanings, i.e. the coded text communicates an ambiguous meaning with multiple possibilities of subsequent interpretations. The US application (US 2007/0175073) describes a more readily identifiable license plate with an emphasis on apprehending child abductors. Thus, these prior art methods are not suitable to unambiguously create a coded message communicating the desired message for display on a personal and/or individual display space and not suitable to compress a text message into a format that could be decompressed to the original text message form without multiple meanings.

Thus, a creative, novel and practical message communication system and methods for unambiguously and non-phonetically coding a sentence or compressing a text message are desirable to overcome the above restrictions and/or similar limitations. A system and method for unambiguously and non-phonetically coding a sentence or compressing a text message is also desirable in which a set of uniform rules and guidelines is provided that can be easily practiced by many.

SUMMARY

Aspects of the present invention provide novel coding methods for anyone to create a non-phonetically and unambiguously coded message conveying a message for display on a display space. In one aspect, such a coded message provides and communicates one's desired message such as a personalized coded message (PCM) or an individualized coded message (ICM) or a coded vanity message (CVM). In another aspect, a set of inventive coding concepts, methods, rules and guidelines (e.g. in a printed or an electronic instruction manual, a rule book) described herein enables one to unambiguously and non-phonetically code one (or more) word(s) and/or a message expressed in words as a coded word or a coded message and to display the coded word or the coded message on a display space. The coded word and/or the coded message created accordingly would be unambiguously decodable, i.e. to its original form, by anyone upon applying the appropriate decoding instructions defined herein. According to one embodiment, the coded word or the coded message has one or more characters, as the code characters, comprising alphabet letters, numbers, special or unique characters, character visible features, symbols, and the like, or a combination thereof for display on a display space such as a personal display space or an individual display medium. Examples of such personal display space or individual display medium include a vehicle license plate system (such as vehicle license plate, plate holder, frame); a telephone number system (such as standard phone, cell phone, iPhones, fax machine, a telephone book, and the like); a card (such as a bank issued credit or debit or ATM card) system; a programmable consumer electronic device including a PC, a handheld device such as a Smartphone, each device capable of communicating and with a display space; a personal display medium (such as personal wear such as T-shirts, sweaters, ties, aprons and the likes, personal phones, PCs, personal cards and the like); engraved materials such as mugs, cups, key chains; printed display space or materials (such as clothes, pumper stickers, business cards, checks, letter pads, bags, chairs and the likes); e-mail addresses; and the like. Further embodiments relate to a novel concept whereby a distinct indication or a notation or a reference or a special marking (e.g., the abbreviation "CM" for "coded message" or other abbreviations of the coded messages of different classes such as "PCM" or "CVM" mentioned earlier, a different or distinct marking such as a "star" i.e. "*", or one (or more) unique or special character(s), or one or more character visible features, and the like) on the display space, and/or optionally as a part of the coded message, is used to indicate or convey that the displayed message is a coded message, as an example, an unambiguously and non-phonetically coded message. Here, when displayed on a display space, the special marking or the notation and the like could optionally be inside a shape symbol such as a circle as in the case of the superscript "TM inside a circle" when used as a part of "Trademark" and as an integral part of the display space.

As an embodiment, the term "unambiguous" or "unambiguously" when used in the context of this invention shall have the meaning that by applying the disclosed inventive coding and/or decoding instructions, i.e. the inventive coding and/or decoding methods, concepts, rules and/or guidelines described here one could define or create a code or a code block or a coded message and/or clearly interpret the code or the code block or the coded message, i.e. decode the code or the code block or the coded message to the original form, and/or understand the meaning of the message being communicated by the code or the code block or the coded message and without the possibility of multiple interpretations or meanings, i.e. decoded to its original form. The term "code" used as in "a code" or "codes" or "code block" shall refer to one or more of the coded forms such as a code, a code block, a coded word(s), a coded component part(s) of speech or a sentence, a coded sentence, a coded message and the like. The terms, "unambiguously coded message/form" and the like used herein mean that the coded message/form communicates the message as described in the sentence or in words without the possibility of multiple interpretations or meaning. The terms, "coded message" or "coded message form" or "coded form" shall refer to one of the different types of codes or code blocks or coded words or coded component parts of speech or coded messages derived by applying the disclosed inventive coding concepts, rules, steps, methods, guidelines, and/or instructions and include a coded message such as a coded vanity license plate message, or a coded vanity telephone number message, or a personal or individual based coded message, communicated via, or displayed on, a display space such as a personal card, a vehicle license plate system, a telephone number system, a printed personal wear, a printed material, an engraved matter, a programmable consumer electronic devise (such as a personal electronic communication device such as a PC, a desktop, a laptop, a handheld device including an iPod, an iPhone, and the like), a coded vanity e-mail address and the like. Here, the terms "display space" and "display medium" are used interchangeably referring to the disclosed examples. For the details of Section A and Tables I to IX in Appendix B referred to in this application, see U.S. patent application Ser. No. 16/380,103, filed Apr. 10, 2019, the contents of which are incorporated herein by reference in their entirety for all purposes.

As one of the intended purposes, the present invention overcomes the above mentioned restrictions and other limitations by providing novel methods to unambiguously create a non-phonetically coded message of the desired message and communicate the derived coded message by conveying it via or displaying it on a personal or individual display space or medium, such as a vehicle license plate system, a telephone number system, a vanity card system, a programmable consumer electronic device such as PC, Smartphone and the like, a personal printed matter (such as a personal wear including T-shirt, sweatshirt, sweater, sportswear, apron, tie, and the like, a check book, a stationery, personal greeting cards, and the like), and e-mail address. The coded message derived per this invention, or at least a part of it, i.e. a coded word or a code block, could be displayed on a display space in one of the many ways including in a single or multiple lines, horizontally, vertically, or sideways, or inside a geometry shape such as a circle, square, rectangle and the like, or at the top, in the middle, at the bottom, or at a side, or at a corner of the display space, and/or in combination thereof and/or with one or more other display elements to contrast and/or enhance its use, benefit and/or applications. The code characters in the code or the code block or the coded message, or the geometry shape could be displayed on a display space in a color that is pre-selected as a code character distinguishing feature.

Aspects of the present invention also provide unambiguous and non-phonetic message coding methods that can be practiced by anyone and uniformly applied across a region or a country (e.g., North America, USA) or a continent (e.g., Europe) by following the coding rules and/or guidelines described herein. In addition, aspects of the present invention describe methods to create and communicate a desired coded message in a non-phonetically and unambiguously coded form while complying with a commercial enterprise or a government agency, i.e. a regulatory agency, imposed limitations for the display space or the number of characters restrictions on the display space such as the vehicle license plate, bank (i.e., credit, debit and ATM) card system, phone number system, e-mail addresses, and the like. As one of the intended purposes, this invention thus provides methods for increasing the revenue generated by the regulatory agencies and the commercial enterprises. One such example involves the State DOT to generate revenue, otherwise not available, to the State by issuing more vanity license plates displaying the coded messages created by applying one of the disclosed inventive instructions, i.e. the novel coding methods, guidelines and concepts disclosed. Another example could be the licensed commercial enterprises, such as the telephone companies, authorizing for fees the use of vanity telephone numbers/systems displaying the coded messages created by applying one of the disclosed inventive instructions. According to another aspect, to further increase the revenue generated, the unambiguously and non-phonetically coded message could include, and optionally as a part of it, a distinct message sequence designation and/or another different distinguishing designation allowing more than one person and/or unrelated different parties or a display space or medium belonging to more than one person and/or unrelated different parties to display and communicate essentially the same message, as the coded message. This message sequence or distinguishing designation optionally may appear at the end or at the beginning of the coded message. As one of the intended purposes of this invention, one embodiment describes a method of providing a non-phonetically coded message unambiguously conveying one's message per this invention expressed in a sentence or words and with a maximum of eight or seven or six or five or less number of code characters, enabling one or more than one person, or one or more than one personal display space to display and communicate the same message by including a distinct message sequence designation or distinguishing sequence designation to each of the displayed coded message or the display space, and staying within the requirements of regulatory agencies such as the DOT of a state or the number of characters restrictions imposed on the display space. As another embodiment, this invention by including a distinct message sequence designation or a different message distinguishing designation to each of the displayed coded message represents a unique and novel method of communicating a desired message expressed in a sentence or words through an unambiguously and non-phonetically coded form by one or more than one person or unrelated parties on his/her/their personal display space and each one being distinct from the other and satisfying the space or the number of characters or other requirements of the display space. In another aspect, a personalized or an individualized identity code or coded message is created by adding one or more personal or individual specific information (optionally in a coded form) to a non-phonetic and unambiguous personal/individual coded message. Examples of such personal/individual information could include the date, month and/or year of birth, gender, location of where the person was born or is from or now lives, color of skin, eyes, hair or a similar description of another personal or individual specific feature and the like.

In one aspect of the invention, the coded message has a predetermined minimum number of characters and a predetermined maximum number of characters. The term, "character" when used in the context of a code or a code block or a coded message generally refers to the code character(s) in the code or code block or coded message. For the coded message, the predetermined minimum number of characters could be at least one and the predetermined maximum number of characters could be up to about twenty. For example, the minimum number of characters for the coded message could be two, three, four, five, six or seven. The maximum number of characters for the coded message could be a number selected from three to twenty. As an example, the maximum number of characters for the coded message could be three, four, five, six, seven, eight, nine, ten, eleven, twelve, or low teens. In another aspect of this invention, the maximum number of characters for the coded message could depend on the display space requirements and/or the number of characters limitations. In another aspect of the invention, the display space has a predetermined minimum number of characters and a predetermined maximum number of characters. The predetermined minimum and maximum number of characters for the display space depends on the display space under consideration, and ranges from about one to about twenty, and in some cases such as a personal display space such as a personal wear, a personal electronic communication device including PC, Smartphone and the like, or a printed matter, the number of characters could be as few or as many as necessary to display or communicate the coded message. For example, the predetermined maximum number of characters for a vehicle license plate as the display space could be one to twelve based on the particular state or region in a country, and most likely three to ten. Similarly, the predetermined maximum number of characters for the telephone number system as the display space could be from three to eighteen, and most likely from four to fifteen. For a bank card as the display space, the predetermined maximum number of characters could be from three to twenty and most likely from four to sixteen. In one aspect of the invention, the maximum number of characters for the coded word or code block or coded message to be displayed on a display space such as a car license plate or a telephone number system or a bank card system or an e-mail system could be the same as or less than the predetermined maximum number of characters permitted for the respective display space.

An instruction manual in a printed form such as a book or in an electronic version such as an App or a computer-readable medium such as an electronic file manual or a software program explaining the inventive coding concepts and methods discussed, and including the inventive coding instructions, i.e. rules, steps and guidelines with example tables could be provided for unambiguously defining the characters in each of the codes or the code blocks corresponding to one or more of the component parts of speech and creating an unambiguously and non-phonetically coded message. Optionally a record manual known in the art including a computer-readable medium such as an electronic file manual or an electronic database, maintained by an entity such as a commercial organization or a university or a government agency, could record the details and information about the codes and the coded messages, and the corresponding sentences or the words representing the communicated messages that have been coded as the codes or the coded messages, and the details regarding the display spaces displaying the coded messages for record keeping purposes. The collected information in such a record manual, as needed, could be made accessible and retrievable for decoding purposes.

In accordance with one embodiment of the invention, a manual including a computer-readable medium, such as a software program or an App, comprises defined set of inventive coding instructions incorporating novel coding (and decoding) concepts, steps, rules and guidelines disclosed herein for defining (and decoding) one or more code characters in a code for one or more words representing one (or more) component part(s) of speech, or a set of words, or one or more words in a sentence communicating a message per this invention. As an extension of the above embodiment and as another aspect of the invention, a computer-readable medium, such as a software program or an App, comprises computer-executable inventive instructions describing novel coding and decoding concepts, steps, rules and guidelines disclosed herein for providing a non-phonetically and unambiguously coded message communicating a message per this invention, expressed in words or in a sentence, for display on a display medium or space, and for decoding the coded message and unambiguously re-generating the message expressed in the words or in the sentence. When executed, the pre-defined inventive coding instructions provide for parsing the words or the words in a sentence expressing a message into one or more component parts of speech wherein each component part of speech is represented by one or more words. One or more groups of related words including the said one or more words representing one or more component parts of speech are identified and/or selected applying the pre-disclosed criteria. The pre-defined/selected groups of related words including the said one or more words are assigned one or more characters representing the sequence designation or an ordering scheme of the words among the pre-selected group of related words based on one or more pre-described criteria or concepts. A first code or code block corresponding to at least one word, or one (or more) word(s) representing one component part of speech, is unambiguously defined with one or more code characters wherein one of the characters may be the starting alphabet letter(s) of the word representing the given one component part of speech, or the pre-determined, i.e. the pre-assigned character representing the sequence designation or an ordering scheme of the word among the selected group of related words representing the given one component part of speech. One or more other codes or code blocks corresponding to one or more other words, or one (or more) word(s) representing one (or more) another component part(s) of speech are unambiguously defined with one or more code characters wherein one of the characters may be the starting alphabet letter(s) of the word representing the given another component part of speech, or the pre-determined character representing the sequence designation or an ordering scheme of the word among the selected group of related words representing the given another component part of speech. At least the first one code or code block and/or the one of the other codes or code blocks are/is non-phonetically coded per this invention. The code (or the code block) representing a component part of speech has, optionally or additionally as a part of one or more code characters in the code (or the code block), one or more pre-assigned unique or special characters pre-defined as the code distinguishing or specific feature for the code representing the given component part of speech, and/or one or more pre-assigned character visible features pre-defined as the code character distinguishing or specific feature for the code characters in the code representing the given component part of speech. The one or more other codes or code blocks follow the first code or code block. The first code or code block and/or the one or more other codes or code blocks, as distinct codes or code blocks separated by a recognizable means, form a coded message. The first code or code block and the one or more other codes or code blocks have no fewer than a predetermined minimum number of characters and no more than a predetermined maximum number of characters and indicating the message they communicate is a coded message. The display space or the displayed coded message includes a special marking or a distinct indication or a notation or a reference or a marking on the display space or as a part of the displayed coded message indicating that the displayed message is a non-phonetically and unambiguously coded message and of a particular type or a specific class of coded message. The application of the appropriate decoding, i.e., the reverse of the applied inventive coding, instructions and rules decodes and unambiguously regenerates the one or more words representing the component parts of speech, and/or the sentence or the words communicating the coded message. As an extension of the aspect of the invention, the novel computer-readable medium, such as a software program or an App, with the computer-executable inventive coding instructions per this invention, optionally and/or additionally, includes, as a novel data security element, a logical security feature and/or a digital signature and/or an identity code of the user or the owner of the computer-readable medium, i.e. password, as an example, the novel personalized or individualized identity code created by applying the novel coding instructions described herein, built into the medium to ensure reliable, secure and safe communication/sharing of the codes or the coded or the decoded messages between more than one person or a group of persons.

As an embodiment, aspects of the invention comprise various novel coding concepts, methods, and apparatuses for non-phonetically and unambiguously coding one or more words representing a component part of speech or sentences communicating messages per this invention and the uses of such derived coded words or messages for displaying on display spaces. As an example, a personal message code or an individual message code, created according to methods described herein, is converted into a numerical/symbol code (e.g., using the alphabets and number connection and symbols as in a phone dial pad) and/or incorporated into an identification coding system. As another example, a novel individualized or personalized identity message or code created by applying the coding methods described herein is used or incorporated as is or after converting into a numerical/symbol code by applying the disclosed inventive instructions into a computer-readable medium such as a software or an App as a component of the digital signature or the identity code of the individual/person such as a password, or an identification coded system such as the driver license, a company issued identification card/badge and the like, or the logical security features used in IT field. As an embodiment, above cited individualized or a personalized code or coded message, i.e. a personal message code or an individual message code, or the corresponding numerical/symbol code may be used by an individual or a person on one or more of, or all of, the disclosed individualized or personalized display spaces such as a vehicle license plate system, a personal card including a bank card, an e-mail address, or another personal display space including a personal electronic communication devices such as a laptop, an iPhone and the like, or a personal wear, or a set of land based telephone and/or mobile/cell phone numbers as his/her/their unique and distinct individualized or personalized message code or as the unique digital (identity) signature of the individual or person in other suitable applications.

Key inventive message coding features will be in part apparent from the following embodiments as examples and in part as pointed out hereinafter.

As yet another embodiment, one (or more) text communication(s) could be compressed into a compact abbreviated format by an individual in a computing system environment including a desktop or laptop computer or a personal electronic communication devise such as a cellphone or an iPhone or an iPod, or a handheld device, or the like by applying the stored inventive coding instructions, coding concepts, steps, rules, methods, and guidelines disclosed herein to the words or the sentence in the one (or more) text(s) communicating a message or information and displayed by the individual on his/her/their computing system display space and/or communicated to, or shared or exchanged with one (or more) other individual(s) via his/her/one's and/or one (or more) other individual(s)'s computing system including electronic communication devices such as a computer or a laptop or a desktop or a cell phone or an iPhone, or a handheld device, or the like, and understood by the individual receiving the compressed compact message by unambiguously decoding the compressed compact message received by applying the inventive decoding instructions, methods and guidelines disclosed herein stored in a software program or an App stored in his/her/one's computing system under consideration and displaying the decoded one (or more) text communication(s) in its original form on the computing system display space.

In accordance with another aspect of the invention, a device incorporated with a computer-readable medium, such as a software program or an App, in a computing system environment describing stored computer-executable inventive decoding method instructions for unambiguously decoding a non-phonetically and unambiguously coded message displayed on a display space conveying a message expressed in a sentence, executes the decoding method instructions comprising, scanning, including taking a picture of or viewing or reading the displayed coded message, or receiving the coded message from another device; and applying the stored inventive decoding method instructions to the scanned or received coded message; and unambiguously decoding the coded message; and displaying the decoded message in its original sentence form on the device display space.

BRIEF DESCRIPTION OF THE DRAWINGS

FIGS. 5 to 5A are flow charts illustrating an exemplary method for coding a message according to an embodiment of the invention.

Corresponding reference characters indicate corresponding parts throughout the drawings.

DETAILED DESCRIPTION

Figure 1:
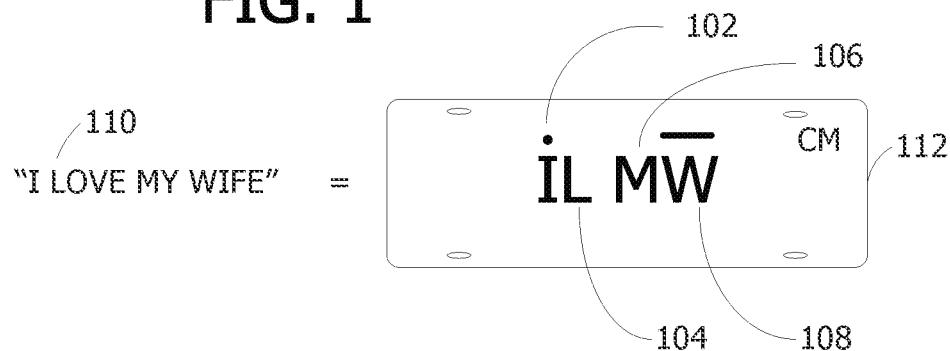
FIGS. 1 to 4 are block diagrams illustrating exemplary sentences and their corresponding coded messages according to an embodiment of the invention.

Embodiments of the present invention describe many novel coded messages, communication coding concepts, message coding methods and their applications. Here, the term, coded message, has the meaning, namely, a message communicated by one or more words, or a sentence consisting of one or more words wherein at least one of the words would be a coded word and coded by one of the inventive coding concepts and methods disclosed herein. As one of the intended purposes of this invention, one embodiment describes a novel method of non-phonetically and unambiguously coding the word(s) or a sentence consisting of words for display on a display space wherein the words convey a message.

A typical sentence may consist of one or more different component parts of speech, such as a subject such as a noun/pronoun, a verb, a modifier such as an adjective or an adverb, an object, a conjunction, a preposition and the like generally used to construct a sentence and a given component of speech may be represented by one or more words. The "modifier" may be a word or words used as an adjective or an adverb or a complement or a preposition or the like used to modify another word or words representing a component part of speech, as an example, a subject or an object or a verb and the like. Here an adjective normally modifies a noun/pronoun and an adverb normally modifies a verb and the other component parts of speech. The "complement" completes the description of subject and/or object and includes a subject complement and/or an object complement. As such, an example of a typical complete sentence has words representing a subject, a verb, and an object, and optionally including one or more modifiers. As sentences become long and complex, other component parts of sentence such as additional modifiers, complements, appositives, conjunctions, prepositions clauses/phrases, or the like, may be employed. For a detailed description of the different component parts of a sentence, see, for example, Chapters 6 and 7 of "Simon&Schuster Handbook For Writers" by Lynn Quitman Troyka, published by Prentice-Hall, Inc., Englewood Cliffs, New Jersey, 1987 ed., and the book, "The McGraw-Hill College Handbook" by Richard Marius and Harvey S. Wiener, published by McGraw-Hill, Inc. Fourth Edition, 1994 (hereafter referred to as "McGraw-Hill") and the book, "Who's ( . . . ops!) Whose Grammar Book Is This Anyway?" by C. Edward Good published by MJF Books, 2002 (hereafter referred to as Barnes & Noble). A message for coding in accordance with the aspects of the invention could be expressed in, or communicated by, a typical sentence, a complex sentence, or a long sentence, or one or more words optionally representing one (or more) component part(s) of speech, and in some cases by commonly used "multi-worded terms" or "a combination set of words". In one embodiment, examples of one (or more) word(s) communicating a message per this invention include word(s) representing a combination of subject or object with one (or more) modifier word(s), or one (or more) modifier(s) consisting of one or more words or a combination of set of words, and/or optionally including complement word(s).

One embodiment of this invention describes below the examples of the various messages per this invention to be communicated and/or displayed as coded messages. They include messages describing one's favorable, positive, vanity, silly, or comical thoughts, opinions, views, perceptions of oneself or another person, including a relationship based person; messages describing one's feelings such as love, affection, favorable or positive thoughts or opinion, views and perceptions, or feelings of association with or toward another person including family or personal or religion relationship based person, or a famous figure, or a place such as a city, a state or a country, or an entity such as an educational institution such as a high school, college, and an university, a for profit or non-profit organization including a business, a professional or technical or scientific association, a sports team such as a professional or a collegiate or a high school based and the like; messages conveying one's desires, wants, needs, likes and dislikes; messages communicating one's favorable or unfavorable, positive or negative feelings, thoughts, comments, opinions and the like about a person or an entity, or a topic of one's interest such as politics, sports, entertainment, one's culture, religion, language, heritage and the like, or toward famous and/or well-known figures (in politics, religion, govt, sports, entertainment etc.,) or a company or a product or a service etc. Here, the term, "entity" generally refers to a business, a product or service offered by a company, an educational institution, a for-profit organization, a non-profit group, a professional association, a sports team, or a place such as a city, a state, or a country. Among these messages, the relatively less desired messages are the one dealing with negative or unfavorable feelings, opinions, views, perceptions and the like, or one's dislike for another person or a place or an entity or a product or a service or the like. However, some of the other messages could be, as examples of desired messages, used to communicate one's love and affection for a relationship based person; one's favorable or positive or desirable feelings, opinions, views, perceptions and the like including comical or vanity in nature about oneself or toward another person including a relationship based person, a famous/well-known figure, or one's religion, culture, heritage, language, or an entity or a place or the like. Among these desired messages, the relatively highly desirable messages per this invention describe one's love and affection for a family or a personal relationship-based person; one's favorable or positive or desirable and strong feelings, opinions, views, perceptions and the like about oneself or toward another person including a relationship-based person, a famous/well-known figure, or an entity such as a sports team or an educational institution, or a place. In most cases, such highly desirable messages generally could have one of the following: "I", "We", "My", "Our", or directly or indirectly a person of interest or a name of a person of interest including a family or personal relationship based person, or a place or a name of a place, or an entity, each generating one's interest, i.e. a keen, positive and/or favorable feeling, opinion, liking, wish, preference, and the like, as either the subject or the object of the sentences conveying such highly desirable messages per this invention.

In accordance with another embodiment of this invention, examples of text(s) message(s) or information that could be compressed into a compact and/or an abbreviated format by applying the disclosed inventive coding concepts, instructions, rules etc., include, in addition to the various types of the messages described in the above paragraph, articles, publications, books, and news information related to topics such as politics, culture, religion, education, sports, entertainment, law such as patent law, criminal law etc., business such as finance, marketing, sales, advertising etc., science such as chemistry, physics, medicine etc., technology such as engineering, information technology (IT), etc., and the likes.

As one of the embodiments, a sentence communicating a message or information per this invention generally contains one or two or three or four or five component parts of speech, also known as the component parts of a sentence, comprising of a subject (examples being nouns, pronouns and the like), a verb, an adverb, an object, a modifier and the like. Each component part of speech is represented by, i.e., composed of, one or more words. The one or more words representing the various component parts of speech in a sentence expressing or conveying or communicating a message per this invention are generally those words that are likely or suitable or desirable, i.e., commonly used per this invention, to achieve the purpose of conveying or communicating or expressing a message per this invention. According to the aspects of the invention, these component parts of speech could be identified as codes or code blocks. For example, a subject is block 1; a verb is block 2; an object is block 3; and/or a modifier is block 4. Optionally, two or more component parts of speech could be combined as a one code or a code block. As an example, the subject and the verb could be combined as one code or code block and, in some cases, including their modifiers. Similarly, the object and the related modifier could be combined as another one code or code block. The positioning of these codes or code blocks in a coded message depends on the construction of each particular sentence being coded.

As an embodiment, the method of unambiguously and non-phonetically coding, i.e. the method of unambiguously and non-phonetically defining one or more code or code block corresponding to one or more word(s) or one or more word(s) representing one (or more) component part(s) of speech in a sentence communicating a message per this invention comprises using one or more characters comprising alphabet letters (an example, an European language alphabet such as English alphabet, Spanish alphabet, an Asian language alphabet such as Japanese alphabet, Tamil alphabet), or numbers (an example, Roman numeric system), or a unique or special character such as an underline (i.e. a line or a bar under) or a line/bar (i.e. a line or a bar) over or a dot or a geometry shape character such as a circle, a square, a diamond, a triangle, a star, and the like or "^", "*", an arrow or a commonly used symbol characters such as "( )", "#", "&", "+", "~", and the like seen on a computer key board, individually or in combination, as the code characters to represent a word(s) or a component part of speech or one (or more) word(s) representing a component part of speech in a code or a code block. Thus, the word(s) in a code or code block may be represented by one or more characters and the term, "in combination", could mean more than one of either the same character or different characters, or a mixture of different characters. The same character such as an alphabet letter, a number, a special or unique character, and the like as described above used in one code or code block may be used as the code characters in another code or code block for another one (or more) word(s). As an embodiment, each character in a code or a code block or a coded message by itself represents, as an example, by its position or location or sequence or the type of another character that precedes or follows it in the code, or as a part of it includes, an inventive coding character attribute or element or feature which are explained in detail herein. Here, as another embodiment, the terms, "unique character(s)" or "special character(s)" or "unique or special character(s)" or "special or unique character(s)" are used interchangeably and would comprise, as examples of inventive coding character attributes, an underline (i.e. a line or a bar under), or a line/bar (i.e. a line or a bar) over, or a dot, or a solid or a hallow geometry shape character such as a circle, a square, a diamond, a triangle, a star, and the like, or "^", "*", an arrow, or a line with or without an arrow at either end, or a commonly used symbol characters such as "( )", "#", "&", "+", "~", and other characters such as ":", "'", and the like seen on an electronic device key board. As an embodiment, the unique or special character could be viewed as a supplemental character and an example of the inventive coding elements or features of the invention. As another embodiment, the unique or special character, as a character attribute, represents a supplemental character that could be placed in front of or after or above or below or around and considered as a part of a character, such as an alphabet letter or a number or another character, in a code or code block. Here, the alphabet letter character, as an example the English alphabet letter character, could be displayed, as an example of character attribute, in either the upper or the lower case and preferably in the upper case, i.e. as a capital letter. It is assumed that as a general rule, when displayed on a display space, the code characters may not be touching each other, i.e. the width of the code characters may not touch or overlap.

As an embodiment, the code characters such as an alphabet letter, a number, a unique or special character, a geometry shape and the like could be written or displayed under the following various character attribute options, known as the character visible features or visually recognizable characteristics, such as normally a continuous line and optionally a dotted or a hyphenated or a dashed or a combination of thereof line, and generally in a normal face and optionally in a bold (i.e. solid or thick) face or thin face, and generally in black color but optionally in different colors and optionally contrasting the background of the display space or the color of the display space. In the above context, the term "dash" means a longer version of a "hyphen". Here, the term, "color" generally includes the different shades of light or dark color, including white and black, readily distinguishable when used under a contrasting option, i.e. contrasting the background or the color of the display space, or the color of the other code characters in the displayed coded message. Here, the phrases, "character visible features", "character visible feature options" and the like used herein, have the general meaning that, when the inventive coding feature(s) is(are) incorporated into the one or more code characters as character attribute(s), they could allow the code characters to be recognizable or distinguishable as the group of one or more characters in a code for a specific component part of speech, and/or, when those one or more code characters with the visible feature(s) are displayed as a part of a code, could impart special distinguishing meaning for the code characters and/or the code, and/or imply a specific recognizable relationship or significance associated with the one or more characters in the code representing a component part of speech or with the code representing a component part of speech. As an embodiment, the geometry shapes such as a circle, a square, a diamond, a triangle, a star shape and the like, as additional character visible feature options, could be of different sizes including tiny, i.e. very small, as an example, like a dot or a smaller than normally displayed star shape, and be fully filled inside (i.e. solid or dark inside), or only have the "outline of the shape" with nothing in the remaining shape inside (i.e. hallow inside, i.e. about 90% of the shape as hallow), or be "partially filled i.e. solid inside", i.e. anywhere in between about 10-80% of the shape filled inside (i.e. unfilled or hallow at 80-10% of the shape) where the outline of the shape and the partially filled space could be of the same or of different color. As an extension of the above embodiment, the code characters such as the alphabet letters or the numbers could have their "shape area", i.e. the area defined by the outline of the shape, fully filled inside (i.e. solid or dark inside) or only have the "outline of the shape" with nothing inside the remaining shape area (hallow inside, i.e. about 90% of the shape area as hallow), or have "partially unfilled i.e. hallow inside", i.e. anywhere in between about 80-10% of the shape area as unfilled or hallow where the outline of the shape and the partially filled shape area could be of the same or of different color. Here, the term "shape area" when used in the context of "fully/ partially filled or hallow" space for a letter or a number, it means the space area within the "shape outline" of the character and not including the space enclosed by the contour/shape of the character. As an example, here, in the number character, "0 i.e. zero", the shape area in the above context includes the solid/dark area in the circular shape outline and not the white area enclosed by the circular contour of the number character. Similarly, in the letter character "P", the shape area in the above context includes only the solid/dark area in the outline shape of the letter P and not the white area enclosed by the top contour part of the letter character P. As another embodiment, when the code character, as an example an alphabet letter or a number, or a geometry shape, is "hallow inside", the outline of the shape of the character could, as additional character visible features, be thin or normal or thick (bold) face, or dotted or hyphenated or dashed or a combination thereof, and in any color, light or dark and in a color different from and/or contrasting the background color of the display space. As an aspect of the invention, when the code character, as an example an alphabet letter or a number, or a geometry shape, is "solid inside", the color of the solid inside part could be any dark color including black and white colors, and contrasting the color of the display space, and the code character(s) may optionally have, as additional character visible features, a thin or a normal or a thick (bold) outline of the shape of the character in a light or dark color contrasting the "solid" part of the character and/or of the display space, and as a normal continuous or a dotted or a hyphenated or a dashed or a combination thereof outline. As an example, the thin outline shape in a continuous normal format could be in red or yellow color when the "solid" part is in black color.

As an embodiment, the presence of one or more character visible features as a part of the one or more code characters in a code, i.e. when incorporated into the one or more code characters in a code, could imply a specific meaning or relationship or significance associated with the one or more characters in the code or with the code or with the component part of speech represented by the code. Here the terms, "one or more character visible features" and the like used herein, refer to one, two, three or four, or a number equal to the number of code characters in a code of the same character visible feature and optionally in some cases one or more different character visible features. Here the terms, "a part of the code character", could refer to a portion or section of the shape area or the full shape of or width or height of the code character, where the term, "a portion or section" could refer to, as an example, the top or middle or bottom or some in between part/section of the character, or $1/10^{th}$, $1/8^{th}$, $1/5^{th}$, $1/4^{th}$, $1/3^{rd}$, $2/5^{th}$, $1/2$, $2/3^{rd}$, $3/4^{th}$, $4/5^{th}$, $7/8^{th}$, and like fraction/ section of the character, or as another example, the top (or middle or the bottom) $1/10^{th}$, $1/8^{th}$, $1/5^{th}$, $1/4^{th}$, $1/3^{rd}$, $1/2$, and the like part/sections of the character, or as another example, $1^{st}$ $1/4^{th}$, $2^{nd}$ $1/4^{th}$, $3^{rd}$ $1/4^{th}$, or $4^{th}$ $1/4^{th}$ or a similar fraction of the character, or as another example, the left or right or in between part/sections of the character, or any combination thereof.

As an embodiment, one or more pre-selected character attributes also known as character visible features, i.e., visually recognizable characteristics, comprising displaying one or more characters in solid or hallow form, in normal or bold or thin face character outline, a "full shape" (i.e. in solid form) color such as red, brown, blue, purple, yellow, orange, green, pink, white, black, and the like, and, when character hallow inside, a continuous normal line or dotted line or hyphenated line or dashed line or a combination thereof line format for the character outline optionally in one of the above listed colors, individually or in combination, could be incorporated into one or more, optionally back to back, code characters in a code representing a component part of speech or a word representing a component part of speech to identify or define or specify the code or the one or more, optionally back to back, code characters in the code as belonging to or representing the code for the given component part of speech or the word representing a given component part of speech and to distinguish the code or the one or more code characters in the code of the given component part of speech from another code or one or more code characters in the code for another component part of speech. As an embodiment, as an example, as a part of a coded message, the one or more, optionally back to back, code characters in a code representing a given component part of speech, as an example a modifier, such as an adjective, the one or more characters in the code for the given modifier, i.e. adjective could have, as an example of the pre-selected character visible features, either the full character in a color such as red or the character outline shape in a color such as red for the full character when the shape area of the full character is either hallow or filled in, i.e. solid form, in a dark or light color and the characters shape displayed in a continuous normal line format. As another example, the one or more code characters in the codes for a another type or group of modifiers such as adverbs, the one or more characters in the code for the given modifier, i.e. adverb, could have, as an example of the pre-selected character visible features, either the full character in a color such as brown or the character outline shape in a color such as brown for the full character when the shape area of the full character is either hallow or filled in in a dark or light color and the characters displayed in a continuous normal line format. As another example, the one or more code characters in the codes for a another component part of speech such as nouns, as an example, family/personal relationship names (Table II in Appendix B), each character in the code for the given name, could have, as an example of the pre-selected character visible features, the full character in a color such as pink or orange (pink to represent the female and orange the male sex of the name), and the character outline shape for neutral family/personal relationship name code characters in a color such as light yellow for the full character when the shape area of the full character is either hallow or filled in in a dark color. As another example, one or more, optionally back to back, code characters representing a noun such as the name of different sports or professional sports teams, could have, as an example of the pre-defined character visible feature, the character shape outline in a color such as light orange color (to refer to the professional sports team) or dark orange color (to refer to names of sports) when the shape area of the whole code characters are solid inside, i.e. filled in, in a dark or light color such as black color. In other types of nouns such as the names of different professions, or the noun words characterizing oneself in a positive and/or jovial manner, the one or more back to back code characters in the respective noun codes could have a different character visible feature, as an example, one of the character visible feature examples described above in this paragraph, incorporated only in the bottom half part of the character shape (yellow color to represent the names of different professions and orange color for the other group,) when the shape area of the whole code character is solid inside in a dark, optionally black, or another dark or light color. Similarly, a number of different, but distinct from one another, variations, i.e. individually or a combination, of disclosed character visible features could be incorporated into the top half part of or the full part of either the code characters or the character outline shape where the shape area of the full code character is either hallow or solid inside in a dark or a light color, to distinguish the different types or groups of nouns such as abstract nouns, or the names of various commercial entities, well-known commercial products such as automobiles, phones etc., or the names of different groups of well-known and famous people in, as an example, sports or entertainment or Science & Technology or history or politics etc. As an embodiment, when used as a part of a code or a code block or a coded form or a coded message, the one or more code characters such as the alphabet letters, numbers and the like and a combination thereof, and in combination with one (or more) unique or special character(s) as a part of and/or one or more character visible features incorporated into the one or more code characters, could be viewed as non-phonetic code characters and as a part of non-phonetic code or code block and unambiguously communicating the message per this invention.

According to one embodiment, if there are one or more characters in the code for a word representing one component part of a sentence, as an example a subject, a noun/pronoun, a verb, an object, a modifier, a name and the like, one of the characters may refer to a or one of the starting letters, generally the first starting alphabet letter, of the word and another one of the characters may refer to a sequence designation or an ordering scheme character for the word among a group of words called "related words" or "related group of words" or "group of related words". Per one embodiment, these groups of related words are pre-selected or pre-defined by following the criteria disclosed herein and a given group of related words may belong to the same component part of speech under consideration and may begin with the same first one or more starting alphabet letters. As another embodiment, the sequence designation or the ordering scheme character reflecting the relative position for the words among the group of related words may be pre-determined or pre-defined or pre-selected, i.e. assigned, following the disclosed concepts, criteria and methods. The term, "ordering scheme or sequence designation", or "ordering scheme" or "sequence designation" or "sequence designation or ordering scheme" or "ordering scheme or sequence designation position" or "ordering scheme or sequence designation character" and the like used here represents an inventive coding character attribute and shall have the meaning that the selected group of related words or the selected related group of words or the like would be listed or arranged in an order such as a descending order or an ascending order or in one of the other sequences, each order/sequence based on the concepts, criteria or methods described in this application, and their descending or ascending order, i.e. their relative positions in the order or the sequence would be reflected, i.e. defined, by the assigned ordering scheme or sequence designation character(s), optionally one (or more) number(s), one (or more) alphabet letter character(s) or another different character or a symbol or a combination thereof. The pre-assigned ordering scheme or sequence designation character(s), as another code character(s), would generally follow the first one or more starting alphabet letter characters of the word in the code for the given word.

According to another embodiment, one of the criteria for the ordering scheme or sequence designation for a given word among the related words could be, as an example, the relative frequency per this invention, i.e. the relative likelihood or probability of use of the word among the related words per this invention for communicating a message per this invention as a coded message. If the sequence designation character is represented by a number, as an example from one to nine (1 to 9), the number could represent the ordering scheme or sequence designation among the nine related words starting with the same first one letter or two letters and so forth. Here, as an example, the word with the relative high likelihood or probability of use among the related words for one of the intended purposes of this invention, i.e. communicating a message, would be designated as 1 (one) and the word with the relative low likelihood or probability of use among the related words would be designated the number 9 (nine). The use of reverse numbering is also an option for the ordering scheme or sequence designation. This novel ordering scheme or sequence designation concept, criteria and methodology could be applied to any groups of related words (i.e. $10\text{-}19^{th}$ words, $20\text{-}29^{th}$ words, $30\text{-}50^{th}$ words etc.).

According to one embodiment, the component parts of speech in a sentence communicating a message per this invention such as subject, noun, pronoun, name of a person, name of a place, verb, object, modifier, and the like or the one or more words representing or corresponding to a component part of speech communicating a message per this invention, could be considered to be commonly used, i.e. generally applicable or likely or suitable for use, per this invention for one of the intended purposes of this invention, i.e. communicating a message as a coded message, if the sentence communicating the message or the one or more words corresponding to a component part of speech communicating a message refer to one of the following, "I", We", "My", "Our", or directly or indirectly a person or a person's name, or a place or a name of a place, or an entity, or another topic of one's interest as either the subject or the object of the sentence and/or convey a message per this invention. For examples, refer to the various sections under Appendix A. According to another embodiment, if these component parts of speech or the one or more words representing them, in the sentences starting with either "I", "We", "My", "Our", or directly or indirectly a person or a name of a person, place or an entity, or another topic of one's interest as the subject or the object, are used to convey one's messages such as desired messages such as generally positive or favorable or desirable feelings, opinions, thoughts, views, perceptions and the like based messages, those component parts of speech or the words representing them could be considered to be frequently and commonly used per this invention for the intended purposes of this invention. According to yet another embodiment, the component parts of speech or the words representing those component parts of speech, expressing one's love, affection or a desirable feeling for another person, or an individual's positive or favorable desires, thoughts, wishes, preferences toward a relationship based person or a well-known figure, or one's own positive and desirable descriptions, or one's favorable opinions, views, likes and the like for a place, an entity and the like could be considered to be relatively more frequently and commonly used or to have a relative high probability of use per this invention for the intended purposes of this invention. As an extension of the embodiment, the component parts of speech or the words representing those component parts of speech, expressing one's committed love, affection or a highly desirable feeling for another person of interest including a family or personal relationship person, or an individual's preferred positive or favorable thoughts, wishes, preferences, opinions and the like toward a relationship based person, an educational institution or a sports team, or one's positive and desirable descriptions of an entity including a product/service marketing and/or advertisement and/or promotional message could be considered to be highly frequently, i.e. with a higher likelihood of use, and much more commonly used or to have a relative higher probability of use per this invention for the intended purposes of this invention. As another aspect, the component parts of speech or the words representing them expressing generally negative thoughts or wishes or preferences, unfavorable opinions or feelings could be considered, although they convey one's desired message per one of the intended purposes of this invention, to be relatively less likely to be used or to have a relative low probability of use per this invention. Here, the term, "one's" generally refers to a person or an entity. As an embodiment, generally one's message communicated per this invention could be an expression of the past or the present or the future, and most likely an expression of the present or the current feelings, opinions, thoughts, likes, wishes and the like.

According to one of the embodiments, another criterion for the sequence designation or the ordering scheme for a given word among the group of related words may be based on the published frequency of use, i.e. likelihood of use, for the word among the group of related words. An example could be the books publishing a list of most commonly used baby names including their frequency of use data, i.e. the relative order of preference of use for a baby name among the related group of baby names. Another example is the readily available frequency of use data for many commonly used words in a language. For example, one could find the top 50 commonly used verbs or top 50 commonly used modifiers in a given language such as English or Spanish, or the top 25 commonly used positive modifiers in product/service advertisement, and the like including their frequency of use data, i.e. their order of frequency of use among the related group of words. Another example to determine the relative order of preference for, as an example, one science subject among groups of science subjects, as an example, Chemistry or Physics or Biology among the groups of science subjects could be based on the published data on the average number of graduates in each of these subjects over a specific time period, as an example, over 5 years where the higher number of graduates for a given subject reflects a relative higher preference for that subject among the other science subjects. Yet another criterion for the sequence designation or the ordering scheme for a given word among the group of related words may be based on the order of the alphabet sequence of the letter next to, i.e. the one following, the starting letter(s) under consideration, i.e. the $1^{st}$ or the $2^{nd}$ or the $3^{rd}$ subsequent starting alphabet letter character in the word among the group of related words. This criterion could be applied to the first one to nine, or ten or more related words. Optionally this approach could be combined with the above-described relative likelihood or probability of use, as an example, when there are a number of words, as an example, more than 10 or 20 or 30 and the like words, in the group of related words under consideration, or could be applied when the words in the group of related words have a similar probability or likelihood of use among them.

Per an embodiment, another concept to designate the ordering scheme or sequence designation character for a word among the group of related words is based on, i.e., a function of a unique or a specific feature/property associated with the group of related words. One of the two approaches using this concept applies, as the specific feature, the differences in the number of alphabet letter characters present in the word among the group of the related words and the other approach basing on the variation in the length of the word, taking into account the presence of non-alphabet letter characters, among the group of the related words. Yet another example of using this concept involves the group of organic chemical reactions, where the specific feature/property under consideration is the difference in the frequency of use of the various organic chemical reactions in chemical practice which could be readily found out. Thus, the sequence designation or the ordering scheme for the name words describing the various organic chemical reactions could be based on the function of the specific feature/property, namely, the difference in the frequency of use of one organic chemical reaction compared to the other organic chemical reactions in chemical applications.

According to another one of the embodiments, as another example of the criteria, the ordering scheme or the sequence designation determination for a given word among the selected group of words could be based on a function of purpose or preference for the word or a relevant feature such as the significance or the uniqueness of the word among the selected group of words. The significance or uniqueness, per one embodiment, may be related to a key attribute (as an example, the space size of or the total population in an area such as the country or a town), a significant feature (as an example, the type of, i.e. a positive or negative, message being communicated), a key factor or element associated with the uniqueness of the message being communicated (as an example, the range of expression, as an example, positive to negative expression of one's deep feelings, thoughts, liking or appreciation for a person of interest, or one's favorable to unfavorable self-description) and the like associated with the words under consideration. Here, the term "selected group of words" may refer to "related words" or "related group of words" or "combination of words or related words" chosen based on the types of classification or subject matter or purpose or preference and the like.

As one aspect of this invention, the following describes another option for determining the ordering scheme or sequence designation characters for special cases. Here, the ordering scheme or sequence designation is based on the significance or uniqueness of the "combination of words" among the related sets of "combination of words" under consideration optionally pre-selected on the basis of the desired message being communicated for one of the intended purposes of the invention. Here the related set of "combination of words" would represent two or more words included or in combination with, as an example, a verb and/or one or more selected modifiers such as a subject modifier, or an object modifier, or a verb modifier. For examples, see Tables IB and IC under Appendix B. As another aspect of this invention, as an example, the number character, one to nine, may represent a pre-determined or a pre-chosen sequence designation or an ordering scheme character for one combination of words among the selected group of combination of words. Per another embodiment, the ordering scheme or sequence designation character, as an example, represented by one of the numbers one to nine, could relate to an ordering scheme among the group of nine or less words that are related to or connected to the subject matter designation or classification central to the message being communicated, where the ordering scheme or sequence designation character is determined by applying one of the disclosed criteria to the group of words.

The next inventive step in unambiguously defining the code for a given word or the code for a word representing a given component of speech or the code for the selected group of related words representing a given component of speech is explained below in details. According to one aspect of the invention, a number such as one to nine, or an alphabet letter, as an example, an English alphabet letter or another language alphabet letter, or one (or more) unique or special character(s), i.e., one (or more) supplemental character, generally a non-alphabet letter or a non-numerical character, such as an underline (i.e. a line under) or a line/bar over or an arrow or a line with an arrow at either end or one (or more) hyphen(s) with or without an arrow at the end or one (or more) dot(s), star shape(s), or sign(s) such as """ or "+" and the like seen in a key board, or a geometry shape (solid or hallow inside) such as one (or more) circle(s), square(s), rectangle(s), diamond(s), triangle(s) and the like could be placed, individually or in combination, in front of or after or above or below or around, i.e. as a part of, one (or more) code character(s) in a code or a code block representing a given word or a given component part of speech or one (or more) word(s) of representing a given component part of speech or a sentence communicating a message as a unique or distinguishing or specific feature or aspect of the code to highlight or refer to or to define or to characterize the code as the code for, i.e. as the code corresponding to or representing, the given word or the given specific component part of speech or one (or more) word(s) of representing a given component part of speech or the sentence, or to expand a key attribute or a relevant feature or the significance of the message being communicated by the code characters in the code for, or the word(s) of, the given specific component part of speech/sentence being coded, or to specify or characterize the given component part of speech/a sentence being coded, or to indicate the function or uniqueness of the word(s) or the code characters or the meaning of the message communicated by the word(s) or the given component part of a sentence being coded. In this context, a number or an alphabet letter when used as a, or as a part of the, code unique or code distinguishing or code specific feature of a given component part of speech is considered as a unique or special character for that purpose. Here, in the above description, the "one (or more) code character(s)" could be a "single character" code for a word, or one or more characters as a part of the code, or the first one (or more) code character(s) in the code, for a word or a combination of words or a component part of speech or one (or more) word(s) of representing a given component part of speech. The "single character" could be, as an example, an alphabet letter or a number character or another pre-defined character. Here the term, "as a part of", has the generally understood meanings and could imply that the one or more unique or special characters would be in such a way in space in front of or after or above or below or around the one or more code characters in the code that the unique or special feature(s) would be considered to be a part of the one or more code characters. One example for "above" could be the space relationship the "dot, i.e. "." has on top of the alphabet letter "I" or "J" when written in the lower case form, "i" or "j" i.e. the space between the dot and the letter "I" or "J" written in the lower case form. Some of the other examples could be seen in FIGS. 1-4. An example for "around" could be the space relationship generally observed around the character and including as in the case of a sub-script or a super-script character with the base character, i.e. as in a chemical or a mathematical formula. In some cases, to satisfy the requirements and/or the limitations and/or the conditions imposed by a regulatory body or a government agency or a commercial enterprise, the unique or special character(s) could spatially be, as needed, sufficiently separate from the code character(s) but still viewed together unambiguously communicating the desired message. An example of such a requirement or a condition could be that a given State DOT may like to see the unique or special character(s) sufficiently separate, above or below or around, from their state vehicle license plate characters. One such example could be where the unique or special character(s) could be engraved or printed or displayed on a clear sheet or a transparent material and placed sufficiently separate from and/or over the license plate and viewed together with the code characters displayed on the license plate communicating the unambiguously and non-phonetically coded message. As an embodiment, this clear sheet or the transparent material with the unique or special character(s) could be a part of the license plate or the plate holder or the frame or optionally attached separately to the car frame. The "one (or more) code character(s)" could also be one (or more) character(s) and optionally including the first one (or more) character(s), such as one (or more) alphabet letter(s) and/or number character(s) and/or another code character and/or a combination thereof, as a part of the code for a word representing a component part of speech such as the subject, a verb, an object, a noun/pronoun, a modifier, an adjective or another component part of a sentence. The term, "in combination" here could mean that when "more than one" unique or special characters are used, "more than one" could be from either the same unique or special character or from two different unique or special characters, the respective examples of such more than one, here two, unique or special characters being "two hyphens" and "one hyphen and one circle". For examples of using one or more unique or special characters as the unique or specific or distinguishing features of the codes for different component parts of speech, see Appendix A and also Section A and Tables I to IX in Appendix B.

As an embodiment of this invention, the presence of one or more unique or special characters as a part of one or more code characters, as an example the alphabet and/or the numerical characters, in a code for a component part of speech or for a word representing one of the component parts of speech or for a word representing a component part of speech in a sentence communicating a message, as the distinguishing/specific/unique feature of the code representing the given one component part of speech, that is, the presence of one or more unique or special characters comprising a line/bar, an underline, a line with an arrow at either end, one or more hyphens with or without an arrow at either end, one or more dots, one or more solid or hallow geometry shapes such as circle, square, diamond, triangle and the like, or one or more star shape(s), or """, individually or in combination, in front of, or after or above or below or around or as a part of, one or more characters, as an example one or more alphabet letters and/or number characters and/or another pre-defined character or a combination thereof, optionally back to back characters, of the code for a given component part of speech could be considered as the code specific or the code unique or the code distinguishing feature, or as the specific or unique or distinguishing feature of the code, unambiguously identifying and/or characterizing the given code as the code representing or corresponding to the given component part of speech under consideration. Here, the phrases such as, "a distinguishing or a specific or a unique feature of a code" or "a code distinguishing feature or a code specific feature" or the like used here means that, as an inventive coding character attribute, the one or more special or unique characters disclosed herein, i.e. the presence of one or more pre-defined unique or special characters such as a line/bar, an underline, an arrow, a line with an arrow at either end, one or more hyphens with or without an arrow at either end, one or more dots, one or more solid or hallow geometry shapes such as circle, square, diamond, triangle and the like, or one or more star shape(s), or "^", individually or in combination, when present in front of or after or above or below or around or as a part of one or more code characters, such as one or more alphabet letter and/or number and the like or a combination thereof, optionally back to back characters, in the code, i.e. as a part of the code, for one of the component parts of speech, would unambiguously differentiate and/or distinguish and/or characterize given one code from another code, each code representing a different component part of speech being coded including a sub-group within a component part of speech, and as an example, they could characterize whether the coded name of a person is of a male or of a female or of a neutral oriented name, whether the coded name of a relationship based person is of a male or of a female or of a neutral oriented name, whether the coded name of a place is a name of a country, a region or a city, and whether the code represents a component part of speech such as a modifier or an adjective or an adverb, or a verb, or a noun, or a pronoun and the like.

Per one embodiment, the line or the underline or the bar could be a "dash" or one (or more) "hyphen(s)" and optionally may contain at one or the other end an arrow, and optionally be fully (i.e. using a longer dash line) or partially (i.e. using one or more hyphens) over or under the character, and optionally could be a single line, multiple lines one above the other, or a hyphenated line or a dotted line or a combination of hyphen-dotted line, and optionally written as a thin line or in normal face or in bold face and/or in the same color as or in a color contrasting the color of the code character or in a bright color such as red, brown, yellow, green, blue, orange and the like. In the context here, as an example, when a normal "dash" is dotted, it has 4-5 dots; when hyphenated, it has three shorter hyphens and when hyphen-dotted, it has three dots and one short hyphen. When a normal hyphen is dotted, it has 3 dots. Here, as an embodiment, since the hyphen is shorter in length than a dash (i.e. about 5% to 95% of the length of a dash), the hyphen occupies in the range of 5% to 95% of the width of the code character and generally about 10% to 80% of the width of the code character. As an extension of the embodiment, a relatively shorter hyphen may occupy about 15% of the width of the character; a relatively short hyphen may occupy about 25% of the width of the character; a normal hyphen may occupy about 40-45% of the width of the character; a relatively long hyphen, i.e. a normal dash, may occupy about 65% of the width of the character; and a relatively longer hyphen, i.e. a long dash, occupying about 75% of the width of the character. Per one embodiment, the special character such as a dot (i.e. a small solid circle), or a star shape or a symbol such as "+" or a geometry shape such as a circle or a square or a triangle or a diamond and the like could be one or more; in different sizes; solid or hallow inside; written in the same color as other code characters or in a different color, or in a normal or bold face. Here, as an extension of the above embodiment, the geometry shape characters such as circle, square, triangle, diamond may be of different sizes, each occupying generally in the range of about 5% to 60% of the width of the code character and optionally in the range of about 10% to 50% of the width of the character such as in the range of 10 to 20%; 20-30%; 30 to 40% and 40-50% of the width of the character and the standard or normal size being in the range of 20% to 30% or about 25% of the width of the code character. Per another embodiment, a specific character, such as a dot or a star or a symbol such as "^", "+" may be of different sizes each occupying generally in the range of 5% to 60% of the width of the character and optionally in the range of 10% to 50% of the width of the character such as 10-20%; 20-30%; 30-% to 40% and 40-50% of the width of the character and as the standard or normal size each occupying in the range of about 15% to 30% of the width of the character. Per yet another embodiment, a specific character such as "^" or a star could optionally be placed over or under an alphabet or a numerical code character to signify that the "code character" with the specific character "^" or "a star" over it communicates the highest significance, as an example, the superlative degree, of a selected feature such as the position in a society or beauty or a personal trait such as being the coolest, richest and the like. For examples, see Tables IA, IB, IC and II and VIIIA in Appendix B.

According to one embodiment of this invention, one general rule is to provide a coded message communicating a message per this invention with unique or special character (s) as the distinguishing or specific feature of a code, and/or character visible feature(s) as the distinguishing or specific feature of the code characters for a code, representing the given component parts of speech communicating the message in such a way that the number of the given component parts of speech in the coded message with either the code and/or the code characters distinguishing or specific features being as few, i.e. minimum, number as possible and sufficient to unambiguously communicate the coded message taking into account the presence of a special marking conveying that the displayed message is a coded message and of a specific type or class of coded message. For examples applying this general rule see various sections under Appendix A and Appendix B. Per another embodiment, as one of the goals of this invention, the code for a word(s) or a sentence expressing a message per this invention may preferably have the minimum possible number of characters. Similarly, the code for a word, whether it represents a subject, noun/pronoun, name, verb, object, modifier, and the like may preferably have as few characters as possible. Accordingly, as another one of the goals of this invention, one aspect is to provide a non-phonetically and unambiguously coded message conveying a message per this invention with as minimum number of characters as possible so that more than one person or one display space could communicate the same message as his/her/their coded message and be within the number of characters limitations and/or space restrictions imposed by the display space or a regulatory agency and still each full/complete set of code characters being different and distinct from another by including a specific message sequence designation or another distinguishing designation character to each of the coded message.

According to one embodiment, as one of the special coding rules designed to achieve the above mentioned goal of keeping the number of code characters in a code to a minimum, in the case of the starting specific subject words per this invention that have a higher probability or likelihood of use, i.e. much more commonly used, to communicate a message per this invention, such as "I", "We", "Our" or "My", their corresponding codes could be designated by a single character, and in most cases their first starting alphabet letter and optionally with a "dot" or another special or unique character such as a very small solid circle above or below the corresponding single character as the pre-defined code distinguishing or specific feature. Per another embodiment of this invention, as another special coding rule, the most commonly used verbs or modifiers, i.e. those with relatively a higher probability or likelihood of use to communicate a message per this invention could be given priority over other related verbs or related modifiers that have relatively a lower probability or likelihood of use to communicate a message per this invention in designating their first starting alphabet letter as the single character codes for the corresponding verbs or modifiers. As an example, the first starting alphabet letter, "A", of the most commonly used verbs per this invention, "am" and "are", is designated as their single code character for their code and similarly the single character code for the other most commonly used verbs per this invention, "is" and "love", is designated as "I" and "L", their first starting alphabet letters respectively and optionally including the pre-defined verb code distinguishing or specific unique or special character(s) and/or the pre-defined verb code character distinguishing or specific character visible features. As yet another special coding rule, depending on the uniqueness and/or the significance of the subject matter or the desired message being communicated by the word, one character may be defined as the single code character representing that word. For an example, Table II in Appendix B lists the codes of single alphabet letter characters for the family relationship or the personal relationship-based names. Here, the single character code would optionally include a pre-defined unique or special character as the relationship person name code distinguishing or specific feature. Another example could be noun/pronoun words that are commonly used with special meaning or message and a high probability of use per this invention such as God, love (as in "My love . . . ") and the like. Here, the $1^{st}$ starting alphabet letter of these words, in the above examples, "G" and "L", would be assigned as the single letter code character for the codes and optionally including a pre-defined unique or special character as the noun/pronoun code distinguishing or specific feature. Table VIIIA in Appendix B describes other similar single letter codes for special modifier words including a pre-defined unique or special character as the modifier code distinguishing or specific feature.

For examples of coding words and sentences following the complex inventive coding guidelines and rules disclosed herein, see the section entitled "EXAMPLES OF SENTENCES FOR CODING" in Appendix A.

As an embodiment, the general inventive coding instructions, i.e. coding steps, rules and guidelines, to define a group of related words and their code characters are described next. As an extension of this embodiment, the inventive coding concepts, steps, rules, methods and guidelines disclosed herein and below describe a method of unambiguously and non-phonetically coding a word in a group of related words, and a method for defining one or more code characters in the code for a word in a group of related words or one (or more) component part(s) of speech or one (or more) word(s) representing a component part of speech in a sentence describing or conveying or expressing a message per this invention and optionally communicating the derived code or the coded message on a display space. As the first coding step, the one or more words or the one or more words representing a component part of speech under consideration such as subject, noun, pronoun, name, verb, object, adverb, modifier, adjective, preposition and the like are selected or chosen or identified based on one or more of the concepts, namely, their general applicability or suitability for use, or the likelihood or probability of their use, or the uniqueness or significance of one or more words or a combination or set of words, or the intended purpose or goal, or the type of classification or subject matter, or a key attribute or an important feature and the like associated with the subject or object of the message, or one or more words representing a given component part of speech under consideration to communicate or exchange or share a message per this invention.

As the next step, the selected or chosen or identified words are grouped and/or listed in a table form or in another organized form on the basis of the starting alphabet letter(s) of the words and/or on the basis of one or more criteria disclosed herein with the following as some examples of the criteria: the intended purpose or goal of the message communicated by the words such as an expression of, i.e. one's description of, love or affection or a favorable feeling or wish or opinion or liking or the like for oneself or another person or a place or an entity or an educational institution or a sports team and the like, or the specific group/classification/type of either the subject and/or the object of the message (as examples, names of commercial entities or professional associations or sports teams or educational institutions and the like), or the uniqueness or significance of the subject or object of the message (as an example, the space size of or the total population in an area such as a country, or a list of well-known designation of countries, as an example the one used by USPTO or cities, as an example, the one used for airport designation on a world basis, or one's positive, favorable or comical self-description), or the topic of interest (as an example, a list of popular male/female first names or names of mascots of US collegiate sports teams such as Seminoles) or the scope and/or nature or the type designation of the message communicated by the words (as an example, the range of expression of one's deep feelings, liking, love or appreciation for a person of interest, i.e. a family or personal relationship and another example being the scope or nature of the message being conveyed such as positive or negative toned message describing one's thought, feeling or view for oneself or another person or an entity or the like), or the component part of speech the selected or chosen words represent, as an example, a noun or a pronoun or a verb or a modifier or the like. Generally, the selected words for each of the component part of speech are grouped on the basis of one of the above described, i.e. pre-determined criteria and the words included in the selected group of words are listed on the basis of their starting $1^{st}$ one (or more) alphabet letter(s) character which is, in most cases, the $1^{st}$ character of the code for the selected word.

As an embodiment of the invention, the selected or chosen or identified words when grouped and/or listed in a table or another organized form on the basis of one or more of the criteria as explained above, are called the related words and also referred to as pre-selected or pre-defined or pre-identified related words or group of related words or related group of words. As another embodiment, as the next step, the related words are then organized in a descending (or an ascending) order or in another ordered sequence on the basis of one of the following ordering scheme or sequence designation concepts, i.e. approaches or methods, described herein, either individually or in combination. One of the concepts to designate the ordering scheme or sequence designation for a word is on the basis of the alphabet sequence of the $1^{st}$ or the $2^{nd}$ or the $3^{rd}$ subsequent starting alphabet letter character in the word among the group of related words. One of the other two concepts to designate the ordering scheme or sequence designation for a word is on the basis of the number of alphabet letter characters in the word among the group of the related words and the other concept being on the basis of the length of the word, taking into account the presence of non-alphabet letter characters, among the group of the related words. In the case of two or more words of the same number of alphabet letter characters or the same length, then the $1^{st}$ concept, i.e. on the basis of the alphabet sequence of the $1^{st}$ or the $2^{nd}$ or the $3^{rd}$ subsequent starting alphabet letter character in the word, described above could be used to designate the ordering sequence among the words. Another ordering scheme or the sequence designation determination for a given word among the group of related words could be based on a function of purpose or preference for the word or related to the significance or the uniqueness of the word, among the selected group of words. Yet another ordering scheme or sequence designation determination could be based on the relative position of the word among the related words in terms of a key attribute. As an example, the ordering scheme or sequence designation character for the male/female first names could be based on the relative position of the given first name among the selected group of published top 10 or 20 or 50 or the like first names where the key attribute, i.e. the relative position, for the given first name is the shown/published preference for its use among the group of related first names. Yet another ordering or sequence designation approach for the selected group of words is based on the likelihood or the probability or the suitability of their use per this invention to communicate a message including a personal or a promotional message per this invention. Under this approach, the top 9 or 10 words (or more than 10 words such as the top 20 or 30 or the like) are first listed from the selected group of words. The selected, as an example, each in the first group of 9 or 10 related words could be assigned ordering scheme or sequence designation character, on the basis of the decreasing (or alternatively increasing) order of the relative probability of or likelihood or suitability of use among the group of 9 or 10 related words. As an embodiment of the invention, if two or more selected group of related words have similar relative probability or suitability or likelihood of use per this invention, another ordering scheme or sequence designation approach such as the alphabet sequence of the $1^{st}$ or $2^{nd}$ or $3^{rd}$ subsequent starting alphabet letter character approach or one of the other ordering scheme or sequence designation approaches disclosed in the application could be applied. For examples, see Tables I to VIII A in Appendix B. In general, as an embodiment, the concept of the relative likelihood or the suitability or the probability of use as explained above and/or one of the other ordering scheme or sequence designation concepts disclosed herein, individually or in combination, is used to generate the ordering scheme or sequence designation code character(s) for a word among the grouped or listed related words or related group of words. As a general rule, when possible, the same ordering scheme or sequence designation approach would be applied to designate the ordering scheme or sequence designation code character(s) for the word(s) representing the various component part(s) of speech or for the words communicating a message per this invention in a coded form or as a coded message.

As an embodiment, as the next step in defining the one or more code characters in the code for a word included in the identified or selected group of related words, if among the group of related words, there is a group of words, such as noun or verb or modifier or the like, that have a higher probability or likelihood of more frequent use per this invention, then, as explained in earlier sections, a set of special coding rules are applied assigning those words "single character codes" and the single characters are generally the $1^{st}$ starting alphabet letters of those words. For examples, see Appendix A and B. For other words, as the next step in defining the code characters in the code, each of the word included in the identified group of related words (i.e. the selected group of related words under consideration) is assigned a character, as an example, a number starting with optionally zero (i.e. generally zero is not displayed as a part of a code) or one and up to nine (or a higher number as needed) as the ordering scheme or sequence designation character for the word in the group of related words under consideration. This character, here as an example, the number character(s), as another code character(s), would generally follow the first one or more starting alphabet letter characters of the word in the code for the given word in the group of related words. Optionally, in some cases, the sequence designation code character may appear before the starting alphabet letter code character. Optionally, instead of number character(s), another type of character such as an alphabet letter or a star or a symbol or a combination of therein including the number character could be used as the ordering scheme or sequence designation character(s). As one of the general rules, the number of code characters in the code for a given component part of speech or for the given word representing a given component part of speech would be four or less.

As an embodiment, if there is more than one character in the code for a word or a coded message, one of the characters may refer to the designation or classification of the subject matter of the message being conveyed or may reflect or indicate the significance or uniqueness of the message being communicated.

As the next step in unambiguously defining the code for a given word in the selected group of related words representing a given component part of speech, as an embodiment, as the pre-defined distinguishing or specific feature of the code for the given component part of speech, one or more alphabet letter or number characters, or one or more pre-selected unique or special characters such as a line/bar, an underline, an arrow, a line with an arrow, one or more hyphens, one or more dots, one or more geometry shapes such as circle, square, diamond, triangle, and the like, or one or more star shapes, or "^", individually or in combination, would be placed before or after or above or below or around, i.e. as a part of, one or more code characters, as an example, one or more alphabet letter and/or number characters or a combination thereof, optionally back to back, in the code for the word representing the given component part of speech thus differentiating the code for one component part of speech from the code for another component part of speech.

As an embodiment, as another or optional step in unambiguously defining the code character(s) in a code, one or more pre-selected character visible features, explained with examples in the earlier sections, could be incorporated into the one or more code characters in the code in place of, or in addition to, the one or more special or unique characters and achieve the same outcome as achieved by the presence of one or more special or unique characters in the code. As an embodiment, the one or more pre-selected character visible features could be incorporated into the one or more, optionally back to back, code characters in a code, to unambiguously identify or define or specify the one or more, optionally back to back, code characters in the code as belonging to or representing the code for a given component part of speech under consideration or a word representing a given component part of speech under consideration, and as a unique or distinguishing character visible feature for the one or more, optionally back to back, code characters in the code for the given component part of speech, to distinguish the one or more code characters in the code of the given component part of speech from another one or more code characters in the code for another component part of speech.

As an aspect of the invention, a novel computer readable medium such as a software or an App, stored in a computing system environment, comprises, as computer-executable inventive instructions, the above described multiple coding steps based on the inventive coding concepts, rules, guidelines and instructions disclosed herein to non-phonetically and unambiguously code, i.e. define one or more code characters in the code for, one (or more) word(s) or one (or more) component part(s) of speech or a set of words or a sentence communicating a message per this invention. Here, the above-described multiple coding steps generally, but not necessarily always, follow in sequence. Application of one or more of the inventive coding concepts, rules, methods, including multiple coding steps and guidelines disclosed herein, and stored in a print manual and/or a computer-readable medium such as a software or an app for said purposes, would allow one to non-phonetically and unambiguously code, with as minimum number of characters and distinguishing features as possible, the given word(s) or the given various component parts of speech or the given one or more words representing the given component part of speech in a sentence communicating a message per this invention. The coded message or the codes for the various component parts of speech or the codes for the one or more words representing the various component parts of speech created by applying the inventive coding concepts, rules and/or guidelines described herein would be unambiguously decodable when the appropriate reverse coding, i.e. decoding, instructions are applied from a manual either in printed version or stored in a computer-readable medium.

The following step, as a part of inventive coding instructions stored in a print manual and/or a computer-readable medium or a software or an app for said purposes, describes novel methods by which an unambiguously and non-phonetically coded message could be displayed on more than one display spaces and still each displayed coded message being distinct and separate from the other. According to one embodiment of this invention, more than one person and/or unrelated different parties or display mediums belonging to more than one person and/or unrelated different parties could express and communicate essentially the same message, as a coded message, by adding a message sequence designation or another distinguishing designation to the coded message on the display medium. The message sequence designation for the coded messages could be displayed using alphabets letters or numbers either individually or in combination. The distinguishing designation for the coded messages could be displayed using a symbol or a special character individually or in combination with another symbol or an alphabet character or a numerical character. This message sequence or distinguishing designation character could optionally appear at the end or at the beginning of the coded message. Optionally it could be separated from the coded message by allowing a space in between them or using a dash (i.e. the long version of a line) or a hyphen (i.e. the short version of a line) or a symbol such as the star ("*") or a dot between them. Another option would be to display the message sequence or distinguishing designation in a specific color such as yellow, orange and the like and/or by incorporating one of the disclosed character visible features, as an example, the outline of the message sequence designation characters as dotted-hyphenated outline in a differentiating light or dark color. Using the vanity license plate as an example of the display medium, depending on the number of available spaces remaining after displaying the coded message there are different options for describing the message sequence or distinguishing designation. One option would be to use the available spaces to designate all available sequence or distinguishing designations on a first-come-first basis across a given region such as the State. Another option would be, using the coding principles of this invention, to designate, i.e. code, one space using the available characters such as alphabets, numbers, symbols etc. to different parts and/or sections of the given State, or an organization group or another classification and use the remaining space(s) to designate the sequences assigned to the drivers or the display mediums in the given region or group or classification.

Initially, a manual (not shown) describes the inventive coding concepts, methods, and approaches, and defines a set of coding rules and guidelines (e.g., Appendix B) and a set of code tables for encoding a sentence such as 110. For example, Table I to IX in Appendix B provide examples of the lists of codes for words such as verbs, adjectives, modifiers, names of individuals, names of places, or the like. Tables I.A, B, and C, and VIII.A also provide examples of the list of special rules for coding examples of desired messages per this invention. It is to be understood that Table I to IX are used for illustration purposes and not as a limitation.

Referring first to FIGS. 1 to 4, block diagrams illustrate exemplary sentences and their corresponding coded messages including inventive coding character attributes. FIG. 1 shows a sentence 110 stating, for example, "I love my wife." Still referring to FIG. 1, a display space 112 is used to display a non-phonetically coded message of the sentence such as 110. The display space, such as 112, may be a display space having a display space restriction comprising at least one of the following: number of character restriction, display space limitation, regulatory agency or government-imposed restriction, and industry imposed limitation including space limitation and the number of character restrictions. Examples of such display spaces include a vehicle license plate system, a vanity phone number system, a vanity card such as a credit/debit or ATM card, a programmable consumer electronic device, a personal wear, a personal or a commercial printed matter, a printed or an electronic advertisement medium, a product/service promotional product, and the like. In one embodiment, the display space, such as 112, is a space limited display space including personal printed matter such as a personal check or a stationary, or a personal wear such as a shirt including T-shirt, a sweatshirt, a sweater, a sportswear, an apron, a tie and the like, or an engraved item such a mug, a drink glass, a key chain, a belt/buckle, a bracelet, a plaque, and the like, or a personal handheld communication device such as a personal phone including mobile phone, or a personal electronic communication device such as an iPhone, a personal digital assistant (PDA), a laptop, a desktop, or the like. In another embodiment, additional display spaces having one or more of the display space restrictions include commercial printed matters such as pumper stickers, decals, business stationary, calendars, planners, print advertisement media such as an ad in newspaper, magazine and the like, product/service display banner, wall posters, booth display boards, wall pictures, and the like, an electronic marketing and/or an advertising medium including an ad on TV, a social media, and the like, service vehicles, bill boards, and product/service promotional products such as printed personal wears, bags including totes, duffels, backpacks, and the likes, drink holders including coolers, pens and the likes, rulers, caps, cups including tumblers, bottles and the likes, chairs, umbrellas, blankets, doormats, and the likes. The display spaces with the coded messages could be made following any of known the commercial and/or other manufacturing methods including 3D-printing with suitable materials, equipment and devices.

The display space 112 includes a subject code 102 "I", a verb code 104 "L", a modifier code 106 "M", and an object code 108 "W" as a coded message. As discussed above, the coded message may be divided into one or more code blocks. For example, the subject code 102 and the verb code 104 form a first code block, (e.g., "IL") while the modifier code 106 and the object code 108 form a second code block (e.g., "MW"). Note here, as explained under Tables I A and B and II in Appendix B, the code character "I" would have a dot over it preferably at the center above the code character "I", and the code character "W" for wife would have a bar/line, i.e. a dash over it preferably fully over the character. For additional examples of coding of verbs, see the section entitled "CODING A VERB" in Appendix A.

As an embodiment, each code or code block in a coded or a compressed message may optionally be displayed as a separate, i.e. as a distinct, code or code block, and distinguished from the other codes or code blocks in the coded or compressed message by an easily recognizable means. For example, two colors alternating among the codes is an option or different colors may be used for various codes/code blocks. A subject code block may be written in red, yellow or orange color while a verb code block may be in blue, an object code block may be in green, and a modifier code block may be in red, brown or yellow. In another example, one may use all upper case (if the code is alphabet letter) for one set of codes and lower case for the next set of codes. Other visually recognizable means that may be employed include a space between the code blocks, a line between the code blocks, a dot, ".", or a star (i.e. *) between the code blocks.

In one embodiment, the code characters for a word or one or more words representing a component part of speech or a component part of speech may be described as a single, distinct code or code block. As another embodiment, the code characters for more than one component part of speech, as an example, a subject and a verb, may be combined, if it enables and/or assists in clear communication of the coded message, as one code block. Generally, the subject and the verb including their modifiers, if any, in the sentence could be coded and displayed as a single code block. In the same manner, the remaining component part(s) of the sentence such as the object and its modifier(s), if any could be coded and displayed as another single code block. For example, Table IA in Appendix B is an example of coding a subject and a verb in one code block. In this example, the sentences start with the subject either "I" or "We" or "My" or "Our" and have the most commonly used verbs per this invention such as, "am", "are", "is" or "love". Also, a subject, a verb and a part of object could be combined under one code block. Similarly, words used as modifiers may be combined with a subject or a verb or an object, or another one (or more) modifier(s) in one block. For example, Table IB and IC in Appendix B are examples of coding a subject, a verb, and/or apart of object/modifier together to create a code block.

Figure 2:
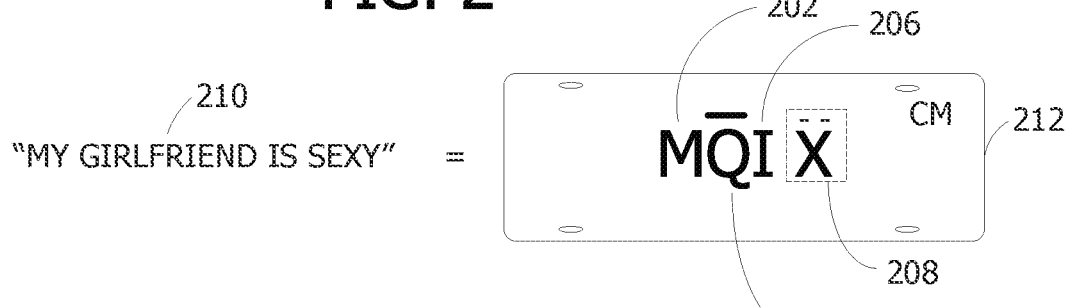

FIG. 2 illustrates another example of a sentence 210 and its corresponding coded message on a display space 212. In particular, a modifier code 202 precedes a subject code 204. For example, Tables IVA and IVB in Appendix B provide similar examples of commonly known modifiers and their codes. For additional examples of coding of modifiers, see the section entitled "CODING A MODIFIER" in Appendix A.

Figure 3:
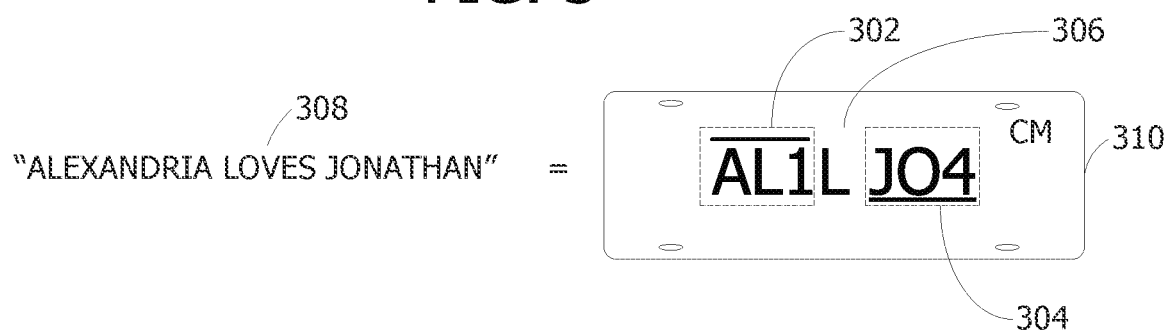

It is understood that the placement of the code may vary depending on the message to be coded. FIG. 3 illustrates an example of a sentence 308 and its corresponding code message on a display space 310. In particular, the sentence 308 shows an example of male and female first names (e.g., Alexandria for the female name and Jonathan for the male name). Tables VIIA and VIIB in Appendix B are exemplary codes for female names and Tables VIA and VIB in Appendix B are exemplary codes for male names. Note that the terms, "female name" and "male name" generally refer to the first names of female and male. For additional examples of coding male and female first names, see the section entitled "CODING NAMES" in Appendix A.

Figure 4:
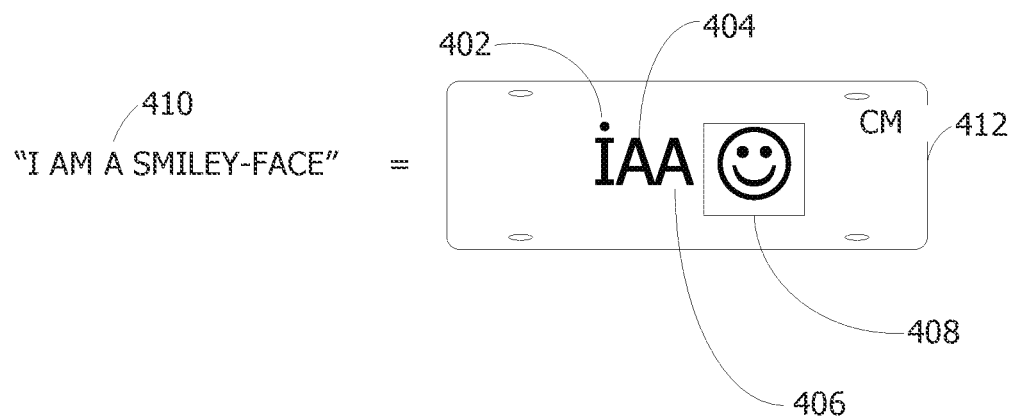

In a further example, FIG. 4 shows a sentence 410 (e.g., "I am a smiley-face") and its corresponding coded message on a display space 412. In one embodiment, a coded message including a graphical image such as a figure, an emblem, a character/symbol for a language such as Chinese, Japanese, and the like, an icon, a logo, an image, or the like (e.g., a graphical image 408) as an integral part of the coded message can be created. An example is the coded message expressing the sentence 410. As an embodiment, such coded messages could be designated as "FCM" meaning "figuratively coded messages".

As one embodiment, a special marking or a notation such as an abbreviation such as "CM" shown on the display space 112 in FIG. 1, 212 in FIG. 2, 310 in FIGS. 3 and 412 in FIG. 4 or one of the many other abbreviations for the different types of coded messages disclosed herein is displayed on a display space to indicate or designate or specify that the displayed message is a non-phonetically and unambiguously coded message, and is of a specific class or type of non-phonetically and unambiguously coded message. As another embodiment, the notation, i.e. the special marking, either "C" (to specify "code") or "CM" or the like, could be expanded by adding a number to either the right or the left side of it, as an example, a number from 1 to 9 added to the right side of it and used as another set of special or unique markings or notations to designate or specify different types or classes of coded messages. For an example, the unique marking "CM1" could be used to designate the displayed coded messages based on the sentences that start with one of the following words, "I", "We", "My" or "Our", and the notation, "CM2" to designate the coded messages based on the sentences starting with or including a person's name. As another example, the special marking "CM3" could be used to designate another group of coded messages based on one or more modifier(s) and the word being modified. Similarly the special marking "CM4" could be used to designate coded messages based on one or two or more modifiers only. Alternatively, these only modifier(s) based coded messages could be designated as "VMM" wherein the abbreviation VMM stands for "vanity modifier(s) message". Other examples of the special marking, i.e. the abbreviations by which the displayed coded message class or type could be designated on the display space include "CS" meaning "coded sentence", "CP" meaning "coded phrases", "UM"

for "unique message" and the like. As an embodiment, the alphabet letters, "A", "L", "N", "F" or "P" could be added to the right side of the special marking or indication to specify the word sequence designation or ordering scheme method used, namely, the alphabet sequence (A) of the letter next to the starting first one (or more) letter(s) under consideration, or the method based on the relative length (L) of the related words, or the method using the relative number (N) of the characters in the related words, or the method based on the relevant feature (F) such as a significant property or a key attribute among the related words, or the probability (P) of use of the word among the related words concept respectively. As an additional embodiment, a different character, as an example a number such as 1 to 5, could be added to the right side of the special marking or the notation to specify one of the above described five different methods used to determine the word sequence designation or ordering scheme employed in the coded message. Under either option, this character could optionally be separated from the other character markings by a line or a dot, the resulting examples of set of unique markings designating the various types or classes of coded messages include "CM.P" or "CM1-L", "CM1-1", "VMM-A" and the like. As one embodiment, the above cited examples of special markings such as "CM", "CM1", "CM1-L, CM1-1", "CS", "UM", "1-A or 1A", and the like disclosed herein could be written in different colors or in different shades of colors or in a different letter format or incorporating one of the character visible features and thus communicating the special marking characters refer to a coded message and optionally to one of the different types or classes or groups of coded messages per this invention. As another embodiment, another set of unique markings or designations could be one (or more) star(s) (*) optionally in a combination with a number such as, as an example, one to nine or an alphabet letter such as A, B, etc. As an extension of this embodiment, other types of special marking or notation that are unique could include a geometry shape with the coded message or a part of the coded message inside it where the shape could be such as a rectangle or square or circle or elliptical, or a special design such as a border around the coded message or a part of it, and the shape or the border could be a normal line, or dotted or hyphenated or dot-hyphenated line, and/or in thin, normal or thick/solid face, and/or in a dark or light color, optionally the same color as the predefined code character distinguishing color for the characters in the code or the coded message inside the shape, thus distinguishing or characterizing the type of coded message displayed, or contrasting the display space and/or the code characters in the coded message.

Optionally, as an embodiment, the desired special marking or the notation could be inside a shape such as a triangle, a square or a circle as commonly used to designate trademark, TM, and used in a similar manner, i.e., at the end of the coded message and right above it as an integral part of the coded message. Alternatively, it could be just below at the end of the coded message or at the beginning of the coded message right above or below. As an additional embodiment, the special marking inside a shape such as a circle or a square could be a fixed part of the display space. In a related embodiment, the notation or the designation or the special marking could be in bold face or in normal face or in the same color as the coded message or in a different color, or in the same font as the coded message or a different font size or include one of the other disclosed suitable character visible features. Optionally it could be underlined or have a bar over it. In the case of a display space such as a vehicle license plate or a bank card, the special marking or the notation, optionally inside a shape such as a circle or a square, could be located in one of the corners space of the display space and preferably near the right top or bottom corner space, and optionally occupying about 0.10% to twenty percent of the display space, and optionally about 0.25% to ten percent, and likely about 0.5% to five percent of the display space, and be a fixed part of the display space. The term "fixed part of the space" here means an integral part of the display space.

Figure 5:
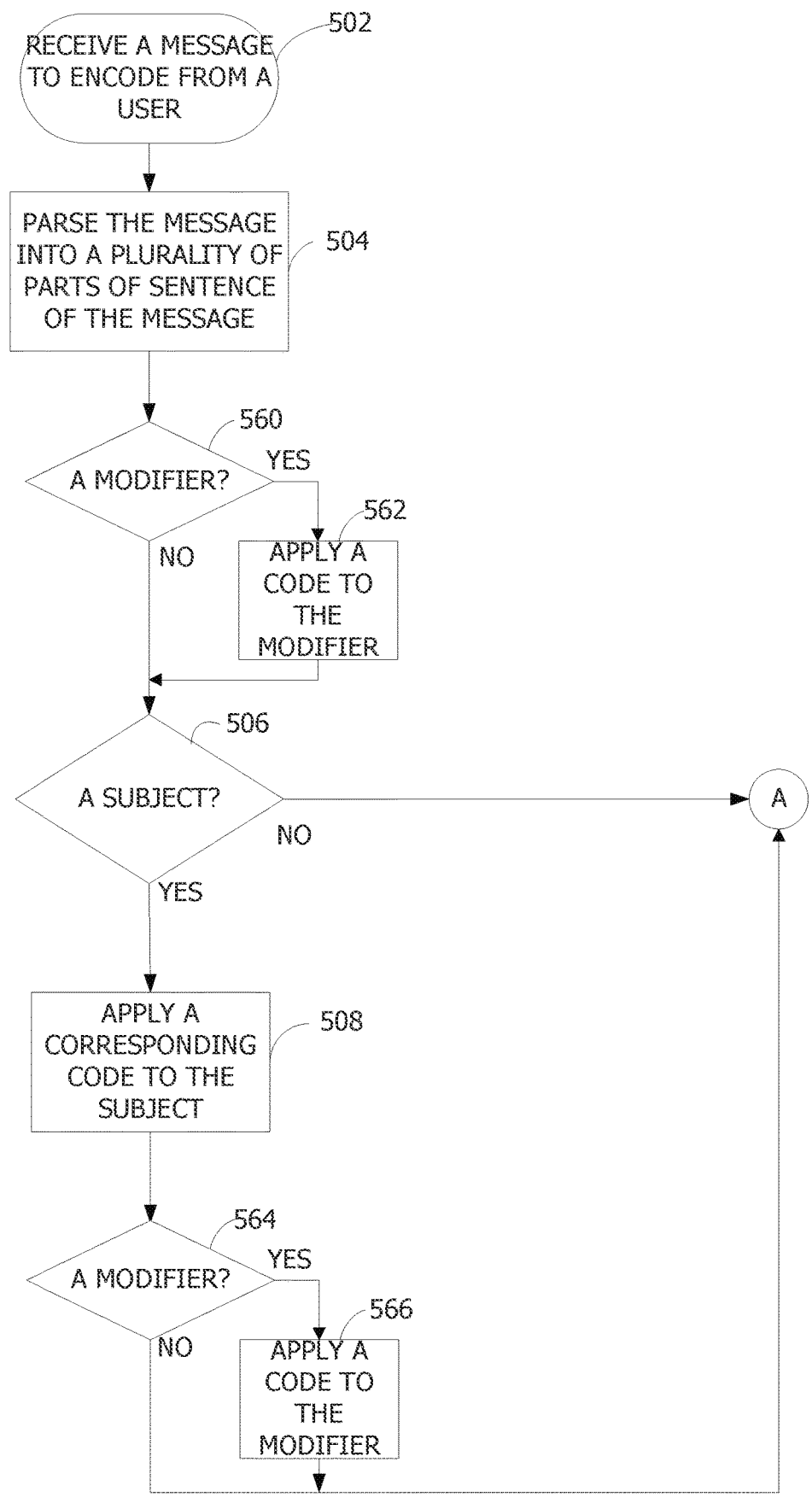
Figure 5B:
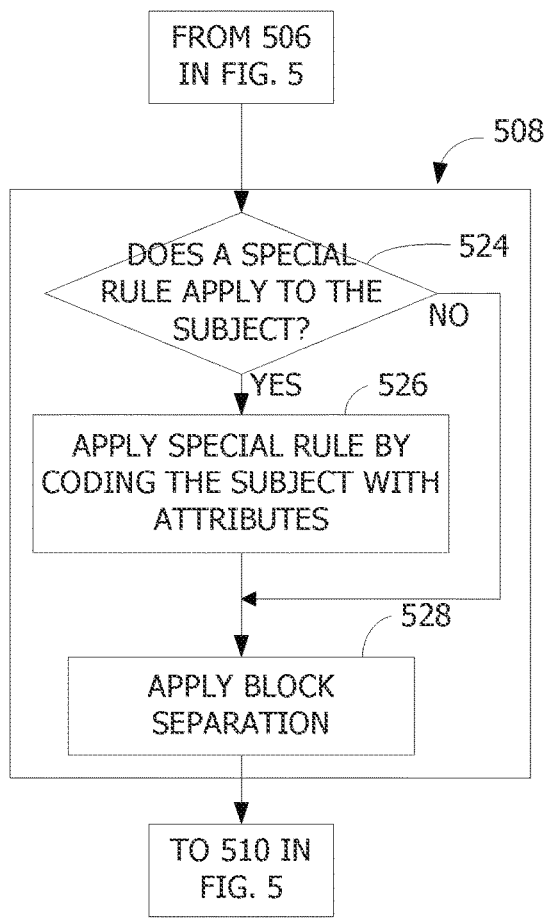
FIG. 5B is a flow chart illustrating an exemplary method for applying special coding rules to a subject according to an embodiment of the invention.
Figure 5C:
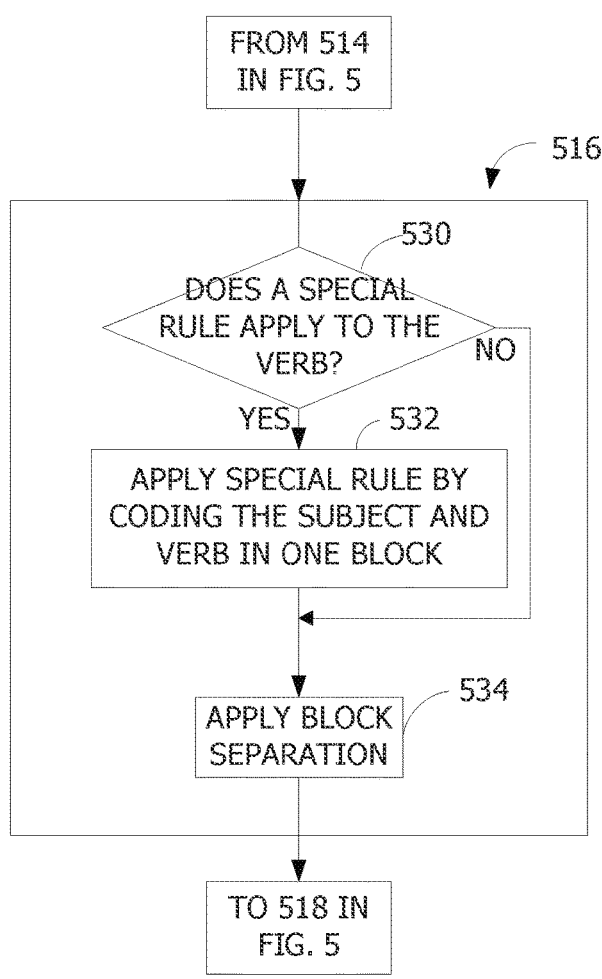
FIG. 5C is a flow chart illustrating an exemplary method for applying special coding rules to a verb according to an embodiment of the invention.
Figure 5D:
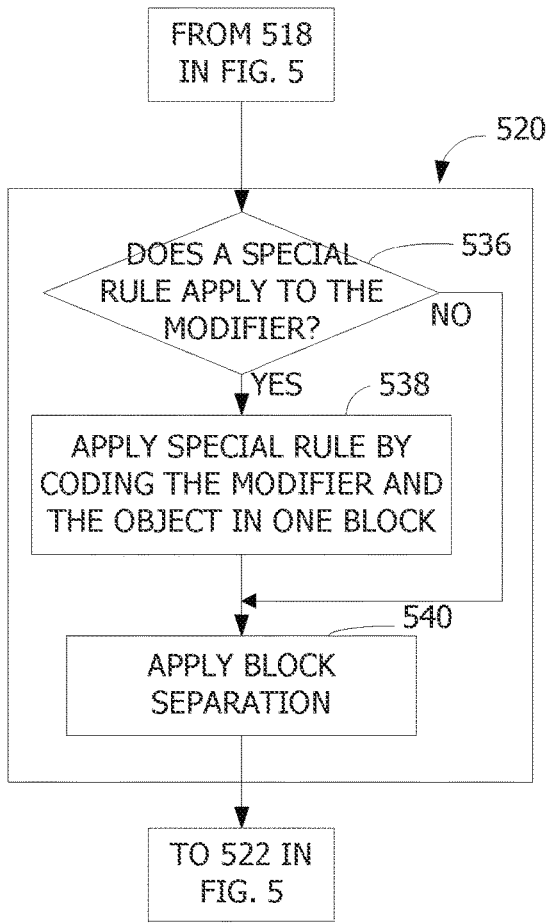
FIG. 5D is a flow chart illustrating an exemplary method for applying special coding rules to a modifier according to an embodiment of the invention.
Figure 5E:
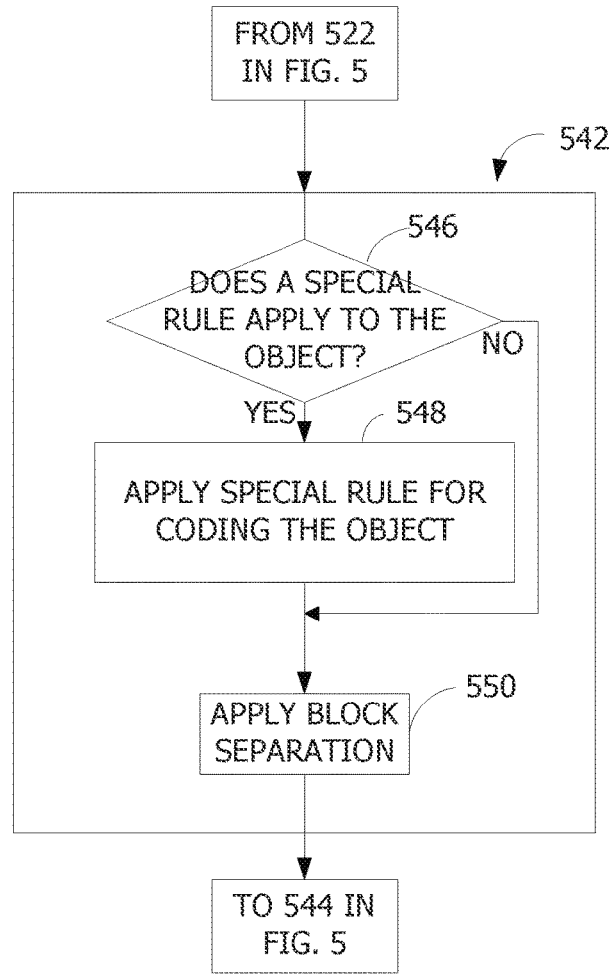
FIG. 5E is a flow chart illustrating an exemplary method for applying special coding rules to an object according to an embodiment of the invention.

FIGS. 5 and 5A are flow charts illustrating an exemplary method for coding a message. In one embodiment, a computer-readable medium, such as a software program or an App, having the disclosed inventive computer-executable coding instructions for providing a non-phonetically and unambiguously coded message may be used. At 502, a message or an expression (e.g., the sentences 110, 210, 308 and/or 410) is received for coding. At 504, the message is parsed into a plurality of component parts of the message. For example, the sentence 110 is parsed into a subject "I", a verb "love", a modifier "my", and an object "wife". Under an exemplary instruction manual and its rules, the current coding system starts encoding from the leftmost component part of a sentence to the rightmost component part of the sentence.

As such, at 560, it is to determine whether the leftmost component part of the message is a modifier. For example, the leftmost component part of the sentence 110 is not a modifier. On the other hand, the sentence 210 in FIG. 2 starts with a modifier 202 (e.g., "my" in "My girlfriend is sexy"). If it is determined that the leftmost component part is a modifier, an appropriate code for the modifier is applied at 562. Hence, "my" in the sentence 210 is coded with the character "M" (e.g., the modifier code 202). Tables IVA and IVB in Appendix B provide a list of exemplary commonly used adjective modifiers. For additional examples of relationship-based names or words, see the section entitled "CODING RELATIONSHIP BASED NAMES/WORDS" in Appendix A. The encoding method continues to 506 to determine whether the next component part is a subject.

If it is determined the leftmost component part of the sentence is not a modifier, it is continued to 506 to determine if the leftmost component part of the sentence is a subject. For example, the sentence 110 has "I" as the subject. Accordingly, "I" is applied to the subject code 102 for the subject "I" in the sentence 110 at 508.

In another example, the sentence 308 in FIG. 3 includes a leftmost component part of the sentence that is a subject (e.g., "Alexandria"). As such, "AL1" is applied to the subject code 302 for the subject "Alexandria" in the sentence 308. Also, because the subject 302 is a female name, a bar or other visually recognizable characteristics is applied to the subject code 302. Next, it is also determined whether a subject is followed by a verb at 510. If the determination is negative, it is determined again whether a subject follows a modifier at 564. If a subject follows the modifier (e.g., an adverb follows a subject and precedes a verb), a code for the modifier is applied at 566.

It is then determined whether the component part of the sentence in the next position to the right is a verb at 514. If the determination is negative, it is taken to 512 where the message is coded by applying coded characters to the parsed component parts of the sentence because the parsed message is not a complete sentence. If a verb follows the subject and/or a modifier, a code for the verb is applied to the coded message at 516. For example, Table III in Appendix B provides a list of commonly used verbs.

At 568 and 570, a modifier is again determined and applied, respectively, before proceeding to determine if an object follows a verb or a modifier at 522. If the determination is negative, the phrase is coded at 512 according to corresponding code characters applied to the parsed component parts of the sentence. However, if an object is determined, a code for the object is applied at 542. The coding of the sentence completes at 544. Table V in Appendix B provides an exemplary list of commonly used objects.

FIGS. 5B to 5E are flow charts illustrating exemplary methods for applying specials rules to a subject, a verb, a modifier, and an object, respectively. For example, Tables IA, IB, and IC in Appendix B provide a list of commonly used subject-verb combinations. In addition, Table VIIIA in Appendix B provides a special rule for a special combination of modifier-objects. As such, a subject-verb and/or a modifier-object combination may be coded as one code block according to some of the special rules, such as at 526 in FIG. 5B, at 532 in FIG. 5C, at 538 in FIG. 5D, or at 548 in FIG. 5E. These specials rules are examples of how commonly known or used words may be incorporated in a coding scheme.

In one key embodiment, it is understood that the inventive message coding system including the various novel coding instructions, rules with guidelines and examples, and the inventive steps for decoding, i.e. the procedures for applying the reverse of the coding instructions may be described in a printed matter such as a booklet or a brochure or a pamphlet, or as an instruction manual or a novel software program or an App incorporated into a programmable consumer electronic device, including hand held or laptop or personal, communication device or any other suitable communication system including any computing system environment or configuration. As an extension of the embodiment, a set of computer-executable instructions stored on a computer-readable medium incorporating the inventive coding and decoding instructions and methods having a data structure may be employed.

Figure 6:
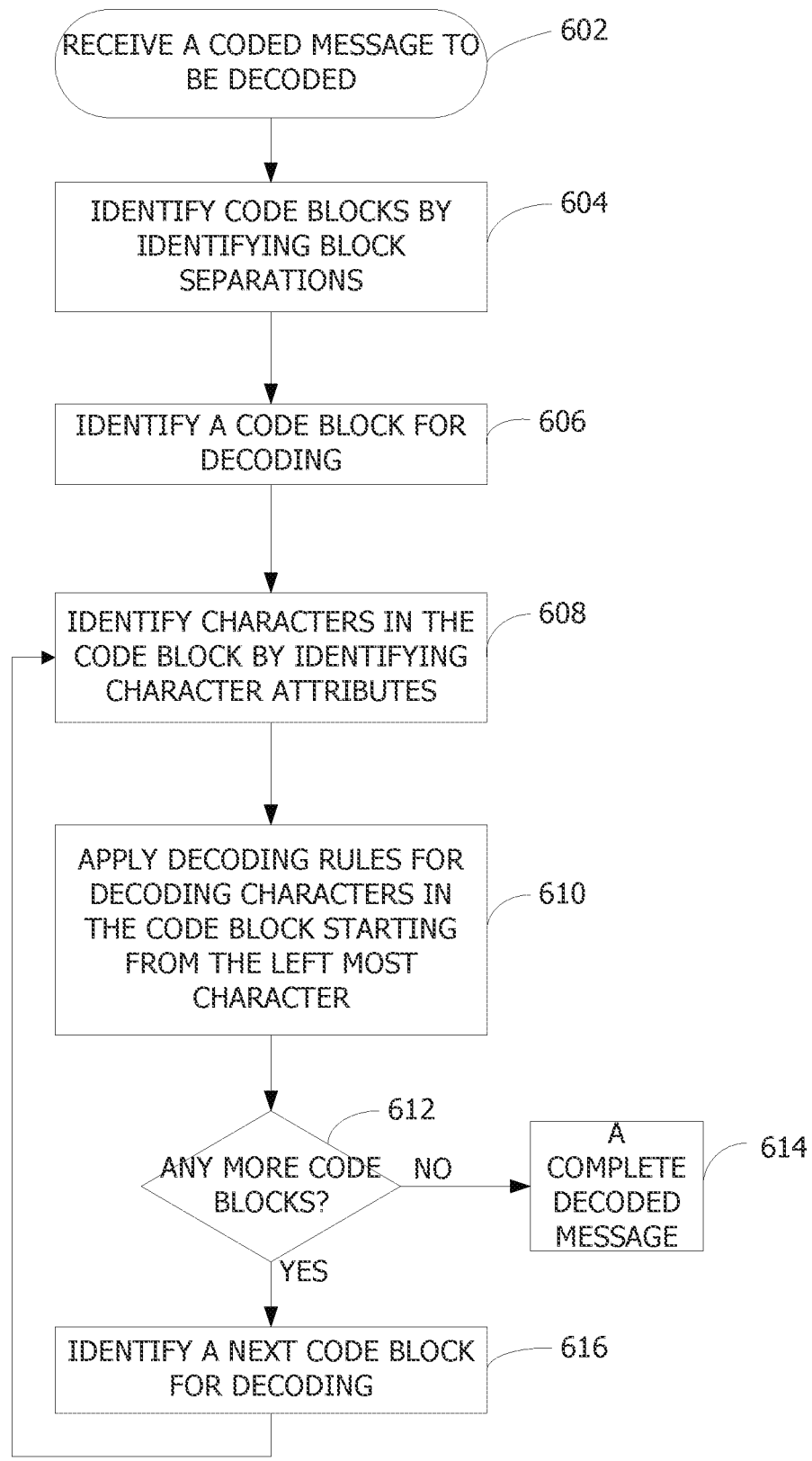
FIG. 6 is a flow chart illustrating an exemplary method for decoding a coded message to form a regular sentence according to an embodiment of the invention.

FIG. 6 is a flow chart illustrating a method for unambiguously decoding a coded or compressed message to form the original sentence or the word(s) or the text communicating the message. At 602, a user receives a coded message, such as the coded messages in FIGS. 7 to 9. Here, the term, "user" refers to a device such as a computing system environment including a PC or an electronic communication device or a programmable consumer electronic or a handheld device, or a person using such a device. As an embodiment, the user receives the coded message either by scanning, as an example by taking or capturing or recording a picture of the coded message on a display space using a device, as an example, a programmable consumer electronic device such as a PC, a personal phone, an iPhone, an electronic wrist device, or the like, or from an electronic communication device, or a handheld device such as a programmable camera, a Smartphone, an iPod, or the like, wherein each device is capable of scanning, i.e. taking or capturing or recording and relaying a picture and/or a coded message. The user next consults the manual and applies the stored inventive decoding method instructions to the received coded message comprising the following steps. The user identifies one or more code block separations or distinguishable or recognizable means (e.g., spaces, dashes, hyphens, or the like) at 604. At 606, the user identifies a code or code block for decoding. The user identifies one or more characters in the code block by identifying character attributes at 608. For example, the code blocks for the different component parts of speech in a coded message have, as character attributes, in addition to the one or more pre-defined or pre-specified alphabet letter or number characters or other type of code characters, one or more pre-assigned sequence designation or ordering scheme characters, and/or other character attributes such as one or more pre-defined code distinguishing or specific unique or special characters and/or one or more pre-defined code character distinguishing or specific character visible features, or the like. Once the characters and their attributes in the code or the code block are identified, the user applies decoding rules for decoding the characters in the code or the code block, as an example step, starting from the leftmost character at 610 and decodes the code or the code block to the original form.

Figure 7:
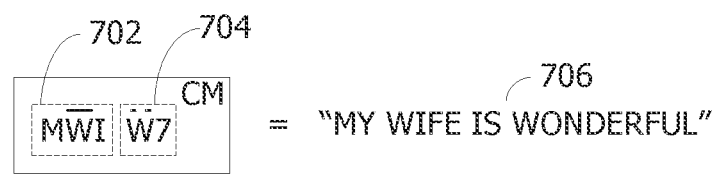
FIGS. 7 to 9 are block diagrams illustrating exemplary coded messages and their corresponding decoded sentences according to an embodiment of the invention.
Figure 8:
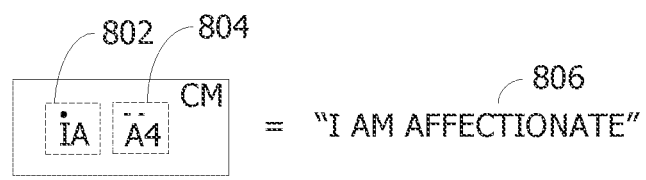
Figure 9:
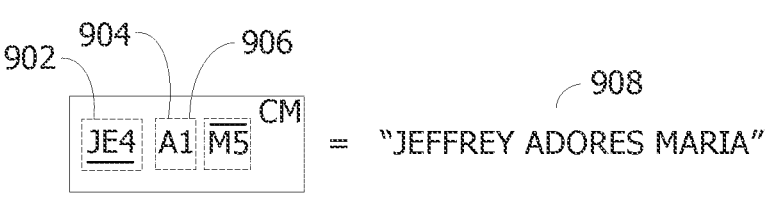

Referring now to the examples of FIGS. 7 to 9, the user identifies there are two code blocks in the coded message "MWI W7" in FIG. 7 and in the coded message "IA A4" in FIG. 8. Likewise, the user identifies there are three code blocks in the coded message "JE4 A M5" in FIG. 9. The space between a first code block 702 and a second code block 704 in FIG. 7, between a first code block 802 and a second code block 804 in FIG. 8, and between a first code block 902, a second code block 904, and a third code block 906 in FIG. 9 is a code separation. The user identifies the first code block "MWI" in FIG. 7 including the characters and their character attributes. The user then consults the stored manual/App for decoding the characters and their character attributes in the $1^{st}$ code block and using Tables IB and II in Appendix B decodes that "MWI" code block stands for "My wife is". That is, the user decodes, as an example, the leftmost character "M" first and identifies and decodes the next character "W" before decoding the character "I". At 612, the user determines whether there are any more code blocks to decode. In the case of FIG. 7, there is one more code block to decode. At 616, the user identifies the next code block (i.e. "W7") to decode. By consulting the manual/App and Table IVA in Appendix B, the user applies the appropriate rule(s) to decode "W7" code block as "wonderful". If there are no more code blocks, the user completely decoded a coded message at 614. For example, FIG. 9 has the third code block 906 and the code "M5" stands for "Maria" according to Table VIIA in Appendix B. Upon decoding all the identified codes or code blocks in the coded or compressed message, the user has now unambiguously and completely decoded the coded or compressed message into its original form which optionally could be displayed on a display space of the device or transmitted to another device.

In one embodiment, aspects of the invention are operational with numerous general or special purpose computing system environments or configurations. The computing system environment is not intended to suggest any limitation as to the scope of use or functionality of the invention. Moreover, the computing system environment should not be interpreted as having any dependency or requirement relating to any one or combination of components discussed below. Examples of well-known computing systems, environments, and/or configurations that may be suitable for use include, but are not limited to, personal computers, server computers, hand-held or laptop devices, multiprocessor systems, microprocessor-based systems, set top boxes, programmable consumer electronics, telephones including mobile telephones, iPhones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

Figure 10:
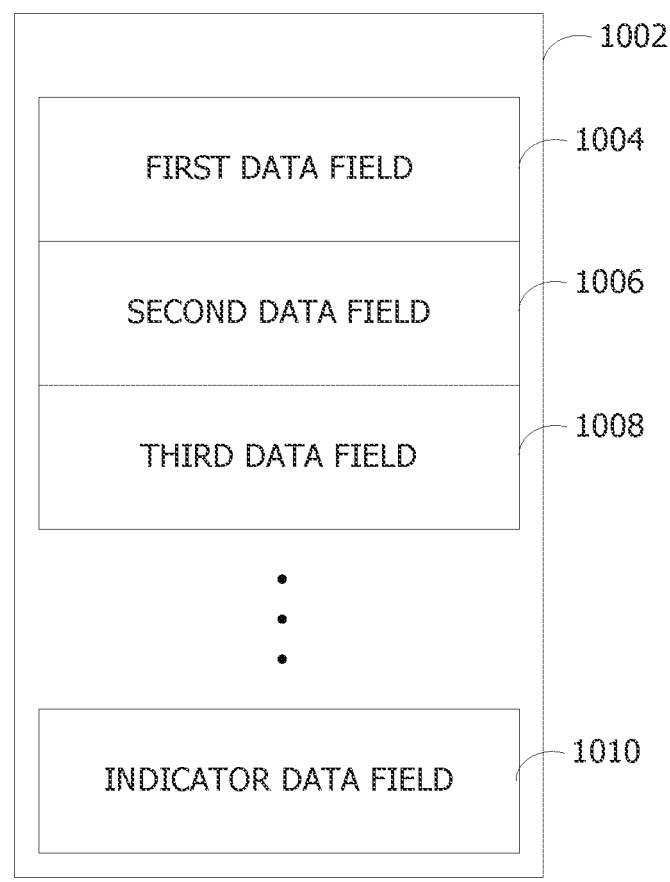
FIG. 10 is a block diagram illustrating an exemplary computer-readable medium storing a data structure for coding a message or sentence according to an embodiment of the invention.

Referring to FIG. 10, an exemplary block diagram illustrating a computer-readable medium 1002 storing a data structure for coding a message or sentence according to one aspect of the invention. For example, the computer-readable medium 1002, which includes both volatile and nonvolatile medium, removable and non-removable medium, may be any available medium that may be accessed by a computer or a computing device. By way of example and not limitation, a computer readable medium comprises computer storage media and communication media. Computer storage media include volatile and nonvolatile, removable and non-removable medium implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by a computer. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of the communication media. Combinations of any of the above are also included within the scope of the computer readable medium 1002.

The computer-readable medium 1002 stores a data structure for coding a message or sentence. The coded message (e.g., code blocks 902 and 904 in FIG. 9) has a first code block (e.g., the code block 902) corresponding to one or more component parts of the message or sentence. A first data field 1004 of the data structure in the computer-readable medium 1002 includes data representing the first code block. A second data field 1006 includes data representing a second code block, which corresponds to a second component part of the message (e.g., the code block 904). A third data field 1008 includes data representing a third code block, which corresponds to a third component part of the message (e.g., the code block 906). It is to be understood that one or more data fields may be defined in the data structure storing data corresponding to one or more other code blocks in the coded message. As such, the first and one or more other code blocks form the coded message. In one embodiment, an indicator data field 1010 stores a distinct marking or an indicator to indicator or communicate that the displayed message is a coded message.

Figure 11:
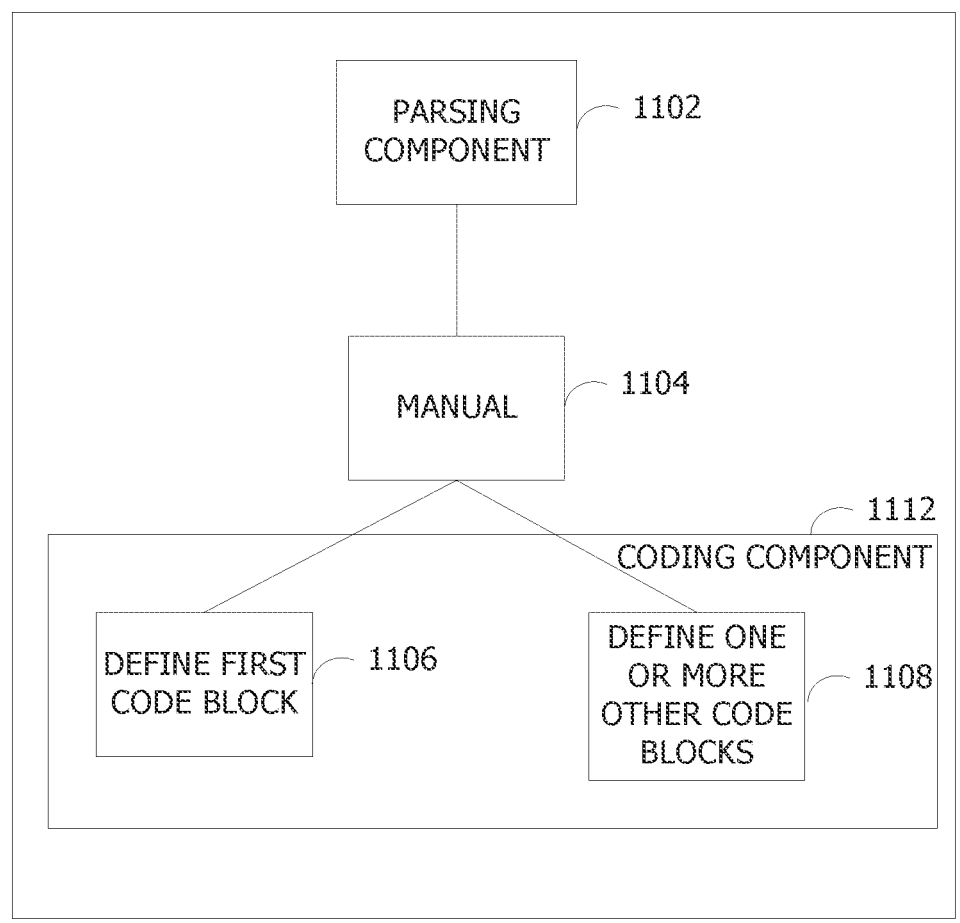
FIG. 11 is a block diagram illustrating an exemplary computer-readable medium for coding a message or sentence according to an embodiment of the invention.

Referring to FIG. 11, a block diagram illustrates a computer-readable medium 1100 for coding a message or sentence. The computer-readable medium 1100 may be a computer-readable medium as described in FIG. 10 and includes a parsing component 1102 for parsing a sentence communicating a desired message into a plurality of component parts of the sentence. For example, the parsing component 1102 parses a message or sentence, such as the sentence 110 "I love my wife" in FIG. 1. A manual 1104 stored on the computer-readable medium 1100 provides a set of rules and a list of defined characters for coding the sentence. For example, the manual 1104 may include entries in Tables I to IX and/or other coding rules for coding a sentence. The set of rules can further be retrieved from the manual 1104. For example, in an embodiment where a computing device is used, a processor may retrieve the coding rules from the manual 1104 stored on the computer-readable medium 1100 such that the processor can execute the coding rules provided by the manual 1104 for coding the sentence. Also, a coding component 1112 defines a first code block and applies an appropriate code to the component part of the sentence. Similarly, the coding component 1112 defines one or more other code blocks and applies appropriate codes to one or more other component parts of the sentence. Using the sentence 110 "I love my wife" as an example, the coding component 1112 defines "I love" as the first code block and "my wife" as the second code block according to the rules, such as the rules and Table IB set forth in Appendix B. Next, the coding component 1112 applies codes to the sentence 110 as "IL MW".

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention. The various tables included herein in Appendix B represent examples of words, or set of or combination words, or groups of related words, or words representing a component part of speech such as noun/pronoun, verb, modifier and the like, and their code characters defined per disclosed inventive coding instructions. As needed and within the scope of this invention, the contents of these example tables could be revised, updated, expanded and/or additional tables created following the inventive coding instructions disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved, and other advantageous results attained. As various changes could be made in the above products and methods without departing from the scope of the invention, it is intended that all matter contained in the above description and shown in the accompanying drawings shall be interpreted as illustrative and not in a limiting sense.

APPENDIX A

The following sections with examples illustrate the inventive coding concepts, rules, methods, steps and guidelines by which one (or more) word(s), or one (or more) word(s) representing a component part of speech in a sentence, or the different component parts of speech in a sentence, or a group of related words or a combination of words representing one of the component parts of speech could be unambiguously and non-phonetically coded overcoming the above discussed limitations.

Coding a Modifier

Under this example, the characters in the code representing a modifier such as an adjective, or an adverb or a subject/object complement may optionally be written in a selected color (e.g., red, brown and the like) and may include a modifier code distinguishing or special attribute, or a feature specific for the code for the modifier component part of speech represented by a set of special characters, as an example, two hyphens, as a part of the modifier code and preferably as a part of the first one (or more) code character(s) of the modifier code and as an example, above the $1^{st}$ code character of the modifier code. Additionally, as an aspect of the invention, the one or more code character(s) such as alphabet letter(s) and/or number(s) present in the modifier code, may optionally have one of the disclosed character visible features incorporated into them. In cases of modifiers such as, "adorable" and "adorably", or "affectionate" and "affectionately", the adverbs end in -ly. In some cases, the adverb does not end in -ly, and the letters are the same as in the related adjective words. In such cases, the modifier word functions both as the adjective and adverb depending on their use in the sentence to be coded. In some other cases, the adverbs have two forms, i.e. both forms have been used as adverb, one as in adjective form and the other ending in -ly. In all cases of adverb words, for coding purposes, the code characters would be the same as in for the related adjective words but the adjectives and the adverbs would differ in terms of the set of special characters and/or the character visible features incorporated into the code characters.

According to one embodiment, commonly used modifiers per this invention are coded with one or more characters and the most commonly used modifiers with the high probability or likelihood of use per this invention would have the lowest number of characters as possible, as an example, a single character, in their codes. As another embodiment, when one or more characters are present in a modifier code, one character may represent the first letter of the modifier and one of the other characters may refer to, optionally predetermined, a sequence designation or ordering scheme character for the modifier among the related group of modifiers based on the one of the many criteria disclosed herein.

Next, as an embodiment, using modifier as the example of the component part of speech, the details of the one of the inventive coding methodologies used to select a group of related words for a component of speech, i.e. a group of related one (or more) word(s) representing the given component part of speech and to define, using examples, the code characters in the codes for the selected group of related words are explained. As an embodiment, as the first step, a set of commonly used modifiers, i.e. a set or a group of one (or more) word(s) representing the commonly used modifiers (i.e. a group of related modifier words) are selected or chosen based on their general applicability to communicate a message per this invention. The selected or chosen modifiers could be grouped and the modifiers included in the selected group of related modifiers are listed on the basis of the starting alphabet letter(s), and/or on the basis of the type of message being communicated such as a positive or negative message, or an expression of one's love, affection or desire, or a description of one's feelings, opinions, likes and dislikes, preferences or a desired quality feature and the like about/for oneself or another person or a place or an entity and the like, or on the basis of the selected subject matter, topic of interest or type of the message per this invention. The sequence designation or the ordering scheme characters for the modifiers included in the selected group of related modifiers are then generated by applying one of the above-described criteria. Here, as an example, for the related modifier words, one ordering scheme or sequence designation option could be on the basis of the relative likelihood or probability of use of those selected modifier words per this invention to communicate a message per this invention. Another ordering scheme or sequence designation option could be on the basis of the alphabet sequence of the letter next to i.e. the letter that follows, the first one (or more) starting letter(s). In most cases, under either option, numbers from one to nine are used as the characters to code the first set of commonly used nine or less modifiers per this invention. If there are ten or more modifiers in a group, either of the two options for the ordering scheme or sequence designation could be applied for those additional related modifiers. As an example, it could be the alphabet sequence of the letter next to the first one (or more) starting letter(s) under consideration. Under this coding rule, the code characters for the modifier would include the first one (or more) starting alphabet letter(s) and the alphabet that follows the starting letter(s) and optionally followed by a number zero to nine. If a $2^{nd}$ level of ordering scheme or sequence designation is needed, i.e. as an example, if there are more than one modifiers with the same one (or more) starting alphabet letter(s), the method of relative likelihood or probability of use of the (modifier) word among the related (modifiers) words could be applied. As an aspect of this invention, the above described two options could be applied to code modifiers in combination or the order of application could be reversed.

As yet another embodiment of this invention, the other options to determine the sequence designation or the ordering scheme characters for the selected group of modifiers include, as an example, a method based on the relative number of characters, such as the alphabet letter and/or number characters in or the relative length of each modifier. In determining the length of a word, all characters including the alphabet letter, number and other characters such as a hyphen or a blank space and the like are factored in. As an example of the other methods of coding options, among the first set of nine commonly used related modifiers per this invention, the longest modifier (i.e. the one with the most number of characters) could be assigned the number one and the shortest one among the group given the number nine and others assigned in between numbers based on their relative length. As an alternate option, a reverse order of this approach could be applied. If there are two or more modifiers with the same length and/or same number of characters, they could be distinguished on the basis of one of the other approaches, as an example, based on the alphabet sequence of the letter following the starting common letter(s).

As an example, as the first step, modifiers commonly used to communicate a positive message per this invention, as an example, modifiers starting with the alphabet letter A such as "ADORABLE" and "AFFECTIONATE", are grouped together. From this group, nine most commonly used modifiers among the group of related modifiers are selected and are coded as A1 to A9, as an example, on the basis of their relative function of likelihood or probability of use per this invention. Here, in the modifier code, the sequence designation code character, one to nine, follows the first code character, namely the starting alphabet letter A. To illustrate the example, ADORABLE may be coded as "A1" and AFFECTIONATE may be coded as "A4". Because, for one to communicate a desired message per this invention, the use of the modifier "adorable" may have a higher relative probability of being used than the modifier "affectionate". One may expand this approach by adding one more character to the coding process. That is, "AC1" to "AC9" are used to represent the modifiers having the first two same alphabet characters as AC. Examples of such modifiers include ACTIONABLE and ACCOUNTABLE. This above example represents the other option in designating the sequence designation code character on the basis of the alphabet sequence of the following third letter of the related modifier words starting with the same first two alphabet letters. Note generally this option is used when the related words have similar probability of use to communicate a message per this invention. Here, "ACTIONABLE" would have a higher number as the sequence designation character in comparison to "ACCOUNTABLE" because the $3^{rd}$ letter T is behind, i.e. after, C in the alphabet sequence. Thus, as an example, "ACCOUNTABLE" could have "AC1" as its code and "ACTIONABLE" could have "AC5" as its code. See Table IV A and B in Appendix B for additional examples and their codes.

As an embodiment, as the next step in unambiguously coding the selected group of related modifiers, the code characters for the modifiers could be written as a code block optionally including one of the following character visible features such as, optionally in a specific color such as red, brown and the like, and/or in bold face, and/or with one of the other disclosed character visible features incorporated into one or more of the modifier code characters as the distinguishing element or aspect for the characters representing a modifier code and/or a set of unique or special characters such as two hyphens above the $1^{st}$ character of the modifier code block as the pre-defined distinguishing or specific feature of the code for the modifier component part of the sentence. Here the two hyphens could be placed in such a way that either both hyphens are on the same side of the character with some space between them or one hyphen is on each side of the width of the character with some space between them. The each of the two hyphens could be of the same or different length; one being the longer or shorter than the other in length; and as needed optionally one of the two hyphens having a right or left side pointing arrow at either end. The order of the above described two hyphens options above the $1^{st}$ modifier code character could be either way. Thus, there are a number of possibilities available depending on the character visible features used and/or the available features for the two hyphens such as the length, their position over the character, order of the two hyphens over the character and the presence or absence of an arrow at either end. Per one embodiment, each of such above possibilities could be used to designate or specify, if and/or as needed, a particular type or class of the modifier being coded including conjunctions, prepositions. Other sets of unique or special characters such as two dots, two small geometry shapes such as circle, square or diamond, or one hyphen with one dot or a small circle or a small square or a small diamond, in either order, could be placed above the $1^{st}$ code character of the modifier code block as the modifier code distinguishing feature designating a particular type or class of the modifier being coded and optionally written in the same color as or in a different color from the code block characters. The disclosed sets of modifier code distinguishing or unique characters when placed above the $1^{st}$ modifier code character would cover about 30-90% width of the modifier code character including a space of about 10% width of the code character between them.

Applying the above described coding methodology and the Table IV A listed code examples to a vehicle license plate, as an example of the display space, the vehicle license plate with the code "IAA1" optionally written as "IA A1" would communicate the desired message "I AM ADORABLE". Here, the code block "IA" has combined the code characters for the subject and verb, namely, "I AM" Similarly, the vanity license plate with the code written as "IAA4" or preferably as "IA A4" would communicate the desired message, "I AM AFFECTIONATE". Note here the $1^{st}$ code character "A" of the modifier code block, "A1" or "A4" in the above examples would have above it a set of unique or special distinguishing characters for the modifier code such as two hyphens and/or optionally both code characters in the modifier code blocks, A1 and A4, could have as a part of the code characters one of the pre-selected character visible features as the distinguishing element of the code characters for a modifier code. Thus, one could identify the code "A1" or "A4" with the above defined character attributes as a code representing a modifier word starting with the alphabet letter is A. The number "1" or "4", as the sequence designation character, would identify the designated position occupied by the word represented by the number character "1" or "4" in a group of related modifier words starting with the letter A (Table IV A in Appendix B). Thus, the link between the code "A1" and "A4" and the two modifier words, in this example, "ADORABLE" and "AFFECTIONATE" is unambiguously established. As an embodiment, the above stated format of communicating or displaying on a display space a coded message with a space between the modifier code blocks and other code subject-verb blocks, in combination with a set of unique or special characters above the $1^{st}$ character of the modifier code block and/or the incorporated modifier code character specific character visible features into the code characters would permit a clear unambiguous communication of the desired message in the coded format.

The above described coded modifiers such as A1 for "adorable" or A4 for "affectionate" may be incorporated into other coded messages derived from other sentences such as "CHRISTI IS ADORABLE" or "MY DOG IS AFFECTIONATE" or "MY CHILDREN ARE ADORABLE". Similarly, as one of the embodiments, the two coded modifiers such as A1 (for adorable) and A2 (for awesome, Table IV.A, Appendix B) could be used together to code, as an example, the following message, "I AM ADORABLE AND AWESOME". Here, the coded message could be written either as "IA A1&A2" or as "IA A1A2" or as, in another creative novel way, "IA A1&2" since both modifiers (and their codes) start with the same alphabet letter, A. As an option, the coded message could be displayed as "I AM A1&A2" or "I AM A1 A2". As another option, the code "A1&A2" or "A1 A2" could be inside a geometry shape such as a rectangle as a part of the full message, "I AM A1&A2" or "I AM A1 A2" on the display space. This either alternate option could be used on a personal display space such as a personal wear such as a t-shirt, a sweatshirt, and the like, an engraved matter such as a mug, a stationary and the likes. The special marking on the display space for these coded messages whose sentences start with "I" or "We" "My" or "Our" could be "CM1". Note the alphabet letter A of the above discussed modifier examples, as a part of the code character, would have the modifier code specific or distinguishing feature, the two hyphens, above it and/or optionally all the code characters in the modifier code blocks could have as a part of the code characters one of the pre-selected character visible features as the distinguishing element of the code characters for a modifier code. As an extension of the embodiment, the modifier(s) could be combined with the word it modifies such as the noun/pronoun, i.e. subject, object and the like, and the resulting combination of words, having two component parts of speech, could be non-phonetically and unambiguously coded following the above coding rules and/or guidelines. Examples include "ADORABLE SEXY LADY" and "AWESOME SMART LAWYER". Using the code Tables IVA and B, and Table V in Appendix B, they are coded as "A1 X L1" and "A2 S3 L3" respectively. The spaces between the code blocks, as one aspect of this inventive method, would imply that these are (in these examples) three distinct phrases communicating the desired message. Additionally, in the above examples, the $1^{st}$ code character for the modifier code would have a special or special character such as two hyphens above it as the modifier code distinguishing or specific feature and the $1^{st}$ code character for the noun/pronoun word being modified would optionally have a unique or special character such as two hyphens below it as the code distinguishing or specific feature for the noun/pronoun code. Since in the above two examples, the coded message contains the codes for two component of parts of speech, the modifiers and the noun/pronoun word being modified, the coded message or the code characters could optionally be differentiated from the other types of coded messages where other component parts of speech such as the subject, verb etc. are present. An option could be to use a specific indication or notation or a special marking on the display space, one example being "CM3". Note, here, since the use of the special marking, "CM3" or a similar special marking or notation conveys that the coded message includes two component parts of speech, namely one or more modifiers and the noun/pronoun word being modified, one has the option to use either both or only one of the character attributes, i.e. the code specific or distinguishing feature and the code characters distinguishing character visible features for either the modifier code(s) or the noun/pronoun code on the displayed coded message. As another embodiment, one could use one or two or more modifiers such as adjectives or modifier phrase(s) in their coded forms as the desired message, generally communicating one's view of oneself or another person of interest, for display on a personalized or individualized display space such as a personal wear, the car license plate, telephone number system or the like. Examples of such desired messages are, "HANDSOME", "ADORABLE AND SEXY", "BEAUTIFUL SPORTY AND SMART", "MESSED UP" etc. Their corresponding codes, based on Tables IV A-F, are, "H2", "A1 & X", "B1 S5 S3", and "PM3" respectively. Note these modifier codes would include the modifier code or modifier phrase code specific or distinguishing feature, i.e. two special characters above the letters and/or the code characters could include one or more modifier code character distinguishing character visible features, as an example, displaying inside a geometry shape such as a square or rectangle in a predefined modifier specific color, or the code characters displayed in a predefined modifier specific color. The specific indication or notation on the display space for such coded messages based on only one or more modifiers could be "CM4". Note, here, since the use of the special marking "CM4" or a similar special marking or notation conveys that the coded message includes only the modifier component part of speech, one has the option to or not to use either the modifier code distinguishing feature and/or the modifier code characters distinguishing character visible features on the displayed coded message.

Under the current license plate system in Missouri, as an example, the maximum number of allowed display space (e.g., six) excludes the line, "–" on the vehicle license plate. According to one aspect of this invention, a number, an alphabet, a combination thereof, or any other distinguishing symbols such as one or more stars in combination with one or more number or alphabet letter may be used on the right side of the line "–" as a message display sequence designation code allowing the display or communication of the same coded message on more than one personalized display space or medium such as the vanity/personalized license plates or optionally a common personal item. Alternatively, such a message sequence designation code could also be on the left side of the line with the coded message on the right side of the line. As another option, such a message sequence designation code could be in some in-between point of the coded message. For example, on the left side of the sequence designation code could be the code block(s) describing the subject and verb and optionally related modifier(s) component(s) of the sentence or message being communicated, and on the right side of the sequence code would be the remaining code(s) for the remaining component(s) of the sentence or message being coded. As an embodiment, this message sequence or distinguishing designation code may be displayed in any color, or a format, or in one block. Under this example, it may represent a sequence methodology of the vanity personalized license plates issuing agency. As another embodiment, the message sequence designation code, when used on a vanity license plate or a common personal item, may optionally be written in a specific color such as yellow, orange and the like, and optionally different from the color of the coded message and/or optionally including one of the specific character visible features in all characters in the message sequence designation code.

Thus, for the desired message sentences "I AM ADORABLE" and "I AM AFFECTIONATE", as examples, in Missouri, vanity license plates may be issued to more than one and different parties all communicating the same desired coded message but still being distinct from one another because of the distinguishing message sequence designation codes and thus satisfying MODOT requirements. For example, the coded vanity license plate messages, "IA A1-01", "IA A1-04" and "IA A1-52" are distinct from each other and would mean that "IA A1-01" is the first vehicle to get the coded vanity plate saying I AM ADORABLE, and "IA A1-04" and "IA A1-52" are the 4th and 52nd vehicles to get the coded vanity plates displaying I AM ADORABLE. Similarly, under another unique message sequence designation method, "IA A4-00", "IA A4-06" and "IA A4-83" would mean that "IA A4-00" is the $1^{st}$ car to get the coded vanity plate communicating the desired message, "I AM AFFECTIONATE" and "IA A4-06" is the $7^{th}$ car to get the coded vanity plate communicating the desired message, "I AM AFFECTIONATE" and "IA A4-83" is the 84th car to get the vanity plate communicating the same coded message, "I AM AFFECTIONATE". Here, as explained above, the code characters in the modifier code blocks, A1 and A4, could have as a part of the code characters one of the pre-selected character visible features as the distinguishing or specific element of the code characters for a modifier code.

Coding a Verb

In general, the verb in a sentence communicating a message or information per this invention is in agreement with the number and the person of the subject of the sentence and refers to simple present tense and active voice format. In some examples, the sentence may include a helping (or auxiliary) verb along with a main verb, or a phrasal verb, i.e. a main verb with an adverb or preposition. According to one embodiment, the verbs that are most commonly used for the purposes of this invention, i.e., verbs with a relatively high probability of use per this invention, such as "AM", "ARE", "IS", and "LOVE" may be coded by assigning the first, i.e. the starting letter of the verb words, "A", "I", and "L" as their codes respectively. In the case of the verb "love", the first letter code "L" may be optionally followed by zero. As another embodiment, since the verb "AM" in most cases follows "I" and the verb "ARE" in most cases follows "WE" in communicating a personalized message per this invention, these two commonly used verbs when used in conjunction with "I" and "WE" respectively may be coded, in combination as one code block, as "IA" and "WA" respectively. Tables IA, IB and IC list the codes for such special combination of the subject words "I", "We", "My" and "Our" with verbs "am", "is", "are", and "love". Other examples of commonly used verbs and their codes for the purpose of this invention are summarized in Table III in Appendix B. As an embodiment, the code for a verb would have either a single alphabet letter character or one (or more) alphabet letter character(s) followed by one (or more) number and/or alphabet letter character(s) in either order, and could include as the distinguishing/specific/unique feature of the verb code, the unique character, a hyphen under each of the characters in the verb code, except in the case of the codes for the most commonly used verbs, "am", "are", "is" and "love". The hyphen, where used, would be centered under each character and could be shorter, normal or longer in length, and generally in the range of 10% to 90% of the width of the character and would not fully cover the width of the character. As an extension of this embodiment, as needed, the one or more code characters in a code for a verb, optionally including the most commonly used verbs per this invention, could include, as a part of the one or more characters, a pre-selected character visible feature as the verb code character specific or distinguishing element or feature.

According to another embodiment of this invention, the coding rules or guidelines for verbs starting with the same first one (or more) alphabet letter(s) may be similar to the above described coding concepts, guidelines and rules used for coding modifiers. Based on the first alphabet letter, one would put together a list of, as an example, nine related group of verbs commonly used for the purpose of this invention and starting with that alphabet letter. For example, up to nine related verbs starting with "A" (other than AM and ARE) may be selected and coded as "A1" to "A9", the numbers one to nine as their sequence designation or ordering scheme characters, based on the function of their relative likelihood or probability of use per this invention among those related verbs. Applying this guideline, verbs starting with A such as "ADORE", "ADMIRE", "ACT" could be coded, as an example, A1, A2, A4, respectively. Here, the verb "ADORE" may have a higher relative likelihood of use per this invention compared to the other two verbs and the verb "ACT" may have a lower relative likelihood of use compared to the other two verbs. Another sequence designation or ordering scheme option may be on the basis of the alphabet sequence of the letter next to, i.e. the one following, the starting alphabet letter(s)) of the verbs under consideration. Applying the above coding guideline, the codes for the verbs starting with the letter E, "EXHIBIT" and "EXPOSE" could be E1 and E2 respectively because the $3^{rd}$ alphabet H is ahead of the alphabet P in the alphabet sequence. Since another verb starting with the same first letter E, "ENJOY" would more likely be used per this invention over the above two verbs EXHIBIT and EXPOSE, the code for ENJOY would be "E" the $1^{st}$ letter of the verb optionally followed by zero. Note in both examples, i.e. the verbs starting with the letter A or E, per Table III, Appendix B, currently there are less than nine commonly used verbs starting with either of the alphabets. The coding of these verbs could be accomplished by assigning a code within A1 to A9 or E1 to E9 respectively. This appears to be the case for many other commonly used verbs starting with other alphabets per Table III in Appendix B and in some cases, the verb code character is the starting alphabet letter for a verb because there is only one verb with that starting alphabet letter in the example as in Table III. However, as suitable additional verbs, for the intended purpose of this invention, could be added to the group or to the Table III, the codes could be assigned to them accordingly. As an embodiment, the application of the code characters for the verbs following the disclosed inventive coding rules and instructions, as shown with examples here and in Table III in Appendix B, in combination with the use of a special or unique character such as a hyphen below the verb code character(s) as the pre-defined verb code distinguishing or specific feature for the verbs other than the most commonly used verbs per this invention ("am", "is", "are" and "love") and/or with a pre-selected character visible feature as the verb code character specific or distinguishing element or feature incorporated into the one or more verb code characters would allow one to unambiguously and non-phonetically code a verb component part of speech and for display on a personalized display space such as a vanity license plate, a personal wear, a vanity telephone number and the like wherein said coded verbs would be unambiguously decodable when appropriate reverse, i.e. decoding instructions are applied.

As an example, the sentence "I ADORE MY WIFE" may now be non-phonetically and unambiguously coded, following the disclosed inventive concepts and guidelines and per Tables II and III in Appendix B, as "IA1MW" and optionally written as "IA1 MW". Note here the verb code characters "A1" may have a line such as a hyphen below each character and the hyphens are not connected to each other. As in the above example, displaying the coded message, "IA1 MW" with a space between the code blocks, could permit better communication of the desired message in the coded format, i.e. by separating the code block for the subject and verb from the other code block for the object or complement, or any other component part of the sentence. Thus, in Missouri, "IA1 MW-4" and "IA1 MW-9" may represent the 4th and 9th license plates permitted to communicate the same message, I ADORE MY WIFE. Note here, as explained herein, the code character "W" for wife would have a bar/line over it and the code character "I" may have a dot over it and the verb code characters "A1" may have a hyphen below them and/or a pre-selected character visible feature as the verb code character specific or distinguishing element or feature incorporated into them.

Table III in Appendix B lists other commonly used verbs per this invention and their corresponding codes. As an embodiment, the code character(s) representing verb(s) may optionally be displayed in a particular color (as an example blue, purple, and the like) optionally different from the color(s) used for the other components next to it and/or in bold face. As another embodiment, the code character(s) for the verb, including the verb modifier if any, may be combined with the code character(s) for the subject and its modifier if any, and written as a single code block. As an embodiment, the same verb code character(s) represents the different, i.e., singular or plural, forms of the verb and matching in number and person of the subject in the coded message. As an extension of the embodiment, the "same verb code characters" are used to represent the past, the present or the future tense of the verb but incorporating inventive differences into the verb code distinguishing or specific special character, i.e., the hyphen below each verb code characters. As yet another embodiment, the three "progressive tenses" and the three "perfect tenses" of the verb could be coded by including the alphabet letter character "G" and "H" respectively, as an option, either in front of the $1^{st}$ code character or at the end of the code for the verb under consideration and the tense would be reflected by any one of the novel concepts disclosed here and the hyphen below the letter characters, "G" and "H" could be in bold to distinguish from the other verb code characters pointing out that they represent either the progressing of the perfect tense respectively. As another embodiment, to indicate a particular or a specific type or class of verbs such as verbs describing chemical reactions such as hydrogenation or oxidation, or legal actions, or marketing or financial activities, or medical procedures, etc., use of a pre-selected character visible feature could be one of the options by incorporating the feature as a part of the one or more characters in the verb code for the given type or class of verbs.

Coding of Common Subject/Object and Related Words

There are many commonly used subject words including various classes of noun and pronoun words and these words could also function as object words. Examples of such noun and pronoun words are country, India, company, first, work, religion, dog, boat, house, figure, power, wife, problem, life, beauty, apple, position, chemist, lover, Christi, space, place, school, Florida State University, party, guy, child, and the like. As one of the embodiments, different types of common nouns, as examples, abstract nouns, concrete nouns, compound nouns, and different types of proper nouns such as full names of celebrities in sports or entertainment, or popular first names for male/female or full names of well-known authors such as P. G. Wodehouse etc., could be grouped as different sets of groups of related words. Additionally, different subgroups of abstract nouns such as those noun words focusing on one's quality, as an example, beauty, or attributes such as health and wealth, or ideas such as fairness and democracy, or different subgroups of proper names such as famous TV/Movie actors/actresses could be grouped as yet other sets of related groups of words. Similarly, pronouns such as personal pronouns, indefinite pronouns, reflexive/intensive pronouns, demonstrative pronouns, possessive pronouns, and relative/interrogative pronouns could be grouped as another set of different groups of related words. The code characters and the codes for the words in the above-described various groups of related, noun and pronoun, words could be created following the coding methodologies, rules and guidelines described herein.

As an embodiment, other commonly used groups of subject (noun and pronoun) words include scientific, technical, medical, commercial, law/legal information based terms and words such as names of organic reactions or classes of chemical compounds, or commonly used medical terms including names of medical procedures and classes of prescription drugs, or commonly used financial or marketing terms/words, or commonly used legal terms such as names of legal professions, types of court cases filed, names of legal procedures etc. The code characters and the codes for the words in the above-described various groups of related, noun and pronoun, words could be created following the coding methodologies, rules and guidelines described herein. Thus, such created codes and code characters could be applied to compress a text message, including the one or more sentences in the text message, communicating, as an example, one of the above-described scientific, technical, medical, commercial, or law/legal or another type of above described similar information to a compact and/or an abbreviated format and further to communicate the compressed text message, or the compact and/or an abbreviated format from one electronic device to another electronic device for displaying and/or unambiguously decoding the compressed text message, or the compact and/or the abbreviated format to its original format by applying the disclosed inventive decoding steps at the receiving device and displaying it on the device.

As an embodiment, the one or more of the code characters in the codes for these noun/pronoun words would have the appropriate noun/pronoun code distinguishing feature, i.e., the appropriate pre-selected special or unique character(s). Additionally, as an aspect of this invention, the one or more code character(s) such as alphabet letter(s) and/or number(s) present in the noun/pronoun code, may optionally have one of the disclosed character visible features such as one or more horizontal strips or wavy lines incorporated into them, or the code character and/or the code characters shape outline in a color, as an example, in yellow or orange or green or pink or white color contrasting the color of the display space.

As an embodiment, the code for a noun (for examples see Table V in Appendix B) and pronoun used to communicate a desired message per this invention would have one or more alphabet letter characters written in the upper-case form and optionally followed by one or more numerical, i.e. number, characters as sequence designation characters assigned for the noun or pronoun under consideration. The code characters for the nouns, as shown with examples in Table V and pronouns, could be written in a color such as yellow, orange, green, and the like generally contrasting the display space color. As an extension of the embodiment, the code characters include as the distinguishing/specific/unique feature of the noun/pronoun code, the set of two unique or special characters, as an example, two hyphens, two geometry shapes, shallow or solid inside, such as circle, square, triangle, diamond, and the like, two dots, and combination thereof below the first alphabet character in the noun/pronoun code. Here the two unique or special characters could be placed in either order and in such a way that one character is optionally on each side of the center of the width of the code character with some space between them in the range of 5-10% of the width of the code character and pre-selected to represent different groups or types of nouns or pronouns. For the example of two hyphens, each of the two hyphens could be of the same or different length; one being the longer or the shorter than the other in length; and as needed optionally one of the two hyphens having a right or left side pointing arrow at either end. As an example, the presence of a set of two hyphens of same length below the $1^{st}$ code character could refer to the frequently used common nouns to communicate a desired positive, negative, or jovial message of oneself per this invention such as liar, liberal, jerk, scholar, winner, clown and the like including names conveying a desired association with an institution such as a university, as examples of such names, Seminole and Sooner. Alternatively, nouns' describing one's desired such association with an educational institution could be grouped as a separate group of related words. Similarly, one could group common noun words communicating one's description of oneself using positive and/or negative and/or jovial messages as separate sub-groups of related words. In such cases, the length of the "two hyphens of same length" below the $1^{st}$ code character could be different and distinct from each other for the different groups of related words. As additional options, the character outlines for the code characters in the codes for these different groups of related words could be written in different but distinct shades of colors such as yellow or orange or green. As another example, the presence of two hyphens of different lengths, displayed in either order and/or either side/location, below the $1^{st}$ code character could refer to the different types of pronouns listed above but except the personal pronouns and neutral pronoun words. Yet another example, the presence of two geometry shapes of same shape or combination of two different shapes of different sizes, shallow or solid inside, such as circle, square, diamond and the like below the $1^{st}$ code character could be assigned to represent frequently used and different types or groups of related common or proper noun words.

As another embodiment, one of other sets of two special or unique characters such as the combination of two special or unique characters selected from the following: a hyphen with or without an arrow at one end, a dot, a geometry shape, shallow or solid inside, such as a circle or a square or a diamond and the like written in either order could be placed below the first alphabet letter character of the noun code as the distinguishing or the specific feature representing one of the different types of nouns. As an example, presence of two dots below the character could represent a profession based association names; presence of two normal size circles (solid inside, i.e. in a dark color) below the $1^{st}$ alphabet character could represent the names of the various professions; presence of two normal size circles (shallow inside) below the character could represent the names of commonly used abstract nouns describing a quality or an attribute associated with a person or place or an entity in a desired message; presence of two normal size circles (solid inside) below the character could represent commonly used noun words describing ideas, feelings and thoughts; presence of two small squares (shallow inside) below the character could represent one's desired activities such as swimming, hiking, hugging, reading and the like; presence of two small squares (solid inside) below the character could represent the names of various sports; one small square followed by one small circle below the character could represent the names of major commercial enterprises; one small circle followed by one small square could represent the names globally recognized products. As another set of examples, presence of one hyphen followed by a small solid circle could represent the names of automobiles; presence of one small solid circle followed by a hyphen could represent names of popular drinks including alcoholic beverages. One could come up with a number of other similar groups of related noun words such as one describing common and popular foods etc. for coding purpose.

As an extension of the above embodiments, the presence of a set of two unique or special characters such as two hyphens or two dots, or two geometry shapes, shallow or solid inside, such as two circles, or two squares or two triangles, or two diamonds and the like or a combination of two special characters selected from a hyphen with or without an arrow at one end, a dot, a geometry shape, shallow or solid inside, such as a circle, a square, a diamond and the like written in either order below an alphabet letter character in a code or a code block or a coded message would indicate that the code or the code block or the coded message includes a noun/pronoun and the alphabet letter character with the a set of two unique or special characters below it is the starting first letter of the noun/pronoun word and the next one or two or more alphabet and/or number character(s), following it in the code or the code block and including the first character, or the outline of all characters, optionally written in a color such as yellow, orange, green, and the like represent the noun/pronoun code characters.

As an embodiment, the use of alphabet letters or numbers optionally written as small subscript, as a part of the appropriate noun/pronoun code distinguishing feature, is generally used in special cases of noun/pronoun that have special probability or likelihood of use per this invention and as examples, the noun/pronoun words are religion-based words such as heaven, hell or angel; or names of religious scripts such as Bible or Rig-Veda.

Although English letters, Roman numerals and Greek letters have been used in many of the examples described in earlier sections, other alphabet letters such as Spanish, Japanese, Hindi, or Tamil alphabet letters, similar characters, symbols and the like may also be used in their places. Similarly, if the Department of Transportation authority in a given state or a country expands the number of spaces allowed on their license plates, the potential options to practice aspects of this invention also expand. Similarly, with the use of sub-script or super-script the ability to code expands to cover a longer and more worded or complex sentences. For coding purposes, according to one embodiment of this invention, symbol characters such as #, $, %, &, *, ?, > (more/greater than), < (less than) and the like generally found in a typing or computer key board or a phone may be used with the respective commonly understood meaning or optionally as a special character in constructing a coded message. In addition, other symbol characters such as "!", "+", ".", "~", or the like available through an input device such as an iPhone or a keyboard commonly used for typing such as a Blackberry, a computer key board may be used with the respective commonly understood meaning or as a special character or as one of a unique symbol characters.

An Alternate Novel Coding Method for Specific Names

According to one embodiment, this alternate coding method may describe a creative novel and unique approach to code a desired message associated with a specific group of nouns such as the name of an entity such as a commercial group, a business unit, a company or an entity such as an organization entity including the educational institutions, professional associations, non-profit institutions and the likes, or professional and university sports teams, or an entity such as a place such as India, Paris and the like, a well-known product such as Nike shoe or Apple phone etc., where the name in the message is coded by means of the "official symbol or graphical image, i.e. figure, emblem, logo, icon, etc." associated with the name and the association recognized by the general public. As per one embodiment, under this novel coding method, one or more characters in the code or the code block for the name of a commercial group or an entity such as an organization entity and the like, as described above, in the sentence communicating a message per this invention may be represented by a graphical image or an official symbol such as a logo, a figure, an emblem, an icon and the like associated with the name for the commercial group or the organization entity and the like provided a part of or the rest of the sentence or message could be non-phonetically and unambiguously coded using one of the inventive instructions, i.e. the coding methods, rules and guidelines disclosed herein. This novel approach may be used to code the name of a group or an organization as described above included as a part of a desired message, as an example, as a subject or an object in a sentence communicating such a desired message for display as a coded message on a personalized display space such as a vehicle license plate, a vanity card, a common personal item including a personal wear, a personal printed matter, and the like. When used, such coded messages may be indicated as a specific class of coded message designated as "CCM" meaning "creatively coded message" or as "FCM" meaning "figuratively coded message."

According to another embodiment of this invention, if a sentence, excluding the name of an entity such as a university, a sports team, an organization, a company, or a product, is coded using one of the disclosed novel coding instructions leading to a coded message taking up about 5-10 spaces (i.e. having about 5-10 characters), then such a coded message may also be communicated via other display mediums such as a printed/electronic matter produced by a business entity (ex. company publication/documents, product/service marketing and/or advertisement medium, company/personal office letter pads and the like), company product/service promotional products including associated TV/electronic/print advertisements, products displaying a university or a company or an organization or a well-known product name and/or associated mascot/logo/figure etc., products sold at stores specializing in sports products, or common personal items such as checks, personal wear including T-shirts, sportswear and the likes, drink (coffee, beer, etc.) mugs, lawn chairs, and the like.

Below are examples describing the use of this alternate new coding method:

I AM PROUD OF FLORIDA STATE UNIVERSITY
ST. LOUIS CARDINALS ARE COOL

In these examples, to code parts of the sentences except for the words describing the names, "FLORIDA STATE UNIVERSITY" and "ST. LOUIS CARDINALS", we may follow the inventive steps used to code the various component part of a sentence such as subject, verb and modifier as previously explained with examples and including the special characters as the code distinguishing or specific features for the various component parts of a sentence. Thus, the partially codes sentences may be written as shown below:

IA4 FLORIDA STATE UNIVERSITY.
ST. LOUIS CARDINALS® A C "x" (or A CO "x").

In the second example, "x" denotes the appropriate sequential designation character number associated with where the word "cool" fits into the nine related modifier words starting with either "C" or "CO", the latter one if one wants to be very specific.

According to one embodiment, one codes the name "Florida State University" using the "official symbol or graphical image, i.e. the official figure, Seminole figure symbol, drawing, emblem, icon, etc." used by the Florida State University (FSU) including FSU Alumni Association and recognized by the public. Here, in the case of Seminole figure, there are two figures, one is male Seminole head figure and the other is a lady Seminole figure. Thus, if a male FSU student or alumni wishes his personal display space such as his vanity license plate or his personal wear or his drink mug or his letter pad or his personal check or his key chain, or his business/personal card and the likes to convey a message, "I am an awesome (or a smart or a sexy or a handsome) Seminole" he could use the "male Seminole head figure" to code "Seminole" in his message for display on his selected personal display space and coding the remaining one or more words in the message following the methodologies defined here. In the same way, if a female FSU student or alumni wants to communicate a similar coded message on any of her personal display spaces, she would use, in place of the word Seminole, the lady Seminole figure in her coded message for display on any of her chosen personal display space. Similarly, for the name words, "ST.LOUIS CARDINALS®", one uses one of the graphical images such as the official figure, symbol, drawing, etc., the professional baseball team CARDINALS® uses to denote "ST.LOUIS CARDINALS®" or "CARDINALS®" and is understood by the public.

According to one embodiment of this invention, this coding method may be applied to communicate a message or a favorable feeling or a positive thought regarding an entity such as a city, an organization, an institution, an association, a company, a sports team, or a product that has an official, a well-recognized, well known symbol, mascot, drawing, or figure associated with it. For an example, if one wants to say/communicate, "I WORK FOR General Electrics" in his/her license plate or on a personal wear such as a T-shirt, a sweatshirt, a pant, a tie, a cap and the like, it may be coded as, IW1F "globally accepted symbol for General Electrics". Or, if somebody wants to communicate, I VERY MUCH ENJOY McDONALD'S® (i.e. the hamburger chain restaurant) on a promotional banner or a pumper sticker, it may be coded as "18E (Appendix B, Table IB and III) globally accepted symbol for McDONALD'S®, i.e. the arch".

According to another embodiment, a commercial benefit in using the coding concepts and methods disclosed herein, including the above-described alternate method of coding, for a business entity or an institution including an educational institution or a company, global or domestic, or a product/service and the likes may be to advertise or promote the entity, or the institution, or the company or the product/service in a unique way using a catchy coded message in a compact format. Examples of such catchy promotional messages for coding include the following: "The best Italian (Or American or Indian or Japanese) restaurant in town"; FSU—one of the best universities in the country"; FSU—Where Bright Students Come Together", "Target—the store you (should) target for your family needs"; "US Post Office—Customers are our #1 priority"; "The Company for Creative People", "Apple phones open the world to you", and the likes. Optionally, if desired, one or more selected words in a given message could be coded to create a curiosity provoking marketing and/or a mystic advertising message in a coded form. As an example, using the 1$^{st}$ message example above, one could code, applying one of the disclosed novel coding methods, either "the best" or "Italian (or American or Indian or Japanese)" or the word "restaurant" or a combination of these selected words, and leave the remaining words as they are in the message sentence, to create a partially coded message providing an attention creating and interest provoking marketing message. Optionally, in the above example, coding of the country name could be done using a symbol/figure associated with the country, as an example, Taj Mahal for the word "Indian" or Mount Fuji for the word "Japanese". Similarly, in the case of the last message example, the word, "world", could be coded with a graphic image such as a picture of globe. Thus, a unique and/or a novel product or service promotional specific or company based advertisement specific or an institution specific or an entity based marketing specific coded message based on the features or benefits or values of a given product or a service or a company or an institution or an entity may be created as a key component part of an advertisement and/or as a part of a marketing or an advertisement strategy/ plan, and optionally registered as a trademark or service mark or a domain name, or copy right protected and communicated, as a part of an ad or a promotional slogan and/or display, through/via one or more common promotional media including product/service promotional products, and printed or electronic advertisement media such as newspapers, magazines, bill boards, promotional banners, display posters, TV ads, social media such as Facebook or Instagram, and the likes. Alternatively, the coded message and/or its numerical version may itself be used as the unique promotional or a catchy advertisement name for the product (as explained here in a following section, "Celica 3S" series or "Boeing 3B" series), or the service or as the unique company phone number, or as the unique name for the company itself, and/or used as a part of TV commercial or any other print or electronic method of communication including social media. For a company or an organization or an institution or a group, creation of a domain name based on a coded message would be highly desirable for communication purpose.

Similarly, an individual may create a distinct personalized or individualized message by practicing the embodiments of this invention, and optionally register the coded message as a personalized or an individualized message, a trademark, a service mark, a domain name or the like. As an embodiment, such a personalized or individualized coded message thus created or the corresponding registered version could become a distinct personal or individual code in such a way the individual could use it as his/her vanity license plate number or as a part of his/her vanity phone number or as a part of his/her vanity card including credit/debit/ATM card or use it in any of his/her personal printed matters such as a personal wear, check, letter pad, and the like, or engraved matters including mugs, drinking glasses, photo frames, bracelets, coasters, and the likes. As an additional embodiment, such a coded message in combination with one or more personal information (optionally in a coded form) could become an individualized identity code or a personalized identity code for use on an identification system such as one's driver's license or a company issued identification card/badge or the like. Examples of such personal information include date, month and/or year of birth, gender, the place of birth, zip or pin code of where the person lives, color of eye, skin or hair and the like. As another embodiment, similarly a company could create a product identification code system for one or more product including a finished consumer or commercial use product, or a part for use in another product, to identify the origin of the product, i.e. where it was produced, by coding the names of the city, state and country of its origin, i.e. manufacturing site/plant location, using the methods disclosed here and display the product identification code on the product label, the package insert, or its package. Additionally, variations of the product identification code system could include details of its quality control (QC) approval, i.e. QC site location, by who, approval date etc., or product specific details such as the product catalog number, its inventory site location details etc. for future identification or documentation purposes.

Coded Number Based Message

According to an embodiment of this invention, the coded message created by applying one or more of the inventive coding concepts, methods and/or the related coding instructions described in this application could be converted to a coded number based message. Here, the terms "coded vanity number", or "coded vanity number message", or "coded number message system", or the like used in this application generally have the same meaning and refer to, namely, a coded message with inventive code characters created by applying one or more of the inventive coding concepts, methods and/or the related coding instructions described in this application and converted into a telephone/iPhone pad based characters by a set of inventive conversion concepts and steps outlined in this application. As an embodiment, the unique or special character(s) present as the code distinguishing or specific feature part of the code for a component part of speech and/or the character visible features incorporated into one or more code characters in the code as the code character distinguishing or specific feature of the code for a component part of a sentence present in the coded message would be retained in the converted coded number-based message. As needed, one or more additional character visible features could be incorporated into the one or more of the characters in the converted coded number-based message. As another embodiment, the coded message could be used as is or the number conversion of it or a combination thereof on a display space such as telephone/cell phone number systems, a common personal item, or a card system. Such a coded number-based message could be a part or a whole set of the telephone numbers and would then be known as the coded vanity telephone number, i.e. the coded vanity telephone message.

Here, the term, "telephone number", or "phone number" as in "vanity phone number", or "telephone number system", or "cell phone/fax number", or the like used herein refers to, as an example, the 10 digit, i.e. characters, based phone/fax number system used in North America consisting of the seven numbers, i.e. digits or characters, and the three digit or character area code and optionally including the number "1" (as in 1-800- . . . ) or the appropriate international calling code numbers, and similar phone number systems used in other countries, and covers the phone numbers in any of the currently written or printed or displayed versions, i.e. as an example, in a phone book or in an advertisement, in business card, in an e-mail, etc. The term, "telephone" or "phone" includes phones of all types used at home and/or office such as the land line phones, iPhones, and those used in vehicles, and the mobile phones including cell phones, the smart phones, and the like, and the phones used with fax machines. Here, the term, "digit", "character", or "number" refers to one of those characters displayed on a phone dial pad such as a number or a letter or a symbol such as a star, "#" sign or a combination thereof and including the many other characters and symbols available for one to use while using an iPad, iPhone or a smart phone and from the software programs and the apps stored in them.

An example of this application may be explained below using the telephone numbering system currently in use in the USA (10 digit system). The alphabet-number-symbol character conversion is based on the system currently available on the dialing pad of a phone including an iPhone and the stored apps. A similar approach could be applied to the phone systems in other countries with appropriate modifications without deviating from the invention.

As the first step, similar to the 3 digit numbers, 800 or 888 numbers currently used for a specific (i.e. toll free) purpose, a vanity 3 digit code could be selected with the specific purpose of indicating that any telephone number starting with these vanity 3 digit numbers may be a coded vanity telephone number communicating a coded message. As an example, we may assume that the "3 digit numbers" may start with 9 as the first digit. As a specific example, we may use either 900 or 999. An example of alternate set of specific characters based novel coded three digit, i.e. the three digit "vanity", code would be "886" corresponding to "VTN" which represents "Vanity Telephone Number" or "VTM" corresponding to "Vanity Telephone Message". Another example of a set of specific 3 digit vanity area code characters would be "786" corresponding to "PVN" which stands for "Personal Vanity Number". If additional three digit vanity area codes are needed, one could use "876" or "776" corresponding to "VPN" and "PPN" respectively representing "Vanity Phone Number" and "Personal Phone Number" respectively. The other 3 digit vanity area codes could include "286" and "276" for "CTN" and "CPN" respectively which stands for "Coded Telephone Number" and "Coded Phone Number" respectively. Similarly other combinations of 3 digit vanity area codes could be created. As an embodiment, the selected 3 digit (i.e. 3 characters) vanity area code would function as the set of specific characters indicating that the displayed message here, as the coded (vanity) telephone number, is a coded message communicating a message per this invention and optionally is of a specific class of coded message.

The following examples explain how one or more of the disclosed inventive coding concepts, conversion methods and instructions could be applied to create different types or classes of coded vanity telephone numbers/messages.

Following the coding concepts and methods illustrated herein and as shown in Tables IA and IVA in Appendix B, one may code the sentence, "I AM ADORABLE" and "I AM AFFECTIONATE" as IAA1 and IAA4, respectively. Next, one may convert IAA1 and IAA4 to all numbers. Here the presence of one or more special characters such as a dash or a line or a dot and the like above or below one or more alphabet characters, as may be the case in a coded message described above, would not be a factor in converting that alphabet to a number except that the one or more special characters present in the coded message could be retained in the converted numbers in the coded telephone number. According to one embodiment of this invention, to convert the alphabet letters into numbers, we may use, as an example, the telephone dialing pad system currently in practice today. For example, on the telephone dial pad, there are both numbers and a set of alphabet letters designated to each of most of the numbers. For an example, 2 may be used for either A or B or C; 3 may be used for D or E or F; and so on. Using the above system (e.g., on the telephone dial pad), the above coded message may be written as, i.e. converted to 4221 and 4224, respectively. The remaining 3 spaces or digits may then be used as a message sequence designation to differentiate among the number of people who may want to have this vanity telephone number to communicate the same message. To separate the numbers used to code a given message from the rest, we may use "–" or "a dot" or "a star" or a space while writing the vanity telephone number. Note when dialing a number, it does not matter where the "–" or "." and the like is placed in the written version of the coded telephone number. In this case using 886 as the selected three digit vanity area code, the coded vanity telephone number may be written, as examples, as "886-4221-xxx" and "886-4224-xxx", or as "886.4221.xxx" and "886.4224.xxx". As noted in the above example, the numerically described coded message would be in the center with vanity 3 digit code on the left and the message sequence/distinguishing designation characters on the right. Note that the above 3-4-3 number grouping method is only for the convenience purpose of explaining the concept. Here x may be a number or an alphabet or a symbol on the telephone dialing pad or a combination thereof, or a code referring to personal/individual information. For example, the first and the $35^{th}$ person having the coded vanity telephone number communicating I AM ADORABLE may have their coded vanity telephone number, all in numbers, under a simple message sequence designation approach, as 886-4221-000 and 886-4221-034. Alternatively, as an embodiment, the coded vanity telephone message could be displayed in the "as is" format or in a combination format as shown with the following examples: 886-1AA1-000 and 886-1AA4-034 or VTN-4221-000 and VTN-4224-034 where "000" and "034" represent the message sequence designation characters. Thus, in this example, with 886 as the specific 3-digit vanity area code number, a large number of people may have a coded vanity telephone number each with the code "4221" or "4224" expressing a desired message, in this example, I AM ADORABLE, and I AM AFFECTIONARE respectively but the full/complete set of numbers being distinct from each other because of the different message sequence or distinguishing designation character(s). As an embodiment, when the above described coded vanity telephone number, either 886-4221-000 or 886-4221-034, is displayed on a display space, it would include the unique or special character(s) present as the code distinguishing or specific feature part of the code for a component part of speech and/or the character visible features incorporated into one or more code characters in the code as the code character distinguishing or specific feature of the code for a component part of speech present, as they are in the coded message, in the coded vanity telephone message characters, "4221".

Alternatively, the message code itself may be incorporated into the coded vanity telephone number and displayed as is. Using the example of the sentence, I ADORE MY WIFE, the coded vanity telephone number may now be written as 886-1A1MW-xx or VTN-1A1MW-xx. Here, "x" has the same meaning as above.

There are many different novel and unique approaches, as explained below, to distinguish the three (or four) alphabet letters in the group designated to a number on the phone dialing pad and differentiate each of the alphabet letter among the three (or four) alphabet letters in the group while writing, printing or displaying or identifying while scanning the designated number in the coded telephone number/message system on one of the display spaces disclosed herein. One of the novel and unique approaches would be to incorporate individually each of the three (or four) preselected character visible features into the number character to represent distinctively and distinguish each of the three (or four) alphabet letters in the group represented by the number in the dialing pad, as explained in the following example. As an embodiment, in this example, a number character designated to represent a given set of three (or four) alphabet letters on the phone dialing pad could have a character visible feature selected from the following options, such as a thin or a normal or a bold line, a continuous or a dotted or a hyphenated or a wavy line, or a combination thereof. Optionally as additional designating feature or as alternate option, the first of the three letters could be represented by a vertical line from top to bottom at around the center of the number. The second and $3^{rd}$ letters could be represented by a top to bottom slanting line, i.e., starting from either left corner or right corner of the width of the number character down to bottom opposite corner respectively. The fourth alphabet letter, if needed, could be represented by a horizontal wavy line at around the mid-section of the number. Here, the selected line could optionally be continuous or wavy or dotted. As yet another character visible feature option, one (or two or three) continuous or dotted or hyphenated normal horizontal line(s) across at around the midsection of the number character could represent the $1^{st}$, $2^{nd}$ and $3^{rd}$ alphabet letter in the group respectively. In the case $4^{th}$ letter, as above, it could be represented by one (or two) continuous normal wavy line(s) across at around midpoint. Under another character visible feature option, the number is partially filled, i.e. as an example, about 50% of the shape area of the designated number character is filled in a solid/dark color, normally in black color and the remaining about 50% shape area is unfilled, i.e. partially hallow inside, and the unfilled shape area could take one of the following three options, i.e. the top ½ or bottom ½ or mid ½ of the shape of the number as unfilled, i.e. hallow shape to represent the three letters in the group, and if needed for the $4^{th}$ letter, the mid ½ of the number shape is filled. As an extension of the embodiment, under this method, the unfilled shape area is filled in with one of three different colors, each color representing the three letters and if needed for the $4^{th}$ letter, it is either unfilled or filled with a $4^{th}$ color, as an example, solid red color to represent the $1^{st}$ of the three alphabet letters, in white color to represent the middle alphabet letter and in blue color to represent the $3^{rd}$ alphabet letter in the group. When a fourth alphabet letter is present in the group, the partially hallow shape of the number could be in yellow color. Another alternate novel approach would make use of the pre-defined and selected specific group of either numbers 1, 2, 3 and 4 written in small font, or alphabet letters as tiny capital letter symbols, namely, F or S or T or A, as a sub-script below right or as a super-script above right of or in a place close to the number character to designate the "First" or the "Second" or the "Third" of the three alphabet letters group, and if needed to designate the "Additional" fourth letter in the group respectively. Here, in the coded telephone number system, the number originally present in the coded message would not have any of the above-described alphabet letters distinguishing features.

Application of any one of above discussed or similar novel and unique differentiating approaches would enable one to differentiate and distinctly represent all alphabet letters in a coded message when they are converted into a coded number based message and would allow a coded message to be unambiguously communicated as a coded/vanity number based message and while writing or printing or describing or displaying or entering or scanning the coded number based message such as the coded telephone message into any vanity telephone/coded message document or a record keeping system or a device. Here the examples of system or documents include telephone book (i.e. the White Pages or the Yellow Pages), business card, letter head, stationary, e-mail, iPhone and the like where a telephone number is normally written or entered or recorded or displayed.

Uses of Vanity Telephone Numbers

According to one embodiment, the examples of the various coded vanity telephone numbers described here may be used not only by individuals, but also by an organization (for-profit or not-for-profit), an educational institution, a commercial enterprise, a group, a society, or a branch of a government etc., and for personal or commercial purposes such as to communicate a promotion oriented or a commercialized coded message via their vanity telephone number on any of the product/service promotional products and/or any well-known and common marketing and/or advertisement print or electronic media including social media. For an example, General Electric company, GE®, may wish to express, "We Bring Good Things To Life" ® as its corporate message, and this message may be coded as GE's vanity telephone number and used in place of their currently used 800 number. Another example may be to code Dillard's® (one of the well-known department stores) statement, "We want to be your Store®", as the Dillard's® vanity telephone number and use it, instead of their 800 number, as their customer service number. In cases as above, one may utilize up to seven or eight characters out of the available ten characters. For the non-individual examples described above, the use of a different set of first 3 digits, as an example, the earlier described "786" and the like may be used. Other such example with two characters would be "76" corresponding to "PN" which is the abbreviation of "Personal Number".

As another embodiment, these coded vanity telephone numbers could be used by anyone, i.e. individuals or an organization or a company etc., as their vanity fax numbers. As an extension of this embodiment, the vanity fax numbers could be assigned a special vanity three digit area code, as an example, "836" for "VFN" which is the abbreviation for "Vanity Fax Number". Similarly, as another example, personal vanity fax numbers could have a unique 3 digit vanity area code, "736" for "PFN" which is the abbreviation for "Personal fax number".

Printed Matters and Devices for Displaying, Communicating and Sharing the Coded and Compressed Messages According to one embodiment, a coded message including a personalized or an individualized or an entity based coded message or a company specific or a product/service specific coded message may be created by applying one or more of the inventive coding instructions, concepts, methods, steps and guidelines disclosed herein and communicated via display spaces such as printed display spaces or matters and devices. Examples of printed display spaces or matters include personal printed matters such as personal wears such as shirts including t-shirts and sweatshirts, sweaters, robes, pajamas, pants including sweatpants, jeans, scarfs, undergarments, aprons, ties, hats, caps, and the likes, personal stationery or letter pad, personal checks, personal greeting cards, notebooks, and the like, or commercial printed matters such as product/service promotional products, i.e. products commonly used to display product/service/company name or logo or graphic image, or an advertisement message, or a promotion slogan etc., such as display banners, display posters, bumper stickers, print advertisement medium such as newspaper, magazine and the like, printed personal wears, and other promotional products such as bags, caps, pens, mugs, coasters, paper weights, key chains, towels and the like, business cards, company stationary and/or letter pads, company name display spaces, company publication, other commercial documents and the like. Examples of devices include a computing device including microprocessor-based system, network PC, and the like, a PC, a desktop computer; a programmable consumer electronic devise such as a laptop, a cell phone, an iPhone and including a handheld device such as a Smartwatch, an electronic camera, a Smartphone, an iPad, a programmable virtual reality (VR) headset, augmented reality (AR) devices such as Google Glass, the Smart Helmut, an AR device developed by Augmedix, Schneider Electric and the like companies, and the like. Generally, the definition of programmable consumer electronic devices includes personal electronic communication devices such as PCs including desktops and handheld devices such as iPhones, iPods, laptops and the likes. Additional examples of printed display spaces include personal sportswear, personal checks and the likes, wall pictures, calendars, planners, and the likes, engraved items such as mugs, tiles including display tiles, photo frames, paper weights, and the likes, product/service promotional products such as print/electronic advertisement billboards, service vehicles, and personal items such as socks, shoes, sandals, lawn chairs and the like.

According to an embodiment, a coded message in a compressed compact format communicating a message expressed in a text could be created by one on his/her/one's electronic device or a system such as a computing system environment or configuration including a personal computer such as a laptop or a desktop computer, or other personal electronic devise including a cell phone, an iPhone, an iPod, or a handheld device such as Smartwatch, Smartphone, and the like, by applying one or more of the computer-executable inventive coding instructions stored in an App or a software program installed in the device or system to the words or the sentence(s) in the text communicating the message, and the compressed coded message in the compact format could be displayed on the device or the system display space and/or communicated to and/or shared with another person or group of people, via his/her/one's device or system, and/or another person's or group of people's similar systems or devices optionally having the computer-executable inventive coding and decoding instructions disclosed herein, stored in an App or a software program or the like, installed. As another embodiment, one (or more) encoded message(s) in a compressed compact format could be created by an individual in a computing system environment or configuration including a desktop or laptop computer or a personal electronic communication devise such as a cellphone or an iPhone or an iPod, or a handheld device, or the like by applying the stored inventive coding instructions, coding concepts, steps, rules, methods, and guidelines disclosed herein to the words or the sentence in one (or more) text(s) communicating the message and displayed by the individual on his/her/their computing system display space and/or communicated to, or shared or exchanged with one (or more) other individual(s) via his/her/one's and/or one (or more) other individual(s)'s computing system including electronic communication devices such as a computer or a laptop or a desktop or a cell phone or an iPhone, or a handheld device, or the like, and understood by the individual receiving the compressed coded message by unambiguously decoding the compressed coded message received by applying the inventive decoding instructions, methods and guidelines disclosed herein stored in a software program or an App stored in his/her/one's computing system under consideration and displaying the decoded one (or more) text(s) in its original form on the computing system display space. As yet another embodiment, an individual could unambiguously decode a coded message in a compressed format by receiving the coded message from another device, or by scanning or capturing or reading or viewing the displayed coded message via the individual's device such as a computing system including a PC or a laptop or a desktop computer, or a personal electronic communication devise including a cell phone, an iPhone, a smart phone, an iPod and the like, or a handheld device, or the like and by applying the inventive decoding instructions, methods, steps, and guidelines disclosed herein stored in a software program or an App stored in the individual's device under consideration to the scanned or captured or read or viewed or received coded message in a compressed format and display the decoded text message on the individual's device in its original form. As an additional embodiment, a personalized or an individualized coded message in combination with one or more personal or individual specific information (optionally in a coded form) could become a personalized or an individualized message code, or an individualized or a personalized identity code for a person such as one's logical security feature, i.e. one's password or one's unique code or a digital signature of the user or owner of an electronic communication device such as a PC or a cell phone or an iPhone or an App. Examples of such personal information include date, month and/or year of birth, gender, zip or pin code of where the person lives, the name of the place of birth, and the like. This individualized or personalized identity code created per this invention may optionally be bar coded and/or as a part of identification code system and used in an identification code (card) system such as the driver license, a company issued identification card/badge, personal bank card, and the like.

As an embodiment, a computer-readable medium, such as a software program or an App or the like stored in or incorporated into a device or system such as a computing system environment including a computing device including a PC, a desktop computer; a laptop device such as a laptop computer; a programmable consumer electronic devise such as a cell phone, an iPhone, and the like; a handheld device such as a Smartwatch, an iPod, a Smartphone, or the like, comprises computer-executable inventive coding instructions disclosed herein for encoding a text message and creating a compressed message in a compact format for communication via or display on a display medium or space, and computer-executable inventive decoding instructions disclosed herein for decoding the compressed message and unambiguously re-generating the message expressed in the text and displaying the decoded text on the device or system display space under consideration.

As an embodiment, a device such as a computing system environment including a computing device, a laptop device, a desktop computer; or a programmable consumer electronic devise such as a PC, a cell phone, an iPhone, an iPod, and the like; or a handheld device such as a Smartwatch, a Smartphone, and the like incorporated with the inventive coding and decoding methods, steps, guidelines and instructions in the form of stored computer-executable instructions medium could unambiguously decode a compressed message in a compact format communicating a message expressed in a text by scanning, including taking a picture of or viewing or reading the displayed, or upon receiving from another device, such a compressed message and applying the stored inventive decoding methods, steps, guidelines and instructions, and display the decoded text on the device display space, and/or share with and/or communicate to another person or device the decoded text in its original form.

In the example of a printed matter such as a personal check book, as per one embodiment, the disclosed coded message including the individualized message code or the personalized message code, may be printed in any selected section of a check including the back of the check. The coded message may be distinguished from the rest of printed matters by using a special marking or a notation or using a specific color such as blue, green and the like or in a different font size and preferably one size smaller or bigger so that one may recognize that this check contains a coded message. In another example of a business card or a company communication/document, a company or an individually owned company may print a product or a service or the company specific coded message and or a coded vanity telephone number. Similarly, the coded messages optionally including vanity telephone numbers and/or e-mail addresses may be printed on business stationeries, documents or other similar company publications.

APPENDIX B

Examples of Coding Instructions and Guidelines
Suggested Sequence of Steps for Coding Sentences Step 1: Does the sentence to be coded start with the subject selected from the group consisting of "I", "We", "My_ _ _" "Our_ _ _", or "a person name"? And, is the verb from the most commonly used group consisting of "am", "are", "is" and "love(s)"? If so, follow the guidelines and examples used under the Table IA.

Does the sentence to be coded also include a commonly used verb modifier for the purpose of communicating one's love or affection or a special feeling or liking or interest for another person? If so, follow the guidelines and examples used under the Table IB.

Does the sentence to be coded start with "I am" or "we are" or "a name of a person of interest is" and in combination with selected commonly used specific modifiers associated with being "in love with" or expressing a favorable or positive feeling of association toward a person of special interest ("---") or oneself, or an entity or a place of special interest? If so, follow the guidelines and examples used under the Tables IC, VIIIA, VIIIB and Table IX.

Step 2: If the verb in the "to be coded" sentence is one of the commonly used, use Table III for the common verbs and their codes.

Step 3: If the sentence to be coded starts with "My _ _ _" or "Our _ _ _" where "_ _ _" refers to a "family/personal relationship based names", refer to Table II for the names codes. This name code should be combined with the code for "My" or "Our" when the sentence starts with either "My ---" or "Our ---" as in Step 1 or 2 above.

Step 4: If the sentences to be coded have person's first names as the subject and/or object, see Table VI or VII for the codes corresponding to the male or female first names, respectively and for the verbs in the sentences, refer to Table III.

Step 5: For object codes, the following options, as examples, are available: for modifiers such as adjectives, see Tables IV A-F; for nouns/pronouns, see Table V; for nationality or the name of a place see Table IX.

Section A

To illustrate the various aspects of the invention, the following set of general coding instructions and guidelines are explained as examples.

As a general rule, when a word, depending on the context, could be either a noun or adjective, or could be either a conjunction or an adverb or a noun or a preposition, the word is coded and displayed as the context of the word dictates to ensure unambiguous communication.

As another general rule, when possible, the same ordering scheme or sequence designation approach would be applied to designate the ordering scheme or sequence designation code character(s) for the word(s) representing the various component part(s) of a sentence communicating a desired message in a coded form or as a coded message.

As a general rule, the one or more pre-selected unique or special characters as the code distinguishing or specific feature(s) for the one (or more) component part(s) of speech or the one (or more) word(s) representing the one (or more) component part(s) of speech communicating a message per this invention are placed as a part of the corresponding one or more code characters for the one (or more) component part(s) of speech or the word(s) representing the one (or more) component part(s) of speech being coded, as needed and where needed, to unambiguously communicate the message per this invention on a display space. As an extension of this general rule and embodiment, one or more pre-defined character visible features incorporated into the one or more code characters in a code as the code character distinguishing or specific feature of the code representing the same or one of the other component parts of speech used, as needed and when needed, to unambiguously communicate the message per this invention and when displayed on a display space.

Table IA:

Sentences starting with the combination of most commonly used subject/verb words per this invention and their codes:

| Subject/verb | Code | Object |
|---|---|---|
| I am | IA | |
| We are | WA | |
| We are from | WAF | |
| We are the | WA | |
| I am a/an | IA | |
| I am from | IAF | |
| I am the | IA | |
| My "_ _ _" is | M_ _ _ I | |
| My "_ _ _" are | M_ _ _ A | |
| Our "_ _ _" is | O_ _ _ I | |
| Our "_ _ _" are | O_ _ _ A | |
| I love (my) --- | IL (M)--- | |
| We love (our)--- | WL (O)--- | |
| My "_ _ _" love(s) | M_ _ _ L | |
| Our "_ _ _" love(s) | O_ _ _ L | |

Here, "_ _ _" refers to, as an example, "family or personal relationship based" names such as wife, daughter(s), grandchildren, girlfriend etc. Optionally it may also refer to one's preference for a place or expression of feelings such as love and the like.

As an embodiment and a general rule, per this invention, the codes for the most commonly used subject words such as the neutral based person names (examples, "I", "We" and the like), the family/personal relationship or religion based person names (examples see Table II) and the most commonly used verbs such as, "am", "are", "is", and "love", would have a single alphabet letter character written in the upper case form and the code characters are the starting first alphabet letter character in the corresponding words.

As an embodiment, in the case of neutral based person names, i.e. pronouns such as, "I", "You," "We", "Us", "They" or "Me, their corresponding single starting alphabet letter characters, "I", "Y", "W", "U", "T" or "M" respectively, with a dot above the character, as the code distinguishing or the specific feature, would be the code for those neutral based person names. As an extension of this embodiment, in the case of other neutral based pronoun words such as "My", "Our", "Your", and "Their", or "It", their corresponding single starting alphabet letter characters, "M", "0", "Y" and "T", or "I" respectively with a dot below the character would represent as the code for these neutral based words. Here, in both cases, the dot could optionally be at the center above or below the code character, and could be in the same or in a different color than the code character. In the case of other neutral based pronoun words, such as "Mine", "Yours", "Ours", "Thiers" and "Them", their respective codes could be "M1", "Y1", "O1", "T1" and "T2" respectively with a dot below the characters, "M", "Y", "0", and "T". In the case of "His" or "Her", in their code character, "HS" and "HR", the H for "his" would have a line below H and the H for her would have a bar/line above H.

As an embodiment, a set of code characters, as in Table IA, starting with the most commonly used subject code characters such as "I" or "W" or "M" or "O" and ending with most commonly used verb code characters such as "A", "I", or "L" and optionally including modifier code character(s) in between them, would be written as one code block and optionally in one color. Here, as the distinguishing or the specific feature, the subject code characters, "I" or "W", would have a dot above them and the subject code characters, "M" or "O" would have a dot below them.

As a corollary embodiment, the set of code characters for other selected combinations of most commonly used subject and verb such as "IAF", "IAT", WAF" or "WAT" (above Table IA), would also be written as one code block and optionally in a specific color. Here, as above, the subject code characters, "I" or "W", may have a dot above them. Note "a" or "an" or "the" is assumed, as needed and appropriately, to be part of the given noun/pronoun word that follows and is included when the given noun/pronoun code is decoded.

As a general rule, if the message conveyed by the subject/verb code block, in the context of the coded message, would be unambiguous and if the subject code character(s) include the corresponding code distinguishing feature(s), the code character(s) for the verb may optionally not have a hyphen below the character(s).

Table IB:

Sentences communicating specifically desired messages such as that start with "I love ---" or "We love ---" or "a name of someone loves ---" and in combination with examples of selected modifiers specific for one of the intended purposes of the invention and their corresponding codes:

These groups of examples represent special combinations using commonly used subject such as, "I", "We" or a name of a person with a commonly used verb such as "love" and in combination with commonly used selected specific modifiers such as adverbs to communicate a specifically desired messages per this invention. Here "---" preferably refers to a name of a family or personal relationship based name such as "my/our children" or "my wife/husband" or a name of a person of special interest. Optionally other examples of names of something special are subjects of personal significance, i.e. something very special to a person such as the country, religion, entity such as the university, and the like. The selected specific commonly used modifiers/adverbs could be single worded or multi-worded.

Here, as the distinguishing or the specific feature of the pre-selected specific commonly used modifiers, i.e. adverbs listed here, the numerical characters representing the pre-selected specific modifiers, as an example one to nine, would have above it "two hyphens including some space, about 5-10% of the width of the code character, in between the hyphens and one of the hyphen(s) with an arrow attached at the right or the left end, i.e. a right or a left side/direction pointing arrow", and both hyphens including the space between them occupying the full width of the space above the number character. Here, each hyphen, optionally in bold, with or without arrow would occupy about 30-40% of the width of the character. The arrow when on either side of the hyphen, could occupy about 20-40% of the width of the hyphen. Alternatively, instead of the hyphen with an arrow, another special character such as a small solid shape such as square, diamond, circle or triangle without touching the other hyphen could be used. In such case, the other special character would occupy about 10-20% of the width of the code character, here the number, and both of them with some space in between them would be above the number character covering the full width of the character. The presence of one of these set of distinguishing or specific features over the number code character is to communicate that the number represents one of the pre-selected specific group of modifiers, such as adverbs, for one of the specifically intended purposes of the invention highlighting or emphasizing the significance of the message being communicated by the verb. In this example, the specifically intended purpose of the message is one person's love or affection or a special interest for another person or a subject of personal significance. The direction of the arrow or the location side of the small solid shape, i.e. left or right side to the hyphen, indicates that the number code representing the pre-selected modifier acts upon or is related to by enhancing the significance of the coded message communicated by the verb in the direction of the arrow or the location side of the small solid shape i.e. to its right or its left side.

Group 1;

Below are examples of selected commonly used specific verb modifiers for one of the intended purposes of the invention for sentences communicating specifically desired messages that start with "I love ---". Similar examples could be created by substituting "We love ---" or "---loves ---" in place of "I love ---". Here, in the Group 1 examples below, the number character in the code has above it two hyphens and the hyphen on the left side has a left direction pointing arrow at the end and the left direction of the arrow indicates that the number code acts upon or is related to by enhancing the significance of the coded message communicated by the verb to its left side, here the verb, "love".

| Special combination with selected adverbs | Codes |
| --- | --- |
| I love - - - dearly | IL - - - 1 |
| I love - - - deeply | IL - - - 2 |
| I love - - - hopelessly | IL - - - 3 |
| I love - - - insanely | IL - - - 4 |
| I love - - - madly | IL - - - 5 |

The other examples of selected verb modifiers, i.e. adverbs are as follow with their corresponding codes.

I love ---passionately IL ---6
I love ---truly IL ---7
I love ---very much IL ---8
I love ---wholeheartedly IL ---9

Group 2;

Per another embodiment, below is an another list of examples of sentences communicating specifically desired messages such as one person's love, affection or a special interest for someone special (coded as ---) where the position of the verb modifier is in front of the verb communicating the desired message. As examples, I madly love --- 15L---
I very much love --- 18L---

In the above set of examples in Group 2, the number character in the code has above it two hyphens and the hyphen on the right side has a right direction pointing arrow at the end indicating that the number coded modifier acts upon or is related to by enhancing the significance of the coded specific message communicated by the specific verb to its right side.

Here, in Groups 1 and 2, it is noted that the selected adverbs have similar likelihood or probability of use per this invention to convey the desired message. Therefore, as an embodiment, the pre-determined ordering scheme or the sequence designation assigning characters, i.e. the numerical characters one to nine, for the selected adverbs is based on applying the alphabet sequence of the 1$^{st}$ or the 2$^{nd}$ starting alphabet letter of the adverb. The sequence designation or ordering scheme could also be predetermined based on the variation in the number of code characters/length of the words in each combination, and among the words with similar number/length, optionally based on the sequence of the alphabet letter of either the staring letter(s) or the letter next to the common starting letter(s). The above example set of the selected specific verb modifiers, i.e. the adverbs and their sequence designation coded numbers with the distinguishing feature, per one embodiment, could be used for coding in combination with other combination of modifier words (see Table IC) or different specific verbs such as "adore", "like" "cherish" and the like communicating a specifically desired message.

Here under Groups 1 and 2, substituting "We love ---" or "--- loves ---" for "I love ---", there would be two additional sets of codes comparable to the one in the above group examples. One could possibly come up with additional examples of similar pre-selected special adverbs for use here using "I love ---", or "We love ----" or "--- loves ---" and in such cases, the selected special adverbs would be coded accordingly. Examples could be, I love ---immensely, intensely, uncontrollably or zealously and the like (see below). Using "cherish" instead of "love", there would be three sets of similar codes, one for starting with "I" and the other starting with "We" and the third starting with a person's name, "---". As explained herein with the above examples, the letter characters, "I", and "W" would have a dot above them and the name of the person code characters would have a line/bar either above or below them, and the numerical characters would have two hyphens and one of the hyphens with either a left or a right direction pointing arrow above them.

As an example, using "ILV" for "I love" (or "WLV" for "We love"), there would be another set of nine codes, using single or multi-word adverbs, provided a part of or the rest of the sentence is non-phonetically coded per this invention. Examples are, "I love --- so much" as "ILV ---1"; "ILV --- immensely" as "ILV ---2"; "I love --- uncontrollably" as "ILV ---3"; "I love --- unconditionally" as "ILV ---4"; "I love --- with all my heart" as "ILV ---8". Here the sequence designation is based on the length of the adverbs under consideration. As explained above, here as an example, the letters "I" and "W" would have a "dot" above them and the numerical characters would have two hyphens, and one of the hyphens with a left pointing arrow, above them.

Table IC:

Examples of sentences communicating specifically desired messages such as that start with "I am" or "we are" or "a name of a person is" and in combination with selected commonly used specific modifiers associated with being "in love with" or expressing a favorable or positive feeling of association toward a person of special interest ("---") or an entity or a place of special interest and their corresponding codes:

Group 1:

Here, the person of special interest ("---") could be a family member or another relationship based person and the code for the term "in love with" in combination with one of the selected commonly used specific modifiers that expands or enhances the meaning of "in love with" is "xL" where "x" is the designated numerical code for the commonly used specific modifier (from Table IB Group 1) and "L" is the single letter code character for the term "in love with" specific for use, i.e. only applicable when used in combination with one of the above pre-selected specific modifiers represented by a number character "x" and with the below defined distinguishing or specific feature above it. See the following sentence. Here, as an embodiment, as the distinguishing or the specific feature of the selected specific commonly used modifier, when used in combination with the special "L" code character (i.e. here L is for the term "in love with") as a part of the sentence starting with "I am" or "We are", the numerical character x, as an example one to nine, would have above it two hyphens including some space, about 5-10% of the width of the code character, in between the hyphens and one of the hyphen with an arrow attached at the right end, i.e. a right direction pointing arrow, and both hyphens including the space between them occupying the full width of the space above the number character. Here, each hyphen, optionally in bold, with or without arrow would occupy about 30-40% of the width of the character. The arrow, when on either side of a hyphen, could occupy about 20-40% of the width of the hyphen. Alternatively, instead of a hyphen with an arrow, another special character such as a small solid shape such as square, diamond, circle or triangle without touching the other hyphen, could be used. In such case, there would be only one hyphen and the other special character would be the small solid square, diamond, circle or triangle occupying about 10-20% of the width of the code character, here the number, and both of them with some space in between them would be above the number character covering the full width of the character. The presence of one of these set of features over the number is to communicate that the number represents one of the selected specific group of modifiers used in combination with the special code character "L" (i.e. as "xL") for one of the specifically intended purposes of the invention highlighting or emphasizing the significance of the message being communicated by the code "L" on the right side. In this example, the specifically intended purpose of the message is one person's love or affection or a special interest for another person. The direction of the arrow or the location side of the special character indicates that the number code acts upon or is related to by enhancing the significance of the coded message communicated by the special letter code "L" to its right or left side.

Here, in the examples listed below, since the numerical code "x" would have the above described distinguishing feature above it and the letter character, "I" would have a dot above it, the meaning of the combined message code would be unambiguous. Here, the modifier designating numerical character is selected based on the alphabet sequence of the starting letter of the modifier word among the group of modifier words (see the below table) used in combination with the term "in love with".

| Special Combination | Code |
| --- | --- |
| I am dearly in love with - - - | IA 1L - - - |
| I am deeply in love with - - - | IA 2L - - - |
| I am hopelessly in love with - - - | IA 3L - - - |
| I am insanely in love with - - - | IA 4L - - - |
| I am madly in love with - - - | IA 5L - - - |

| Special Combination | Code |
| --- | --- |
| I am passionately in love with - - - | IA 6L - - - |
| I am truly in love with - - - | IA 7L - - - |
| I am very much in love with - - - | IA 8L - - - |
| I am wholeheartedly in love with - - - | IA 9L - - - |

In the above set of examples, "I" could be replaced with the code for the name of a person and the verb "am" is replaced by the code "I'" for the verb "is" to communicate similar set of desired messages. Here, in the above table, there are two code blocks, one as "IA" and the other as "numberL---" separated by a space (as above) clearly communicating the coded message.

Group 2:

Per another embodiment, below is a list of another set of commonly used specific nine single worded or multi-worded, modifiers that could be used in a sentence that starts with "I am" or "We are" and expressing a person's favorable or positive feeling of association toward a special entity or a specific special place or a person of special interest. In this example, the sequence designating numerical code character, i.e. one to nine for x, as the distinguishing or the specific feature of the selected specific commonly used single or multi-worded modifier, when used as a part of the sentence starting with "I am" or "We are", would have above it two hyphens including some space in between them and one of the hyphen with an arrow attached at the left end, i.e. a left direction pointing arrow, and both hyphens including the space between them occupying the full width of the space above the number character. The presence of this feature over the number is to communicate that the number represents one of the selected specific group of modifiers, when used as a part of the sentence starting with "I am" or "We are" for one of the intended purposes of the invention, highlighting or emphasizing the significance of the message being communicated by the code "IA" or "WA" on the left side. In this example, the intended purpose of the message is to communicate one person's love or affection or a special interest for another person or an entity or a place. The direction of the arrow indicates that the number code acts upon or is related to by enhancing the significance of the message communicated by the code on its left. As shown below, the code is written as a single code block.

"I am for" "IA1"
"I am from" "IA2"
"I am fond of" "IA3"
"I am proud of" "IA4"
"I am a member of" "IA5"
"I am a native of" "IA6"
"I am an alumni of" "IA7"
"I am a student of" "IA8"
"I am infatuated with" "IA9"

Here, the code characters in the male or female person name codes and the code characters, "I'" and "W'", for the neutral based/oriented person names, "I" and "We", would have the corresponding distinguishing or the specific feature of the person name code as explained earlier under Section A in Appendix B.

Here, in the above Group 2 examples, the listed group of selected modifiers has one or more words in combination, and the ordering scheme or the sequence designating character, as an example, number one to nine to the listed group of selected modifiers is based on the increasing length of the modifier among the selected group of modifiers. Note in this example, the selected modifiers communicate different types of messages. They are selected on the basis of one of the objectives of the invention, i.e. the intended purpose of the message being one person's love or affection or a special interest for another person or an entity or a place. The length corresponds to the "one or more words in combination". Alternatively, one could designate the number one to nine on the basis of the decreasing length of the modifier among the selected group of modifiers.

Optionally using "IM" for "I am", there would be another similar set of 9 (nine) codes provided a part of or all the rest of the sentence is non-phonetically coded per this invention. As an example, "I am proud to be a" and "I am crazy about" could be coded as "IM1" and "IM2" respectively. Using "WA" for "we are", there would be a similar set of 9 codes. Using "WR" for "We are" there would be a similar set of 9 codes provided a part of or all the rest of the sentence is non-phonetically coded per this invention. As explained above, the single letter code characters "I'" for the word "I" and "W'" for the word "We" would have a dot above it. In addition, the novel use of two hyphens and one of the hyphens with either left or right direction pointing arrow for the number characters provides additional unambiguous message communicating options.

Table II:

Examples of "Family or Personal Relationship Based Person Names" and Their Codes. These relationship based person names generally start with or often are used in combination with either "My" or "Our" as the first starting word. Examples are "My wife . . . ", "Our grandchildren . . . ".

| Name | Code |
| --- | --- |
| boy (s) | B(S) with a line under B |
| brother(s) | R(S) with a line under R |
| child (or children) | C (N) with a dot over C |
| daughter (s) | D(S) with a line/bar over D |
| dad, daddy | D with a line under |
| father | F with a line under |
| family | F with a dot over |
| friend | R with a dot over |
| girl(s) | G(S) with a line/bar over G |
| guy(s) | G(S) with a line under G |
| Hubby or husband | H with a line under |
| kid(s) | K(S) with a dot over K |
| lover (male) | L with an underline |
| lover (female) | L with a line/bar over |
| lover (neutral) | L with a dot over |
| mom, mommy, mother | M with a bar/line over |
| man | M with a line under |
| parent(s) | P(S) with a dot over P |
| pop | P with a line under |
| son(s) | S(S) with a line under the 1$^{st}$ S |
| sister(s) | S(S) with a bar/line over the 1$^{st}$ S |
| Wife | W with a line/bar over |
| woman | O with a line/bar over |
| girlfriend | Q (optionally with a line/bar over) |
| boyfriend | Z (optionally with an underline) |
| grandson(s) | GS(S) (S following G with a line under) |
| grandmother | GM (M with a line/bar over) |
| mother-in-law | MI (M with a bar/line over) |
| three sons | 3S (S with a line under) |

To code "grand" as in grandsons, the letter "G" will be added in front of the relevant code. To code "ex" as in Ex-wife, the letter E would be added in front of the relevant code. To code "step" as in step-mother, the letter "5" would be added in front of the relevant code. To code "in-laws" as in mother-in-law, the letter "I" would be added after the relevant code. To specify the number of "relationship based person names" being coded (such as 3 sons), the corresponding digit would be added in front of the relevant code from the above list.

Here, as the distinguishing or the specific feature of the code for the family or personal relationship based person name, the single alphabet letter character code would be underlined for the male sex and would have a bar/line over it for the female sex, and the underline or the line/bar over would fully cover, i.e. be fully under or over, the single alphabet letter character code. In cases of neutral based family relationship names such as parent(s), kid(s) and the like, as the distinguishing or the specific feature of the code for the family or personal relationship based neutral person name, the single alphabet letter character code would have a dot over it and preferably at the center above the single character occupying about 15-20% of the width of the character. However, the "number character" as in 3 children or the additional second character such as G for grandmother/father or E for the "Ex" would neither be underlined nor has a bar/line or a dot over it.

In the case of family relationship based person names where more than one version, i.e. name variation, is possible, as in the following examples: dad and daddy; mom, mommy and mother; hubby and husband, another novel coding approach could optionally be followed. Here, per one embodiment, the name variations are first listed based on the order of the $2^{nd}$ or $3^{rd}$ or subsequent starting alphabet letter sequence and then a sequence designation number character is assigned to the $2^{nd}$ and the subsequent name variation in the list to follow the single alphabet letter character as shown below with examples. Here, only the single alphabet letter character would have either a line above or below the character. Alternatively, the designation number character could be written as a subscript to the single code character.

Dad and daddy D and D1
Mom, mommy and mother M, M1 and M2
Hubby and husband H and H1

Similarly, the other common names for grandfather [grandpa, gran(d)daddy] and grandmother [grandma, gramma, and granny] could be coded.

Generally, the code reference to a singular or a plural family member (example daughter or daughters) will be reflected in the verb code. Example: "Our daughter is . . . " and "Our daughters are . . . ". Therefore there should be no confusion in coding or decoding the coded message. However, in some cases, such as "We love our daughter vs. daughters", there is a need to differentiate the singular "daughter" from the plural "daughters". In such cases, as an embodiment, the alphabet letter "s" could follow the daughter code character "D" as "DS" and here the character "D" only would have a line/bar over it. For other examples see Table II.

If needed, the code character "Q" for "girlfriend" could have the additional feature, namely a line/bar over that is specific for the female name code. Similarly, the code character "Z" for "boyfriend" could have the additional feature, i.e. an underline that is specific for the male name code. Alternatively and optionally, one could use the code "BF" with a line under "B" for boyfriend and "GF" with a line over G for girlfriend.

As an embodiment, when the word "My" or "Our" is used in combination with a family or a relationship based person names such as "wife" or "children", as in "My wife" or "Our children", the code character 'M' for "My" and the code character 'O' for "Our" optionally may not have a dot below the character. However, the single alphabet letter code characters, "W" and "C", for the words "wife" and "children" respectively would have a line/bar and a dot respectively over them. As another embodiment, however, if there is another word, as an example a modifier included, as in examples, "My beautiful wife" or "Our adorable daughters" or "My granddaughters", the single code characters "M" for "My" and "O" for "Our" may have a dot below the single character. In such cases, since the desired message would be clear because of the distinguishing features included in the code characters for the words, "My", "Our", "wife", and "daughters", the first code character for the modifier may optionally not have the symbol character as the specific feature for a modifier. Alternatively, if the $1^{st}$ character of the modifier code includes the modifier specific feature, optionally the code characters, "M" and "O" may not have a dot below them.

Table III: Examples of commonly used verbs, including helping verbs, per this invention and their "codes."

| Verb | Code |
|---|---|
| act | A4 |
| admire | A2 |
| adore | A1 |
| appreciate | A3 |
| belong | B |
| cherish | C |
| detest | D5 |
| dig | D2 |
| dislike | D4 |
| display | D3 |
| dream | D |
| drive | D1 |
| enjoy | E |
| exhibit | E1 |
| expose | E2 |
| express | E3 |
| find | F |
| give | G |
| has/have/had | H |
| hate | H1 |
| love | L |
| like | L1 |
| look | L2 |
| make | M |
| may/must | M1 |
| need | N |
| play | P1 or PL |
| prefer | P |
| prize | P2 or PR |
| require | R1 |
| resent | R2 |
| respect | R3 |
| show | S |
| think | T1 or TH |
| treasure | T |
| value | V |
| want | W |
| work | W2 |
| worship | W3 |
| was/were | W1 |

In general, the verbs listed in the above Table III are representing the present tense and selected on the basis of their general applicability for use per this invention and listed in alphabet sequence of the starting first alphabet letter for the convenience or ease of use for coding purposes.

The code characters for these verbs are based on the inventive guidelines described in the earlier sections. Since the letter "A" has been assigned as the single letter code for the most commonly used verbs starting with the letter "A" namely "am" and "are", the codes for the other verbs starting with the letter "A" begin at A1. Similarly, since the letter "R" could be used as the single letter code character to designate one of the other most commonly used verbs, "are", the code for the other verbs starting with the letter "R" begins with "R1".

As an embodiment, in the case of most commonly used verbs with a relatively high probability of use per this invention, such as "am", "are", "is" and "love", their starting first alphabet letters are assigned as their single letter verb code characters. For the remaining verbs, the ordering scheme or the sequence designation code characters are based on the probability of use per this invention concept and/or the alphabet sequence of the letter next to the first starting alphabet letter of the verb word. The examples are listed in Table III above. By expanding Table III or by creating additional similar table(s), the codes for other verb classes, such as "Helping or Auxiliary verbs", phrasal verbs and "to be" verbs could be developed by applying the inventive coding concepts, steps, and guidelines disclosed herein. For examples of "Helping or Auxiliary verbs", phrasal verbs and "to be" verbs refer to the two books cited in earlier sections, McGraw-Hill and Barnes & Nobles. As an embodiment, using Table III as an example, the same verb code represents the different, i.e. singular or plural, forms of the verb and matching in number and person of the subject in the coded message. As an extension of the embodiment, the "same verb code characters" are used to represent the past, the present or the future tense of the verb but incorporating inventive differences in the verb code distinguishing or specific special character, i.e. the hyphen below each verb code characters, as follow. As an embodiment, as an example, one option is to use the normal length hyphen below the verb code character(s) for the present tense and a longer than normal hyphen for the past tense and a shorter than the normal hyphen for the future tense. Another option would use normal length hyphens below all the verb code characters but include an arrow at the end of the normal length hyphen only below the 1$^{st}$ code character, the right direction pointing arrow to represent the future tense and the left direction pointing arrow to represent the past tense while the normal length hyphen without any arrow to represent the present tense. A third option could make sue of a character visible feature and as an example, the normal length hyphen shown in thin (light), normal and bold (dark) shade representing the three tenses. As an extension of the embodiment, the three "perfect tenses" and the three "progressive tenses" of the verb could be coded by assigning a novel alphabet letter character, "H" and "G", optionally in front of the 1$^{st}$ code character or at the end of the code for the verb under consideration and the tense would be reflected by any one of the novel concepts discussed above and the hyphen below the letter character "H" or "G" could be in bold face to specifically distinguish it as representing the "perfect or progressive tense" respectively. Some examples (using the verb codes from Table III in Appendix B) are "A1G" for "adoring", "DG" for "dreaming", "GG" for giving, "LG" for "loving", "PLG" for "playing", "WG" for "wanting" and the like. Here, each code character would have a hyphen below it. In the case of passive voice verbs, the two verbs are coded separately by following the disclosed guidelines.

As an embodiment, in the case of the above listed most commonly used verbs, their single code character may optionally have a hyphen below the character. As another embodiment, the character(s) of a verb code could be written in a color such as yellow, orange, brown (as an option to represent the three tenses), and the like different from the color of the other characters in the coded block, in a different format (such as italic) or font size.

As a general rule and an embodiment, the codes for the subject and the verb, including their modifier(s) if any, of a sentence communicating a desired message per this invention could be combined and written as a single code block. As yet another embodiment, if the most commonly used subject word, "I" or "We" or "My" or "Our" or a person's name is preceding the verb, the code characters for these subject words, i.e. "I", "W", "M" or "O" respectively could optionally have a dot above for "I" and "W", and optionally below for "M" and "O", and the code characters for the person's name could have a line over or under the characters. If the meaning conveyed by a subject/verb code block in the context of the coded message, as an example, as in above cases, would be unambiguous by the presence of a dot or a line either under or over the subject character, the code character(s) for the verb may optionally not have a hyphen below the character(s).

Table IVA:

Examples of commonly used modifiers with first letter A, L, W, and Z and their corresponding codes.

| Word | Code |
|---|---|
| abnormal | AB |
| abrasive | AB1 |
| active | AC |
| adamant | AD |
| admirable | A6 |
| adorable | A1 |
| adventurous | A3 |
| affectionate | A4 |
| ageless | AG |
| aggressive | A9 |
| ambiguous | A8 |
| ambitious | A5 |
| amiable | A7 |
| appealing | AP |
| appreciable | AP1 |
| argumentative | AR |
| arrogant | AR1 |
| artistic | A8 |
| artificial | AR2 |
| audacious | AU |
| awesome | A2 |
| awful | AW |
| leggy | LE |
| laughable | LA |
| likable | L1 |
| lively | L2 |
| loaded | L3 |
| logical | LO |
| lonely | LO2 |
| lonesome | LO3 |
| lost | L4 |
| loud | LO4 |
| loveable | L5 |
| lovely | L |
| loving | L6 |
| loyal | L7 |
| lucky | L8 |
| lunatic | LU |
| lustful | L9 |
| limitless | LI1 |
| loathsome | LO1 |
| lustrous | LU1 |
| wacky | WA |
| warmhearted | W1 |
| wealthy | W2 |
| weird | W3 |
| wholesome | WH |
| wicked | WI |
| Wild | W4 |
| Wise | W5 |
| witty | W6 |
| wonderful | W7 |
| worldly | WO |

-continued

| Word | Code |
|---|---|
| worthless | W8 |
| worthy | W9 |
| whimsical | WH1 |
| without equal | WI1 |
| worst | WO1 |
| zealous | Z1 |
| zesty | Z2 |
| zombielike | Z3 |

Here, as an example, in Table IVA, as the first step, the modifiers are selected as the commonly used modifiers to communicate a desired message per this invention and listed, as one of the options, in the order of alphabet sequence of the starting first one (or more) letter(s).

In the example of the modifier starting with the letter "A", the first ordering sequence, as an example, is based on the probability or the likelihood of their use among the related modifiers per this invention to communicate a desired message per this invention. From this list, the up to top nine related modifiers starting with either the first alphabet letter "A" or the first two starting alphabet letters with likely high probability of use per this invention are picked and they are assigned sequence designation numbers from one to nine in a decreasing order of the probability of use among the group of nine modifiers, as an example, based on the range of positive to negative message communicated by the selected modifiers. This approach could be employed with other selected modifiers either starting with another $1^{st}$ given alphabet letter or starting with $1^{st}$ two alphabet letters. The listed remaining related modifiers starting with the letter "A" are given sequence designation code character(s) based on a different concept, namely, the alphabet sequence of the letter that follows the starting letter(s). However, in Table IV A, the first ordering sequence applied to the commonly used adjectives starting with the letter "L" or "W" is based on the alphabet sequence of the second letter (and third letter if needed).

The above described coding rules and guidelines could be used individually or in combination for coding modifiers such as adjectives, adverbs starting with different alphabet letters as shown in Tables IV C, D, E, and F. The assigned sequence designation number character follows, as an example, as in the case of verbs, the first or the second or the third starting letter and is written after the starting letter under consideration.

As an embodiment, the code for a modifier used to communicate a desired message per this invention would have one or more alphabet letter characters written in the upper case form and/or one or more numerical, i.e. number, characters, and include as the distinguishing or the specific/unique feature of the modifier code, a set of, as an example two, unique or special characters, such as two hyphens above the first character in the modifier code. Here the selected two unique or special characters, as an option, would be placed in such a way that one unique character is on each side of the center of the width of the first code character with some space between them in the range of about 5-10% of the width of the code character.

As an extension of the above embodiment, it is understood that the one or two more alphabet and/or number code characters that follow the $1^{st}$ code character with the pre-selected distinguishing or specific feature (i.e. as an example, the character with the two hyphen above it) would represent the modifier code and its characters. As another embodiment, as an example, one or more, optionally back to back, code characters in a code representing a modifier or a word corresponding to a modifier (as in Tables IV A-F), could optionally have a predefined character visible feature as a part of one or more characters in the code for the given specific modifier class or word corresponding to the given modifier class.

Table IV C:

Examples of commonly used modifiers with first letter, B, C, D, E and F. and their codes:

| Word | Code |
|---|---|
| bad | B9 |
| baffling | BA |
| beautiful | B1 |
| bitchy | BI |
| bold | B5 |
| bossy | B7 |
| boring | B8 |
| brainy | B4 |
| brave | B6 |
| breathtaking | B3 |
| bright | B2 |
| brilliant | BR |
| bullheaded | BU1 |
| busty | BU |
| dangerous | DA1 |
| daring | DA |
| deceptive | D7 |
| decisive | DE |
| dedicated | D4 |
| delightful | DE2 |
| dependable | DE3 |
| deplorable | DE4 |
| despicable | DE5 |
| determined | DE1 |
| devious | D8 |
| devoted | D5 |
| dignified | DI |
| diligent | D6 |
| disgraceful | DI1 |
| dishonest | D9 |
| distinguished | D1 |
| divine | D2 |
| dull | DU |
| dynamite | D3 |
| captivating | CA1 |
| carefree | CA2 |
| caring | CA |
| competent | CO3 |
| competitive | CO4 |
| complex | CO5 |
| conceited | C7 |
| creepy | CR |
| crooked | CR1 |
| cruel | CR2 |
| charismatic | C2 |
| charming | C1 |
| cheerful | C4 |
| classy | CL |
| clever | C3 |
| cocky | C9 |
| colorful | CO2 |
| confident | C4 |
| controlling | CO6 |
| cool | C6 |
| corrupt | CO7 |
| courageous | CO1 |
| cowardly | CO8 |
| crazy | C8 |
| creative | C5 |
| cunning | CU1 |
| curvy | CU |
| cynical | CY |
| easygoing | EA |
| eccentric | E7 |
| ecstatic | EC |

-continued

| Word | Code |
|---|---|
| egotistic | EG |
| elegant | E2 |
| emotional | EM |
| enchanting | E5 |
| energetic | EN1 |
| enticing | EN |
| envious | EN2 |
| erotic | E6 |
| erratic | ER |
| ethical | ET |
| evasive | E8 |
| evil | E9 |
| excellent | EX1 |
| exceptional | E3 |
| exciting | EX |
| exhausting | EX1 |
| exotic | E4 |
| exploitable | EX3 |
| extraordinary | E1 |
| eye catching | EY |
| fabulous | F2 |
| faithful | F3 |
| fake | F8 |
| forgiving | FO |
| fascinating | F5 |
| fashionable | FA |
| flashy | F6 |
| flirting | F7 |
| foolish | F9 |
| foxy | F4 |
| friendly | ER |
| fun loving | F10 |
| funny | F1 |
| futuristic | FT |

Table IV D:

Examples of commonly used modifiers with first letter, G, H, I, J, K, N, O and their codes:

| Word | Code |
|---|---|
| generous | G5 |
| genuine | G3 |
| gifted | G7 |
| glamorous | G8 |
| good looking | G2 |
| goofy | G9 |
| gorgeous | G1 |
| gracious | G6 |
| greedy | GR |
| gross | GR1 |
| grotesque | GR2 |
| guilty | GU |
| great | G4 |
| handsome | H2 |
| hardworking | HA |
| heart stopping | H3 |
| heavenly | H1 |
| hellish | HE |
| hideous | H9 |
| hilarious | H5 |
| honest | H4 |
| hopeless | H8 |
| hostile | HS |
| hot | H7 |
| hotheaded | HT |
| hotshot | HO |
| humble | HU |
| humorous | H6 |
| hyperactive | HY |
| jealous | J4 |
| jovial | J1 |
| judgmental | J2 |
| juvenile | J3 |
| idealistic | ID |

-continued

| Word | Code |
|---|---|
| ignorant | I9 |
| immature | IM |
| immoral | IM3 |
| impeccable | I6 |
| impossible | IM1 |
| impulsive | IM2 |
| incompetent | IN5 |
| incredible | I2 |
| indecent | IN6 |
| indecisive | IN4 |
| independent | IN3 |
| infatuating | I5 |
| ingenious | IN |
| innocent | IN1 |
| insane | I8 |
| intelligent | I1 |
| intoxicating | IN2 |
| intriguing | I3 |
| irreplaceable | IR |
| irresistible | I4 |
| irresponsible | I7 |
| kind | K1 |
| kindhearted | K2 |
| kinky | K5 |
| kissable | K4 |
| knowledgeable | K3 |
| naive | N2 |
| nasty | N5 |
| naughty | N3 |
| noble | N1 |
| nutty | N4 |
| obnoxious | O8 |
| obscene | O9 |
| obsessive | O7 |
| oddball | OD |
| open minded | O5 |
| optimistic | O2 |
| outgoing | O4 |
| outrageous | O2 |
| outstanding | O1 |
| overcritical | O6 |
| overpowering | OV1 |
| oversexed | OV3 |
| overwhelming | OV2 |
| passionate | P2 |
| perfect | PE |
| persistent | P6 |
| pessimistic | P9 |
| phenomenal | P4 |
| philosophical | PH |
| poetic | PO |
| poisonous | PO3 |
| pompous | PO2 |
| popular | P5 |
| powerful | PO1 |
| precious | P3 |
| predictable | PR |
| pretty | P1 |
| priceless | PR1 |
| principled | PR2 |
| prized | PR3 |
| promiscuous | PR4 |
| provocative | P8 |
| pure | PU |
| puzzling | P7 |

Table IV F:

Examples of commonly used modifiers with first letter Q, R, T, U and V, and their codes, and selected modifier phrases and their codes.

| Word | Code | Word | Code | Selected Phrases | Code |
|---|---|---|---|---|---|
| queen | Q1 | unbeatable | UN1 | beyond comparison | PB |
| questionable | Q4 | unbelievable | U2 | cream of the crop | PC |
| quick | Q3 | uncommon | U4 | cruel hearted | PC1 |
| quiet | Q2 | undependable | UN8 | empty headed | PE |
|  |  | undesirable | U12 | fair minded | PF2 |
|  |  | undisputed | UN5 | forward looking | PF1 |
| rare | R2 | unequalled | U5 | fun loving | PF |
| ravish | R3 | unfaithful | U13 | goal oriented | PG |
| realistic | R6 | unforgettable | U1 | hot blooded | PH |
| reasonable | RE2 | unique | U3 | in 7$^{th}$ heaven | PI |
| rebellious | R7 | unkind | U11 | loud mouthed | PL |
| reckless | RE5 | unparalleled | UN6 | messed up | PM3 |
| reliable | R4 | unpredictable | U10 | mean spirited | PM2 |
| remarkable | R5 | unqualified | UN7 | mind blowing | PM |
| repulsive | R9 | unquestionable | UN2 | music to my ear | PM1 |
| resilient | RE | unreal | U7 | narrow minded | PN1 |
| resourceful | RE4 | unrealistic | U9 | nobody's fool | PN |
| respectable | RE3 | unreasonable | U8 | on cloud nine | PO |
| responsible | RE1 | unreliable | UN | old fashioned | PO2 |
| ridiculous | R8 | unrivaled | UN3 | out of control | PO3 |
| romantic | R1 | unselfish | UN4 | out of this world | PO1 |
|  |  | untrustworthy | UN9 | par excellence | PA |
|  |  | unusual | U6 | pea brained | PE |
|  |  |  |  | quick minded | PQ |
| talented | T6 |  |  | quick tempered | PQ2 |
| tempting | TE |  |  | quick witted | PQ1 |
| terrible | T9 | vague | VA | second to none | PS1 |
| terrific | T5 | vain | V7 | shining star | PS |
| thoughtful | T4 | venturous | V2 | short tempered | PS4 |
| titillating | T2 | vibrant | VI | something else | PS2 |
| toxic | TO | vicious | V8 | street smart | PS3 |
| transparent | T7 | victorious | VI | wise guy | PW1 |
| trashy | TR | vindictive | V9 | without equal | PW |
| tricky | T8 | virtuous | V4 | young at heart | PY |
| truelove | T1 | visionary | V3 |  |  |
| trustworthy | T3 | vivacious | V6 |  |  |
| twofaced | TW | vogue | V5 |  |  |

Table IVB:

Examples of commonly used modifiers with the first letter S and their corresponding codes.

| Word | Code |
|---|---|
| sacred | SA |
| sad | SA1 |
| Scholarly | SC |
| screwy | SC1 |
| sedative | SE |
| selfish | SE1 |
| sensible | SE2 |
| sensitive | SE3 |
| sensuous | S1 |
| sentimental | SE4 |
| serious | SE5 |
| sexy | X (Per Table VIIIA) |
| shapely | SH |
| sheepish | SH1 |
| shiny | SH2 |
| shrewd | SH3 |
| silly | S2 |
| sincere | SI |
| sinful | SI1 |
| sissy | SI2 |
| skilled | SK |
| skinny | SK1 |
| smart | S3 |
| special | S4 |
| spectacular | SP |
| Sporty | S5 |
| stable | ST |
| steady | ST1 |
| stealthy | ST2 |
| sterile | ST3 |
| stimulus | ST4 |
| straight | ST5 |
| strange | ST6 |

-continued

| Word | Code |
|---|---|
| striking | S6 |
| strong | ST7 |
| stubborn | ST8 |
| studious | ST9 |
| stunning | S7 |
| stupendous | STU |
| stupid | STP |
| sturdy | STR |
| stylish | S8 |
| successful | SU |
| sugar | SU1 |
| suggestive | S9 |
| sultry | SU2 |
| sumptuous | SU3 |
| sunny | SU4 |
| superb | SU5 |
| superficial | SU6 |
| supreme | SU7 |
| sweet | SW |

Here is an example, Table IV B, where the sequence designation or the ordering scheme characters of the selected first group of nine most commonly used modifiers starting with the same letter, here "S", are pre-determined on the basis of the alphabet sequence of the 2$^{nd}$ letter that follows the starting first letter, "S". In the case of other remaining modifiers starting with the letter "S", the sequence designation or the ordering scheme characters are based on the alphabet sequence of the letter that follows the same 1$^{st}$ two or same 1$^{st}$ three letters.

If there are more than one modifiers (or any other component part of the sentence) with the same 1$^{st}$ three starting letters, a different inventive coding approach is applied in order to keep the number of code characters for these modifiers (or any other component part of the sentence) as low as possible, as an example here to three code characters. Here, the coding methodology would keep the first two same alphabet characters and then take, not the 3$^{rd}$ common starting alphabet letter, but the fourth or the subsequent starting letter as the 3$^{rd}$ code character as long as they are different for the modifiers (or any other component part of the sentence) and list them in the order of the alphabet sequence of the 3$^{rd}$ or the subsequent starting letter. Thus, in table IV B, the modifiers, "Stupid" and "Sturdy" are coded as "STP" and "STR" respectively.

Below is Table IV F listing commonly used modifiers starting with the alphabet letter M and their codes.

| Modifier | Code |
|---|---|
| Magnetic | MA1 |
| Mesmerizing | M4 |
| Messy | M8 |
| Magnificent | M1 |
| Marvelous | M3 |
| Matchless | MA |
| Mature | M5 |
| Mean | M9 |
| Memorable | M2 |
| Mischievous | M7 |
| Monstrous | MO |
| Mysterious | M6 |
| Mythical | MY |

Table V:

Examples of selected nouns including proper nouns for use with: "I am a/an or the _" or "_ _ _" is a/an or the" or "My/Our _ _ _ is/are a/an or the" or "I love" or "I love a"

where _ _ _ could be a person, relationship or function based name, a group oriented or university associated name, or a name of a sport or a sport team, or a term reflective of a person such as character, profession and the like, or a term or a common name describing a feature or characteristic of oneself or another person and the like.

| Word | Code |
|---|---|
| lady | L1 |
| laureate | L2 |
| lawyer | L3 |
| leader | L4 |
| liar | L5 |
| liberal | L6 |
| librarian | L7 |
| loser | L8 |
| lover | L9 |
| love | L |
| luster | LU |
| loner | LO |
| nut | NU |
| nymph | NY |
| nymphomaniac | NY1 |
| wanderer | W1 |
| winner | W2 |
| witch | W4 |
| wizard | W5 |
| worrier | W6 |
| wise guy | W3 |
| teaser | T2 |
| trailblazer | T1 |
| turncoat | T3 |
| two-timer | T4 |
| tyrant | T5 |
| visionary | V1 |
| zombie | Z1 |
| Savior | SA |
| scapegoat | S5 |
| scholar | SC |
| scientist | S2 |
| screwball | SC1 |
| seducer | SE |
| Seminole | S3 |
| star | S1 |
| Sooner | S4 |
| spoiler | SP |
| stinker | ST |
| stooge | ST1 |
| stud | ST2 |
| student | ST3 |
| sucker | SU |
| sweetheart | SW |

Here are examples of codes for noun words commonly used per this invention as a part of the sentences describing one's description of self or another (such as sweetheart, leader and the like), one's preference or liking or association with an organization or a university and the like. The examples in Table V include among others nouns such as lady, winner, student and the like, or professions such as chemist, doctor, lawyer and the like or commonly recognized names associated with universities such as Seminole for Florida State University or Sooner for University of Oklahoma and the like. The code characters for these and other examples of noun words and other similar words listed in Table V are generated applying the inventive coding concepts, steps and guidelines disclosed herein similar to those applied for the verbs (Table III) and the modifiers (Tables IV A and B).

Specific code tables for different groups of common or proper nouns such as common names, or pronouns starting with different alphabets, or words related to a group or a class or a type of common or proper nouns such as names of business/technical associations, professions and professionals, names of entertainers, sports related figures and teams, or sports activities based common names such as runner, swimmer and the like, or the names of universities or their mascots, or other common names such as redneck, caveman, hipster, stylist and the like or the names of animals, names of different colors, names of well-known companies, widely recognized products names, names of automobiles/airplanes, the names of the manufacturers and the like could be developed following the inventive coding concepts, guidelines and rules described in the application. Other examples of nouns would include the commonly used government/political party based nouns such as President, Governor, Congressman/woman, Democrat, Libertarian, or the names of history, religion and the like based figures or places and the like.

As a corollary rule, the presence of one of the pre-defined set of unique or special characters, as an example, two hyphens below the $1^{st}$ character in the code as the distinguishing or specific feature for the noun/pronoun code implies that appropriately and as needed, "a" or "an" or "the" would be understood as being a part of the noun/pronoun in the code message and when decoded would be incorporated as a part of the decoded noun/pronoun in the message. As an additional rule, the singular or the plural meaning of the coded noun/pronoun is understood and/or assumed based on the context of the message and/or the verb used in the coded message.

Code for the name of a person: Here, the name of a person could be a first name of a male or a female, or a last name of a special group of people, or a neutral oriented person name, i.e. personal pronouns such as "I", "You", "We" and the like.

As an embodiment, the code for the first name of a person (male or female) would have two or more characters, namely, one or more alphabet letter characters written in the upper case form and one or more numerical (i.e. number) characters if needed, and as examples, at least two alphabet characters or one alphabet character and one number character. Here, the code characters are back to back (i.e. one follows the other), and preferably the number character would follow the alphabet character. Here, the alphabet character (s) would be the first one (or more) starting alphabet character(s) of the first name and the number character would refer to the sequence designation or ordering sequence of the first name under consideration among the group of related first names starting with the same first one (or more) alphabet letter character(s). Here, as the distinguishing or the specific feature of the code for the first name of a person, all the code characters including the alphabet and number characters present in the first name person code, would have a special character such as either an underline (i.e. a line under) or a line/bar over each of the characters and occupying the full width of the each character. Here, the special feature of the code for the first name of a person could optionally be a continuous normal face line over or under all of the code characters.

As another embodiment, the distinguishing or the specific feature of the male first name code would be a line below and covering the full width of each of the characters in the code, and optionally appearing as a continuous line below all the characters.

As yet another embodiment, the distinguishing or the specific feature of the female first name code would be a line/bar over and covering the full width of each of the characters in the code and optionally appearing as a continuous line above all the characters.

Table VIA:

Examples of commonly used popular male (first) names and their codes

| A | Code | C | Code | D | Code | M | Code |
|---|---|---|---|---|---|---|---|
| Andrew | A1 | Christopher | C1 | Daniel | D1 | Michael | M1 |
| Anthony | A2 | Christian | C2 | David | D2 | Mathew | M2 |
| Alexander | A3 | Caleb | C3 | Dylan | D3 | Mason | M3 |
| Austin | A4 | Cameron | C4 | Devin | D4 | Mark | M4 |
| Aidan | A5 | Connor | C5 | Diego | D5 | Marcus | M5 |
| Angel | A6 | Cody | C6 | Dominic | D6 | Maxwell | M6 |
| Aaron | A7 | Chase | C7 | Dakota | D7 | Max | M7 |
| Adam | A8 | Colin | C8 | Derek | D8 | Mario | M8 |
| Alex | A9 | Carson | C9 | Dalton | D9 | Manuel | M9 |
| Adrian | AD | Carter | CA | Devon | DE | Micah | MI |
| Aiden | AI | Caden | CA1 | Damian | DA | Marco | MA |
| Antonio | AN | Collin | CO | Donovan | DO | Malachi | MA1 |
| Alejandro | AL | Colton | CO1 | Dillon | DI | Mitchell | MI1 |
| Ashton | AS | Cristian | CR | Damien | DA2 | Martin | MA2 |
| Alan | AL1 | Conner | CO2 | | | | |
| Alexis | AL2 | Cesar | CE | | | | |
| Andres | AN1 | Cooper | CO3 | | | | |
| | | Clayton | CL | | | | |
| | | Corey | CO4 | | | | |

Here, in the examples as shown in Table VIA, the listed male (first) names starting with the alphabet letter characters A, C, D and M are taken from the published list of popular names and listed in the decreasing order of frequency of use. As an embodiment, as shown above, the distinguishing or the specific feature of the male first name code would be a line below and covering the full width of each of the characters in the code, and optionally appearing as a continuous line below all the characters. The coding principles applied to generate the codes listed in Table VIA are explained below.

The first nine popular names are coded using the common starting alphabet letter as their first code character followed by a number, from one to nine, the number being the sequence designation or the ordering scheme character based on the frequency of use among the nine names based on the published list, i.e. number one is assigned to the name with the highest frequency use among the first nine names and the number nine is assigned to the name with the lowest frequency of use among the same set of nine names. If the list of names contains more than nine names starting with the same first alphabet letter character, the remaining names are grouped in the decreasing order of frequency of use. Their codes are generated applying the alphabet letter sequence of the $2^{nd}$ or $3^{rd}$ or subsequent starting alphabet letter character in the names and the sequence designation or the ordering scheme character number is assigned as before, i.e. for the $1^{st}$ in this group, without any number, only the first two or subsequent starting alphabet letters are assigned and number one is assigned to the name with the next highest frequency of use among the names starting with the same first two (or subsequent) starting alphabet letter characters. The subsequent numbers, i.e. 2, 3, 4, etc., are assigned to the names with decreasing frequency of use among the names starting with the same set of staring alphabet letter characters based on the published list.

Table VIIA:

Examples of commonly used popular female (first) names and their codes

| A | Code | A | Code | M | Code | M | Code |
|---|---|---|---|---|---|---|---|
| Abigail | A1 | Adriana | AD | Madison | M1 | McKenzie | MC |
| Alexis | A2 | Amelia | AM1 | Morgan | M2 | Miranda | MI2 |
| Ashley | A3 | Amy | AM2 | Megan | M3 | Maggie | MA5 |
| Alyssa | A4 | Angel | AN3 | Mia | M4 | Megean | ME2 |
| Anna | A5 | Alexandria | AL1 | Maria | M5 | McKenna | MC1 |
| Alexandra | A6 | Alondra | AL2 | Mackenzie | M6 | | |
| Ava | A7 | Alicia | AL3 | Makayla | M7 | | |
| Allison | A8 | Alexia | AL4 | Madeline | M8 | | |
| Amanda | A9 | Ashlyn | A5 | Mary | M9 | | |
| Andrea | AN | Angelica | AN4 | Michelle | MI | | |
| Alexa | AL | Abby | AB | Maya | MA | | |
| Angelina | AN1 | Alejandra | AL5 | Melanie | ME | | |
| Amber | AM | Amaya | AM3 | Melissa | ME1 | | |
| Autumn | AU | Aubrey | AU1 | Marissa | MA1 | | |
| Audrey | AU1 | Addison | AD1 | Molly | MO | | |
| Ariana | AR | Alana | AL6 | Mariah | MA2 | | |
| Arianna | AR1 | | | Madelyn | MA3 | | |
| Avery | AV | | | Mya | MY | | |
| Aaliyah | AA | | | Margaret | MA4 | | |
| Angela | AN2 | | | Mikayala | MI1 | | |

The coding rules and guidelines applied to generate the codes for female first names (as examples shown in Table VIIA) are similar to that of used for male first names. Here, in Table VII A, the distinguishing or the specific feature of the female first name code would be a line/bar over and covering the full width of each of the characters in the code and optionally appearing as a continuous line above all the characters.

Table VIIIA: Special codes for selected "words" used uniquely:

Here, depending on the context and the message being communicated, the code/code character "X" means the noun word, "sex" or the modifier word, "sexy" or the verb word, "make love". When used with the meaning "sexy", the "X" would have two hyphens over it as the modifier distinguishing or specific feature. When used as noun with the meaning "sex", the "X" would have two hyphens below it as the noun/pronoun distinguishing or specific feature. When used as a verb with the meaning "make love", the "X" would have a single hyphen below it as the verb distinguishing or specific feature.

Examples of application of this code:

| Group 1. | |
|---|---|
| Words | Code |
| very sexy | 1X |
| super sexy | 2X |
| extremely sexy | 3X |

| Group 2. | |
|---|---|
| Words | Code |
| sexy eyes | X1 |
| sexy face | X2 |
| sexy legs | X3 |
| sexy lips | X4 |

| Group 3. | |
|---|---|
| Words | Code |
| sexy body | XB |
| sexy look | XL |
| sexy smile | XS |

Here, under Groups 2 and 3, the specified number or the alphabet character that follows "X" is the designation code character corresponding to the related word that follows "sexy". Additional related words could be added to either Group 2 or 3 with their corresponding designation code characters.

As an embodiment, under Group 1, "sexy" could be replaced by other modifiers/adjectives such as "adorable" or "affectionate" or "beautiful" or "handsome" or "rich" or "wise" or the like. In these examples, as in the case of Table 1 C, the sequence indicating or reflecting character numbers 1, 2 or 3 could be incorporated optionally with a line/bar having a right direction pointing arrow over them implying that the number character is related to the code character on the right side it. The sequence indicating or reflecting character numbers 1, 2 or 3 in such cases are used to communicate "very", "super" and "extremely" respectively. As an example, using the code, "A4" for the adjective, "affectionate" (from Table IVA), the following special codes could be created. Note here, since A4 is the code for a modifier, the first letter character "A" would have two hyphens above it as the modifier code distinguishing or specific feature.

Very affectionate 1A4
Super affectionate 2A4
Extremely affectionate 3A4

Under Group 1, the sequence indicating or reflecting character number one to three is an example of coding based on the significance or the uniqueness of the relationship among the words under consideration.

Under Group 1, 2 or 3, the code "X" could be replaced with another unique or special letter/symbol to denote other similar special modifier word(s). An example would be Q to represent "cute" and related words such as "cute face" or "cute smile" etc. Here the special code character "Q" for the modifier word "Cute" would have two hyphens above it.

As an embodiment, it is understood that if either of the code characters, "X" or "Q" with two hyphens over it, is followed by another number or a letter character, as a part of the code or coded message, "that number or the letter character" represents a word associated with either "sexy" or "cute" respectively and the specific meaning of the word would be listed under Groups 2 and 3 under Table VIIIA.

Table VIIIB. As another novel concept, the following set of examples of special adjectives, as in Table VIIIB, used to communicate another type of desired message per this invention could be coded using the special character, "^" (i.e. the peak pointing up) above the first alphabet letter character of the special adjective word as one of the two code distinguishing or specific features of the special adjective code implying the highest significance as communicated by the selected adjective, i.e. the superlative degree and the other being either a short hyphen or another "^". Here as an embodiment, the use of the special character symbol "^" with another "^" or a short hyphen above the alphabet letter code character implies the top or the highest significance for the meaning being communicated by the adjective word(s) with the alphabet character as its starting 1$^{st}$ letter character.

"the Best" B with one or two "A" above it
"the Coolest" C with one or two "A" above it
"the Greatest" G with one or two "A" above it
"the Kindest" K with one or two "A" above it
"the Nicest" N with one or two "A" above it
"the Sweetest" S with one or two "A" above it As yet another embodiment and a novel concept, the special character symbol, "v" which is the inverted version of "^" (i.e. the peak pointing down) could be written above the first starting alphabet letter character of a special adjective code as the code distinguishing or the specific feature implying the lowest significance as communicated by the selected special adjective. That is, the presence of the special character, "v" above the alphabet letter code character for the selected adjective as one of the two code distinguishing or specific features of the special adjective code could imply the lowest significance for the meaning being communicated by the adjective word(s) used and the other being either a short hyphen or another "v". As examples, "the Meanest" M with one or two "v" above it
"the Stupidest" S with one or two "v" above it (STU1 in Table IVB)

Table IX:—Examples of codes for names of places and nationality

As an embodiment, the code for the name of a place (as examples, the name of a major town/city, or a state/province of a country, or a country, or an outdoor based or geography oriented place of interest such as beach, mountain etc.) would have two or more characters one following the other, i.e. back to back, either alphabet letters or numbers or a combination of alphabet and number characters, and optionally in some cases with another character such as a pre-defined and pre-selected number or specific English alphabet letter character as the first code character, and include as the distinguishing or the specific feature of the code for the name of a place, the special or unique character, a hyphen over each of the characters in the code. Here, the hyphen being shorter in length than a dash line (about 10% to 90% of the length of a dash line), i.e. hyphen occupying in the range of 10% to 90% of the width of the character, the hyphen would not fully cover the width of the character and preferably be at the center of the width of the character.

The code for a major city/town name, as another embodiment of the invention, could be the three back to back English alphabet letter characters, written in the upper case form, designated as the airport code for the airport located in or around the given major city/town together with the unique or special character as the distinguishing or the specific feature of a place code per this invention, the hyphen, over each of the three English alphabet letter characters.

The code for a state/province name, as another embodiment of the invention, could be the two or four back to back English alphabet letter characters, written in the upper case form. In the case of two characters example, they are the alphabet letter characters designated to a given state or province as a part of the postal code system (example, the two letter state code in the zip code in the US or in the pin code in India) together with the unique or special character as the distinguishing or the specific feature of a place code, the hyphen, over each of the two English alphabet letter characters. According to another embodiment of this invention, as an example of the four characters option, one may combine the "two English alphabet letters" code for a country per USPTO designation with the "two alphabet letter characters" code for a state in the given country discussed above. For example, if one wishes to communicate that he/she is from the Tamilnadu State in India, he/she may use "12" (see above) or "IN" per USPTO as the code for India and "TN" as the state code for Tamilnadu (the postai pin code for Tamilnadu) and combine as "I2TN" or "IN4TN" to indicate the region and the country. This embodiment is useful if one wishes to communicate the state/province in a country other than the country of residence in the coded message.

The code for a country name, as an embodiment of the invention, could be the three or four back to back numbers designated as the international telephone country dialing code together with the unique or special character as the distinguishing or the specific feature of a place code, the hyphen, over each of the characters, here over the three or four back to back number characters.

Here, a detailed table is provided below to demonstrate the code for countries using the numerical international country specific dialing codes. Only selected countries and their corresponding international dialing codes are provided to illustrate this approach. As explained above, each of the numerical code characters in the country code would have a "hyphen" above it.

| Country | Country code |
|---|---|
| Argentina | 54 |
| Australia | 61 |
| Cambodia | 855 |
| Egypt | 20 |
| Germany | 49 |
| India | 91 |
| Japan | 81 |
| Malaysia | 60 |
| Panama | 507 |
| Russia | 07 |
| Taiwan | 886 |
| United Kingdom | 44 |
| United States of America | 01 |
| Zimbabwe | 263 |

Code for Nationality:

As an embodiment of this invention, together the addition of one of the following specific characters, as an example, English alphabet letters, "N", "E", "H", or "R" to the right side of the country, region or city code would create another novel code representing the place of birth or the nationality name associated with the given country or the region or the city. Here, the "two letter" code for a country per USPTO designation could also be used.

Examples 61N for Australian; 91N or INN for Indian
MON for Missourian
STLN for Saint Louisian
81E for Japanese; 886E for Taiwanese
44H for British
LHRR for Londoner Thus, examples of desired messages such as "I am Australian" and "Smart Indian" and "Adorable Japanese" and "adorable sexy Missourian" could now be non-phonetically and unambiguously coded for displaying on a display space such as the vanity license plate as, "IA 61N" and "S4 91N" and "A1 81E" and "A1 X MON" respectively. Here, preferably, each of the country or the region or the city code characters would have a hyphen above them to signify that the code is for the name of a country or a region/state or a city. Alternatively, as an embodiment, the specific alphabet letter characters, "N", "E", "H", or "R" could optionally have, as a part of the character, either one of the character visible features or a line above it with a left side pointing arrow at the end, to communicate that the specific letter character with either the character visible feature or an arrow line above it highlights or expands or is related to the message being communicated by the set of code characters on the left.

As another embodiment, addition of a selected single letter or a number character in front of, i.e. to the left side of, the country/region/city code would be used to communicate different types of desired messages such as "born in" or "from" or "native of" a specific country, region or city. Note that the individual code characters for the country/region/city would have a hyphen above them to signify that the code is for the name of a country/region/city. Thus, when the above codes are combined as a part of the coded message with one of the below listed single character code, the new coded message would be unambiguous.

"B" for "Born in"
"F" for "From" (Table IA) or
"2" for "From" (Table IC)
"6" for "Native of" (Table IC)

Examples

"IA BTN91" for "I am born in Tamilnadu India"
"IA F44" (or using Table IA version "IAF 44") for "I am from United Kingdom"
"IA 6FL" (or using Table IC version "IA6 FL") for "I am native of Florida"

Note, in the above examples, the alphabet letter character "I" would have a dot above it unambiguously pointing out that the letter "I" is for the word "I" as in "I am" and all the code characters for the names of places would have a hyphen above each of them, and thus the desired message is unambiguously and non-phonetically communicated and/or displayed on a display space.

What is claimed is:

1. A method comprising:
   parsing a sentence into one or more component parts of speech, wherein each of the component parts of speech parsed from the sentence is represented by one or more words;
   selecting words, including the one or more words, representing the one or more component parts of speech of the sentence based on a likelihood of use to communicate a message;
   grouping the selected words as a group of related words based on a component part of speech represented by the selected words starting with the same one or more alphabet letters;
   assigning a sequence designation character to each of the related words in the group based on a relative likelihood of use among the group to communicate the message;
   retrieving coding instructions from a computer-readable medium, said retrieved coding instructions defining one or more code characters in a code for each of the related words in the group for use in generating a non-phonetically coded message, the code characters comprising alphabet letters, numbers, symbols, and a combination thereof; and
   wherein the defined one or more code characters in the code for each of the related words in the group include the sequence designation character assigned to the word, wherein the defined one or more code characters in the code for each of the related words in the group when combined are configured to be displayed on a display space having a display space restriction, wherein the defined one or more code characters in the code for each of the related words in the group are combined to form the non-phonetically coded message, printing or engraving the coded message on a display space having a display space restriction, the display space restriction comprising a number of characters restriction;

wherein the display space comprises at least one of the following: a vehicle license plate system, a bank card, a telephone number system, an engraved matter, a personal wear, and an electronic device including a programmable consumer electronic device.

2. The method of claim 1, wherein the display space has a special marking on the display space.

3. The method of claim 2, wherein the special marking comprising at least one of the following: a predefined abbreviation; a predefined abbreviation having a number located on a right side or a left side thereof; one or more stars; one or more stars in combination with a number; one or more stars in combination with an alphabet letter; one or more special characters; and one or more characters visible features.

4. The method of claim 1, wherein the defined one or more code characters in the code for each of the related words in the group representing the one or more component part of speech includes one or more special characters as a part of the one or more characters in the defined code characters, said one or more special characters comprising code distinguishing features for representing the one or more component parts of speech.

5. The method of claim 4, wherein the one or more special characters comprising at least one of the following individually or in combination, placed before or after or above or below or around the one or more characters in the defined code characters: a line/bar, an underline, an arrow, a line with an arrow, one or more hyphens, one or more dots, one or more solid or hollow geometric shapes, including circle, square, rectangle, triangle, or diamond, one or more stars, a caret symbol, a bracket, and an inequality symbol.

6. The method of claim 1, wherein the defined one or more code characters in the code for each of the related words in the group include one or more characters visible features as a part of the one or more characters in the defined code characters, said one or more characters visible features comprising code character distinguishing features for representing the one or more characters in the code representing the one or more component parts of speech.

7. The method of claim 1, wherein the relative likelihood of use is based on at least one of the following criteria:
   a range of positive to negative message communicated by the words,
   a relative desirability of the message communicated by the words;
   a function of a significance of the message communicated by the words, and
   a published preference for the use of the word among the related words in the group;
   wherein when the words in the group have similar likelihood of use, the sequence designation character for each word in the group is based on at least one of the following criteria:
   the alphabet sequence of the letter subsequent to the starting alphabet letter of the word,
   the number of alphabet letter characters in the word,
   the length of the word, and
   a function of an attribute associated with the words.

8. The method of claim 1, wherein the computer-readable medium further comprises instructions for decoding the coded message comprising,
   scanning the coded message displayed on a display space or receiving the coded message from an electronic device including a computing system environment;
   identifying one or more code blocks representing one or more components parts of speech in the coded message by identifying one or more recognizable means;
   identifying one or more characters in the one or more code blocks by identifying character attributes;
   applying stored decoding instructions for decoding the one or more characters;
   decoding the one or more code blocks;
   determining when all of the code blocks have been decoded; and
   decoding the coded message based on the decoded code blocks.

9. The method of claim 1, further comprising assigning the starting alphabet letter character of the word in the group as a single letter code character for the word based on one or more of the following criteria: the word having a relatively higher likelihood of use to communicate the message, or significance of the message communicated by the word, or a special message communicated by the word.

10. The method of claim 1, wherein the alphabet letter comprises one of the following: English alphabet, Spanish alphabet, Japanese alphabet, Tamil alphabet.

\* \* \* \* \*